United States Patent
Hess et al.

(10) Patent No.: US 10,311,496 B2
(45) Date of Patent: Jun. 4, 2019

(54) WEB-BASED AUTOMATED PRODUCT DEMONSTRATION

(71) Applicant: DemoChimp, Inc., Saratoga Springs, UT (US)

(72) Inventors: Garin Hess, Saratoga Springs, UT (US); Andrew Clark, Draper, UT (US); Matt Behrend, Lehi, UT (US)

(73) Assignee: Demochimp, Inc., American Fork, UT (US)

( * ) Notice: Subject to any disclaimer, the term of this patent is extended or adjusted under 35 U.S.C. 154(b) by 0 days.

(21) Appl. No.: 14/486,949

(22) Filed: Sep. 15, 2014

(65) Prior Publication Data

US 2015/0310488 A1 Oct. 29, 2015

Related U.S. Application Data

(60) Provisional application No. 62/046,118, filed on Sep. 4, 2014, provisional application No. 62/012,556, filed
(Continued)

(51) Int. Cl.
*G06Q 30/02* (2012.01)
*G06Q 30/06* (2012.01)
(Continued)

(52) U.S. Cl.
CPC ....... *G06Q 30/0623* (2013.01); *G06F 16/245* (2019.01); *G06F 17/21* (2013.01);
(Continued)

(58) Field of Classification Search
None
See application file for complete search history.

(56) References Cited

U.S. PATENT DOCUMENTS 8,347,355 B2 * 1/2013 Mower ............... H04L 67/025
726/3
8,845,337 B1 9/2014 Hu et al.
(Continued)

OTHER PUBLICATIONS

Soleymani, Mohammad, Jeremy Davis, and Thierry Pun. "A collaborative personalized affective video retrieval system." Affective Computing and Intelligent Interaction and Workshops, 2009. ACII 2009. 3rd International Conference on. IEEE, 2009 (Year: 2009).*
(Continued)

*Primary Examiner* — Marissa Thein
*Assistant Examiner* — Michelle T Kringen
(74) *Attorney, Agent, or Firm* — Patent Law Works LLP

(57) ABSTRACT

The innovations described in this disclosure include distinct differences that create a marketing and sales advantage. For convenience, these features are organized into several innovations, but the features described can be combined and implemented in various ways, both within a given innovation and across two or more innovations. Each innovation is unique in itself. Taken as a whole the innovations establish a demonstration category called "Demo Automation" or "Demonstration automation". The innovations include, but are not limited to, automated self-configuring video content density and sequence based on personalization responses; automated responsive locked document library; sending a product demo that allows you to see who the recipient shared it with; and product demonstration analytics.

11 Claims, 43 Drawing Sheets

Related U.S. Application Data on Jun. 16, 2014, provisional application No. 62/006,917, filed on Jun. 3, 2014, provisional application No. 61/877,951, filed on Sep. 14, 2013.

(51) Int. Cl.
 *H04L 29/08* (2006.01)
 *G06F 16/245* (2019.01)
 *G06F 17/21* (2006.01)

(52) U.S. Cl.
 CPC ......... *G06Q 30/0257* (2013.01); *H04L 67/22* (2013.01); *H04L 67/2823* (2013.01); *H04L 67/306* (2013.01)

(56) References Cited

U.S. PATENT DOCUMENTS

| | | | |
|---|---|---|---|
| 2003/0058268 A1* | 3/2003 | Loui | G06F 17/30802 715/719 |
| 2003/0126146 A1* | 7/2003 | Van Der Riet | G06Q 30/02 |
| 2003/0182118 A1* | 9/2003 | Obrador | G06F 17/30787 704/246 |
| 2007/0156537 A1* | 7/2007 | Peters | G06Q 30/02 705/27.2 |
| 2007/0288251 A1 | 12/2007 | Ebrom et al. | |
| 2009/0037287 A1 | 2/2009 | Baitalmal et al. | |
| 2009/0048939 A1* | 2/2009 | Williams | G06Q 30/0641 705/27.1 |
| 2009/0075782 A1* | 3/2009 | Joubert | A63B 24/0075 482/9 |
| 2010/0318404 A1* | 12/2010 | Jain | G06Q 30/02 705/14.16 |
| 2012/0204102 A1* | 8/2012 | Gwin | G06Q 90/00 715/253 |
| 2012/0209586 A1* | 8/2012 | Mieritz | G06F 9/455 703/22 |
| 2012/0315010 A1* | 12/2012 | Zhang | H04N 5/147 386/230 |
| 2012/0316968 A1* | 12/2012 | Patrick | G09B 19/0092 705/14.66 |
| 2013/0035990 A1 | 2/2013 | Sharma | |
| 2013/0097558 A1* | 4/2013 | Lichtenstein | G06F 21/10 715/810 |
| 2013/0216200 A1* | 8/2013 | Howett | H04N 5/91 386/240 |
| 2014/0281978 A1* | 9/2014 | Ye | G06F 3/01 715/716 |
| 2014/0289241 A1* | 9/2014 | Anderson | G06F 17/30038 707/736 |
| 2014/0310596 A1* | 10/2014 | Lafreniere | G06F 3/0481 715/708 |
| 2016/0071179 A1* | 3/2016 | Babcock | G06Q 30/0623 705/26.61 |

OTHER PUBLICATIONS

International Search Report and Written Opinion for PCT/US15/33956 dated Oct. 19, 2015 (16 pages).

Fiore, et al., "Effect of Image Interactivity Technology on Consumer Responses toward the Online Retailer," Journal of Interactive Marketing, vol. 19, No. 3, 2005 (16 pages).

* cited by examiner

WEB-BASED AUTOMATED PRODUCT DEMONSTRATION

CROSS-REFERENCE TO RELATED APPLICATIONS

This application claims the benefit under 35 U.S.C. § 119(e) of U.S. Provisional Patent Application No. 61/877,951, entitled "Web-based Product Demonstration Automation" filed Sep. 14, 2013, U.S. Provisional Patent Application No. 62/006,917, entitled "Web-based Product Demonstration Automation" filed Jun. 3, 2014, U.S. Provisional Patent Application No. 62/012,556, entitled "Web-based Product Demonstration Automation", filed Jun. 16, 2014, and U.S. Provisional Application No. 62/046,118, entitled "Web-Based Product Demonstration Automation" filed Sep. 4, 2014, the entire contents of each of which are incorporated herein by reference.

COPYRIGHT AUTHORIZATION

A portion of the disclosure of this patent documetn contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present disclosure relates to technology for automated product demonstration.

Sales people often use presentations as means for demonstrating products to customers. For instance, a presentation may be created using a slide show presentation program like Microsoft PowerPoint®. However, once created, the content of such presentations is generally singular, fixed, and requires manual adaptation if presented to different audiences. As a result, such presentations often include content that is irrelevant, uninteresting, or stale for the viewing audience, which results is lower sales. In some cases, sales people and or web marketers may use a curated video-based product demonstration accessible online, such as on a website. However, like the above slide-based presentations, many video demos on websites are one-size-fits-all, meaning that there is one large video that covers several product features or benefits, forcing the viewer to either sit through the video or jump around looking for what is important to them. In further cases, more complex product video demonstrations may be offered but even then the viewer must manually select from a list or menu to launch what he or she perceives, but is not sure to be the desired demonstration.

In web marketing visitors are sometimes encouraged to submit their contact information in exchange for a document or set of documents when visiting a website. For instance, the documents may be inaccessible until a given visitor submits relevant contact information via an online form, and the website may then make the documents available for download or send them via email. However, the documents, or libraries of documents, are not customized to the specific needs of the user or integrated with other dynamic content being viewed by or demonstrated to the user. Rather, the documents are static and consist of the same material regardless of the user downloading them or other content being consumed by or demonstrated to the user in real-time. Thus, the documents often do not satisfy the website visitor's unique needs.

During a sales process, a salesperson may send collateral to a prospective customer. For instance, a sales person or group might send documents or even links to videos, including links to product demonstration slides or videos. For instance, current solutions allow you to send a link to a video (such as sending a YouTube video link) to someone. However, these solutions do not reliably indicate when they watched it, who they shared it with, and what they thought was important in the video.

Gathering analytics for web activity is common through such services as Google Analytics. These types of website analytics allow marketers to learn information such as answers to questions like "What browser are website visitors using to view my site?" or "How did visitors get to my site?" However, web analytics technology do NOT answer questions such as "What parts of my product are most important to my customers?", "What market segment are my website visitors from?", or "What objections do website visitors have to my product?" Web analytics are also unable to reliably indicate specific buying interest information about website visitors. Currently web marketers try to solve this problem through the use of surveys served up to users during visits to various websites. However, website visitors have little motivation to complete the surveys, and the thus often consider the surveys to be a nuisance. Thus, these surveys have low response rates.

SUMMARY

The innovations described in this disclosure include distinct differences that create a marketing and sales advantage. For convenience, these features are organized into several innovations, but the features described can be combined and implemented in various ways, both within a given innovation and across two or more innovations. Each innovation is unique in itself. Taken as a whole the innovations establish a demonstration category called "Demo Automation" or "Demonstration automation". The innovations include, but are not limited to, automated self-configuring video content density and sequence based on personalization responses; automated responsive locked document library; sending a product demo that allows you to see who the recipient shared it with; and product demonstration analytics.

In one innovative aspect, an example demonstration system can dynamically organize not only a custom sequence of videos based on their responses, but also the video density, meaning that based on some responses video content shows more abstracted summary of a feature rather than an in-depth demonstration. The combination of video content density and sequence together create an automated personalized product demonstration experience that is uniquely new. The system provides a new type of product demonstration that configures itself in a unique way based on personalization responses. This improves viewer satisfaction by saving them time and helping them quickly get to the video content they need to see.

In another innovative aspect, when a salesperson sends a demonstration video or other piece of collateral using the demonstration system, the salesperson can see who they shared it with and how each person it was shared with interacted with the piece of collateral, enabling the salesperson to discover and engage the broader buying panel.

In another innovative aspect, an example demonstration system provides a new way to responsively populate a locked document library, which improves marketing conversion rates on websites. This innovation responds to the user's needs by asking the user to respond to certain questions, thereby increasing the user's desire for the documents. Integration of the locked document library into multimedia presentations creates a synergistic improvement over having them separate. Unlike current practices that provide a stand-alone form, the integration, interaction, and the way in which the document library responds to the user's needs make this unique and new.

Other implementations of one or more of these aspects or other aspects include corresponding systems, apparatus, and computer programs, configured to perform the various actions and/or store various data described in association with these aspects. These and other implementations, such as various data structures, are encoded on tangible computer storage devices. Numerous additional features may in some cases be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

The innovative technology disclosed in this application is capable of, for instance, automatically configuring product demonstrations through video content density and sequence based on personalization responses; tracking the sending of product demonstrations in a way that allows users to visualize additional downstream viewers in addition to the intended recipients, such as the individuals the intended recipients of the product demonstrations shared the product demonstrations with; [complete me]; automatically populate a locked document library with a library of documents that are personalized to the user; provide rich product-demonstration-related analytics; etc. The technology may include various systems, methods, computer program products, interfaces, and other aspects to provide these and other advantages, acts, and/or functionality.

By way of illustration and not limitation, using the computing systems, methods, graphical user interfaces, and/or other aspects described herein, a document owner can submit list of features and descriptions, upload documents associated with each of the features, associate the uploaded documents with correlating segments of the demo (e.g., multimedia presentation), and publishes the multimedia presentation in a corresponding website or native application for prospects to access the consume.

By way of further illustration and not limitation, marketing firms or departments and sales firms or departments can use the innovative technology described herein, such as web-based, computer-implemented software-based product demonstration curation tools, to build a web-based digital product demonstration that is tailored to each website visitor and/or computer application (e.g., mobile app) user. In a non-limiting example, as part of the curation process, a user log into a SaaS (software as a service) server (e.g., via a website, using a mobile application, etc.) where, using graphical interfaces associated therewith, the user can enter the features and benefits of the product and upload associated videos and documents. Once the user has finished building the customized automated product demonstration, the demonstration system described herein may provide to the user embed code for the user to embed into the user's own website or application so that the related automated product demonstration can be accessed by the user's website or application visitors.

Figure 1:
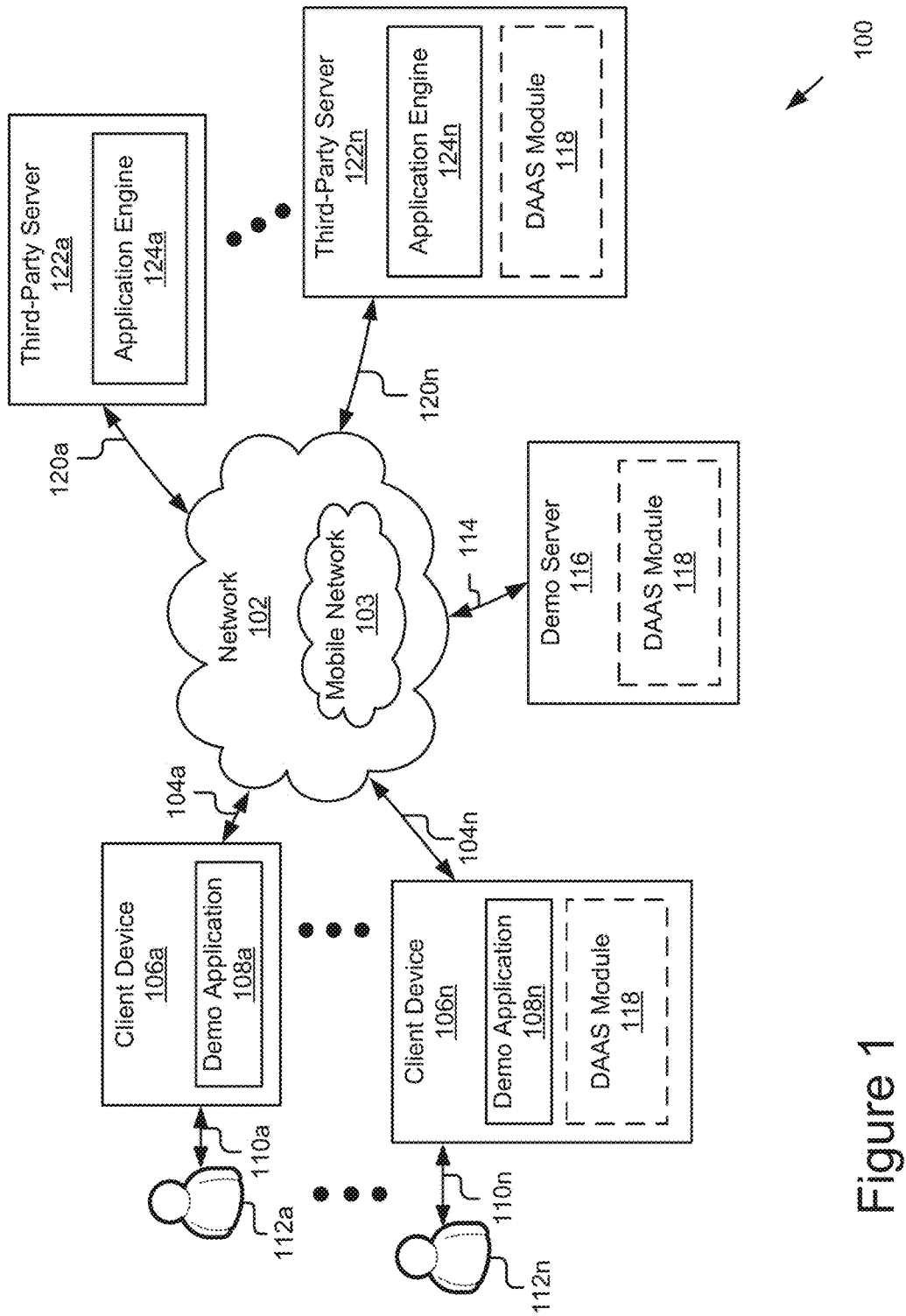
FIG. 1 is a block diagram illustrating an example system for demonstration automation.

FIG. 1 is a block diagram illustrating an example system 100 for demonstration automation. The illustrated example system 100 includes client devices 106*a* . . . 106*n*, a demo server 116, and third-party servers 122*a* . . . 122*n*, which are communicatively coupled via a network 102 for interaction with one another. For example, the client devices 106*a* . . . 106*n* may be respectively coupled to the network 102 via signal lines 104*a* . . . 104*n* and may be accessible by users 112*a* . . . 112*n* (also referred to individually and collectively as 112) as illustrated by lines 110*a* . . . 110*n*. The demo server 116 may be coupled to the network 102 via signal line 114. The third-party servers 122*a* . . . 122*n* (also referred to individually and collectively as 122) may be respectively coupled to the network 102 via signal lines 120*a* . . . 120*n*. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile (cellular) networks (e.g., the mobile network 103), wireless wide area network (WWANs), WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless networking software and/or hardware that interconnects the computing devices of the system 100. For example, the network 102 may include packet-switching devices that route the data packets to the various computing devices based on information included in a header of the data packets.

The mobile network 103 may include a cellular network having distributed radio networks and a hub. In some implementations, the client devices 106a . . . 106n may send and receive signals to and from a transmission node of the mobile network 103 over one or more of a control channel, a voice channel, a data channel, etc. In some implementations, one or more client devices 106a . . . 106n may connect to the network 102 via a wireless wide area network (WWAN) of the mobile network 103. For instance, the mobile network 103 may route the network data packets sent and received by the client device 106a to the other entities 106n, 116, and/or 122 etc., that are connected to the network 102 (e.g., via a the Internet, a VPN, etc.). The mobile network 103 and client devices 106 may use a multiplexing protocol or a combination of multiplexing protocols to communicate including, for example, FDMA, CDMA, SDMA, WDMA, or any derivative protocols, or the like, etc. The mobile network 103 and client devices 106 may also employ multiple-input and output (MIMO) channels to increase the data throughput over the signal lines coupling the mobile network 103 and client devices 106. The mobile network 103 may be any generation mobile phone network. In some instances, the mobile network 102 maybe a 2G or 2.5G GSM, IS-95, etc., network; a 3G UTMS, IS-2000, etc., network; a 4G HSPA+, 3GPP LTE, WiMax™, 5G+, etc., network; etc. In some instances, the mobile network 103 may include a backwards-compatible multi-generational network that supports two or more technology standards.

The client devices 106a . . . 106n (also referred to individually and collectively as 106) include computing systems having data processing and communication capabilities. In some implementations, a client device 106 may include a processor (e.g., virtual, physical, etc.), a memory, a power source, a network interface, and/or other software and/or hardware components, such as a display, graphics processor, wireless transceivers, keyboard, camera, sensors, firmware, operating systems, drivers, and/or various physical connection interfaces (e.g., USB, HDMI, etc.), etc. The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing systems.

In the depicted implementation, the client devices 106a . . . 106n respectively contain instances 108a . . . 108n of a demo application (also referred to individually and collectively as 108). The demo application 108 may be storable in a memory (e.g., see FIG. 2) and executable by a processor (e.g., see FIG. 2) of a client device 106 to provide for user interaction, receive user input, present information to the user via a display (e.g., see FIG. 2), and send data to and receive data from the other entities of the system 100 via the network 102. In a non-limiting example, various instances of the demo application 108 may be operable to allow users to curate, share, view, and/or track analytics related to product demonstrations, etc., as discussed elsewhere herein, using computer-implemented product demonstration-related and content provision services provided individually and/or collectively by the servers 116, and/or 122, etc., in conjunction with the demo application 108.

In some implementations, the demo application 108 may generate and present various user interfaces to perform these acts and/or functionality, such as the example graphical user interfaces discussed elsewhere herein, which may in some cases be based at least in part on information received from local storage, the demo server 116, and/or one or more of the third-party servers 122 via the network 102. In some implementations, the demo application 108 is code operable in a web browser, a native application (e.g., mobile app), a combination of both, etc. Additional structure, acts, and/or functionality of the client devices 106 and the demo application 108 are described in further detail below with reference to at least FIG. 2.

The demo server 116 and/or the third-party servers 122 may include one or more computing systems having data processing, storing, and communication capabilities. For example, these entities 116 and/or 122 may include one or more hardware servers, virtual servers, server arrays, storage devices and/or systems, etc., and/or may be centralized or distributed/cloud-based. In some implementations, these entities 116 and/or 122 may include one or more virtual servers, which operate in a host server environment and access the physical hardware of the host server including, for example, a processor, memory, storage, network interfaces, etc., via an abstraction layer (e.g., a virtual machine manager).

In the depicted implementation, the demo server 116 may include a demo automation and authoring software (DAAS) module 118. The DAAS module 118 may be operable to create, store, track, host, manage, and/or compute analytics for demos created or accessed by users 112 of the system. The DAAS module 118 may send data to and receive data from the other entities of the system including the demo applications 108 and application engines 124a . . . 124n via the network 102.

The DAAS module and its constituent components may be stored and executable by the demo server 118, may distributed across more than one computing system, such as the demo server 118, a client device 106, and/or one or more third-party servers 122, and/or may be executable by one or more system 100 entities other than the demo server 118.

In addition to the services embodied by the DAAS Module 118, the Demo Server 116 may provide other network-accessible services, such as those discussed elsewhere herein in relation to the third-party servers 122, for example. In addition, while a single demo server 116 is depicted in FIG. 1, it should be understood that one or more demo servers 116 may be included. Additional structure, acts, and/or functionality of the demo server 116 and the DAAS module 118 is further discussed below with reference to at least FIG. 2.

The third-party servers 122a . . . 122n, as depicted, respectively include application engines 124a . . . 124n (also referred to individually and collectively as 124). An application engine 124 may include software, logic, and/or routines operable by a server 122 to provide various services such as video, music and multimedia hosting, distribution, and sharing; email; social networking; blogging; microblogging; photo management; cloud-based data storage and sharing; a combination of one or more of the foregoing services; or any other service where users store, retrieve, collaborate, and/or share information.

In some implementations, the demo application 108, DAAS module 118, and/or application engine 124 may require users 112 to be registered to access the acts and/or functionality provided by them. For example, to access various acts and/or functionality provided by the demo application 108, the DAAS module 118, and/or application engine 124, these components may require a user 112 to authenticate his/her identity (e.g., by confirming a valid electronic address). In some instances, these entities 108, 118, and/or 124 may interact with a federated identity server (not shown) to register/authenticate users 112. Once registered, these entities 108, 118, and/or 124 may require a user 112 seeking access to authenticate by inputting credentials in an associated user interface.

The system 100 illustrated in FIG. 1 is representative of an example system for collaborative design, and it should be understood that a variety of different system environments and configurations are contemplated and are within the scope of the present disclosure. For instance, various functionality may be moved from a server to a client, or vice versa and some implementations may include additional or fewer computing systems, services, and/or networks, and may implement various functionality client or server-side. Further, various entities of the system 100 may be integrated into to a single computing device or system or additional computing devices or systems, etc.

Additional acts, structure, and/or functionality of at least the client devices 106, the demo server 116, the third-party servers 122, and their constituent components are described in further detail below.

Figure 2:
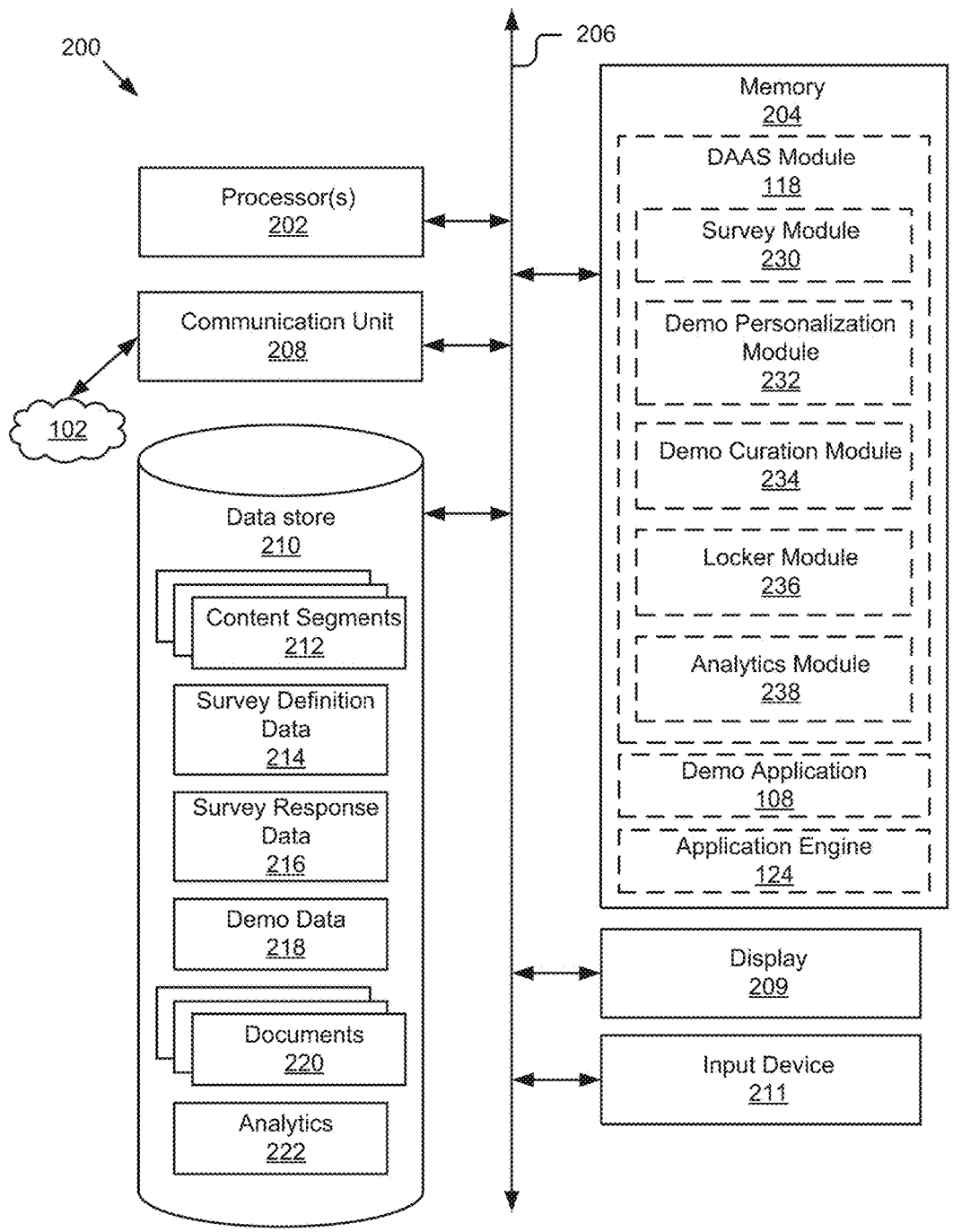
FIG. 2 is a block diagram illustrating an example computing system.

FIG. 2 is a block diagram of an example computing system 200. The example computing system 200 may represent the computer architecture of a client device 106, a demo server 116, and/or a third-party server 122, depending on the implementation. As depicted, the computing system 200 may include a processor 202, a memory 204, a communication unit 208, a data store 210, a display 209, and an input device 211, which may be communicatively coupled by a communications bus 206. The computing system 200 depicted in FIG. 2 is provided by way of example and it should be understood that it may take other forms and include additional or fewer components without departing from the scope of the present disclosure. For instance, various components of the computing devices and may be coupled for communication using a variety of communication protocols and/or technologies including, for instance, communication buses, software communication mechanisms, computer networks, etc.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device, supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the computing system 200 including, for example, the memory 204, the communication unit 208, display 209, input device 211, and the data store 210.

The memory 204 may store and provide access to data to the other components of the computing system 200. The memory 204 may be included in a single computing device or a plurality of computing devices as discussed elsewhere herein. In some implementations, the memory 204 may store instructions and/or data that may be executed by the processor 202. For example, as depicted in FIG. 2, the memory 204 may store the DAAS module 118, the demo application 108, and/or the application engine 124 depending on the configuration. The memory 204 is also capable of storing other instructions and data, including, for example, an operating system, hardware drivers, other software applications, databases, etc. The memory 204 may be coupled to the bus 206 for communication with the processor 202 and the various other components of computing system 200.

The memory 204 includes a non-transitory computer-usable (e.g., readable, writeable, etc.) medium, which can be any tangible apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a computing system or between computing systems, a network bus system including the network 102 and/or portions thereof, a processor mesh, a combination thereof, etc. In some implementations, the DAAS module 118 and various other software operating on the third-party server 122 (e.g., an operating system, device drivers, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102 and/or other computing systems. For instance, the communication unit 208 may include, but is not limited to, CAT-type interfaces; wireless transceivers for sending and receiving signals using Wi-Fi™, Bluetooth®, IrDA™, Z-Wave™, ZigBee®, cellular communications, and the like, etc.; USB interfaces; various combinations thereof; etc. The communication unit 208 may include radio transceivers (4G, 3G, 2G, etc.) for communication with the mobile network 103, and radio transceivers for Wi-Fi™ and close-proximity/personal area (e.g., Bluetooth®, NFC, etc.) connectivity, geo-location transceivers (e.g., GPS) for receiving and providing location information for the corresponding device, and the like. The communication unit 208 may connect to and send/receive data via the mobile network 103, a public IP network of the network 102, a private IP network of the network 102, a personal area network (e.g., Bluetooth® network) 102, etc. For example, the communication unit 208 may receive information from various proximity sensors located within range, and may be coupled to and provide the information via the bus 206 to the processor 202, which may in turn be configured to analyze, process, transmit, and/or display, etc., data based on the information. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

The data store 210 is an information source for storing and providing access to data. In some implementations, the data store 210 may be coupled to the components 202, 204, 208, 209, and/or 211 of the computing system 200 via the bus 206 to receive and provide access to data. In some implementations, the data store 210 may store data received from other elements 106, 116, and 122 of the system 100, and may provide data access to these entities. Examples of the types of data stored by the data store 210 may include, but are not limited to, the content segments 212, survey definition data 214, survey response data 216, demo data 218, documents 220, analytics 222, etc., discussed elsewhere herein.

The data store 210 may be included in the computing system 200 or in another computing system and/or storage system distinct from but coupled to or accessible by the computing system 200. The data store 210 can include one or more non-transitory computer-readable mediums for storing the data. In some implementations, the data store 210 may be incorporated with the memory 204 or may be distinct therefrom. In some implementations, the data store 210 may include a database management system (DBMS) operable on the computing system 200. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

The display 209 may display electronic images and data output by the computing system 200 for presentation to a user 112. The display 209 may include any conventional display device, monitor or screen, including, for example, an organic light-emitting diode (OLED) display, a liquid crystal display (LCD), etc. In some implementations, the display 209 may be a touch-screen display capable of receiving input from one or more fingers of a user 112. For example, the display 209 may be a capacitive touch-screen display capable of detecting and interpreting multiple points of contact with the display surface. In some implementations, the computing system 200 may include a graphics adapter (not shown) for rendering and outputting the images and data for presentation on display 209. The graphics adapter (not shown) may be a separate processing device including a separate processor and memory (not shown) or may be integrated with the processor 202 and memory 204.

The input device 211 may include any device for inputting information into the computing system 200. In some implementations, the input device 211 may include one or more peripheral devices. For example, the input device 211 may include a keyboard (e.g., a QWERTY keyboard), a pointing device (e.g., a mouse or touchpad), microphone, an image/video capture device (e.g., camera), etc. In some implementations, the input device 211 may include a touch-screen display capable of receiving input from the one or more fingers of the user. For instance, the structure and/or functionality of the input device 211 and the display 209 may be integrated, and a user of the computing system 200 may interact with the computing system 200 by contacting a surface of the display 209 using one or more fingers. In this example, the user could interact with an emulated (i.e., virtual or soft) keyboard displayed on the touch-screen display 209 by using fingers to contact the display in the keyboard regions.

As depicted, the DAAS module 118 may include a survey module 230, demo personalization module 232, demo curation module 234, locker module 236, and/or analytics module 238. The components DAAS module 118 may include a survey module 230, demo personalization module 232, demo curation module 234, locker module 236, and/or analytics module 238 may be coupled (e.g., via the processor 202) to one another and the other components of the computing system 200 for communication and interaction. In some implementations, the DAAS module 118, and/or its sub-modules are sets of instructions executable by the processor 202 to provide their functionality. In some implementations, the DAAS module 118 and/or its sub-modules are stored in the memory 204 of the computing system 200 and are accessible and executable by the processor 202 to provide their functionality. In any of the foregoing implementations, the DAAS module 118 and/or its sub-modules may be adapted for cooperation and communication with the processor 202 and other components of the computing system 200.

As depicted in FIG. 2, the DAAS module 118 may include a design management module 230, a feed module 232, a social module 234, an attribution module 236, an analysis module 238, and a search module 240. The components 230, 232, 234, 236, and/or 238 may be communicatively coupled by the bus 206 and/or the processor 202 to one another and/or the other components 204, 208, and/or 210 of the computing system 200. In some implementations, one or more of the components 230, 232, 234, 236, and/or 238 are sets of instructions executable by the processor 202 to provide their acts and/or functionality. In some implementations, one or more of the components 230, 232, 234, 236, and/or 238 are stored in the memory 204 of the computing system 200 and are accessible and executable by the processor 202 to provide their acts and/or functionality. In any of the foregoing implementations, these components 230, 232, 234, 236, and/or 238 may be adapted for cooperation and communication with the processor 202 and the other components of the computing system 200.

The survey module 230 includes computer logic executable by the one or more processors 202 to manage surveys about product demonstrations, also referred to herein as demos, curated by users using the demonstration technology described herein. In particular, the survey module 230 includes computer logic executable to store, retrieve, revise, create, delete, and/or provide the surveys. For clarity, the term product includes a physical product or service or a virtual product or service. In a non-limiting example, the survey presents the viewer with questions about their interests, needs, and profile (whether personal or business), and the responses to the questions are used to personalize the corresponding demo to the user.

To create a survey, the survey module 230 may include computer logic executable to receive survey definition data input by a stakeholder defining the different aspects of the survey. In some implementations, the input defines the questions along with predefined sets of user-selectable answers to be presented to users for completion.

As a further non-limiting example, the stakeholder may input the survey definition data using an interface presented by the demo application 108 operable by the client device 106, and upon completion, the demo application 108 may transmit the survey definition data to the survey module 230 (e.g., operating on the demo server 116), and the survey module 230 receives, processes, and stores the survey definition data 214 (as a survey) in association with the corresponding product in the data store 210.

When a user requests to view a demo via the demonstration system, the survey module 230 is executable to retrieve the corresponding survey from a non-transitory information source, such as the memory 204, the data store 210, etc., and provides the survey for presentation to the user for completion (e.g., via the demo application 108). In some implementations, the demo application 108 may signal the client device 106 to transmit a request via the network 102 (e.g., using HTTP or another suitable protocol) requesting the survey module 230 transmit the corresponding survey, and the survey module 230 may respond in kind. In some implementations, the survey may be cached on a local non-transitory storage device, such as the memory 204, and the client device 106 may retrieve the survey therefrom and present it to the user via a corresponding interface.

In some implementations, the demonstration system creates a context that combines anonymity with the promise of personalized content that encourages users to respond to the questions and in return increases the likelihood of honest responses. The demo viewers are presented with survey questions in a context that includes the demo viewers remaining anonymous while being provided personalized content based on the responses to the survey questions. Based on responses given by the demo viewers to the survey questions, the survey module 230 may provide personalized content and while the analytics module 238 tracks the interaction. In some instances, the interactions are stored in the data storage 210 as well as processed by the analytics module 238, as discussed elsewhere herein.

By way of further non-limiting example, each question or set of questions included in a given survey is related to specific media that is shown to the viewer in the demo based on the responses given. The responses are stored in memory or the data storage 210 which can be accessed by sales and marketing personnel via the demo application 108 in cooperation with the survey module 230 to help effectively market to prospective customers. Furthermore, the surveys include a combination of survey-based questions with related personalized content. This way, the potential customers are aware that they will get personalized content that includes information that most suits their needs. Performing analytics on this data will allow product marketers to utilize resource allocation for feature development.

The demo curation module 230 includes computer logic executable by the one or more processors 202 to curate demos. In particular, the demo curation module 230 may receive demo data defining a given demo. The user may input the demo data using interfaces presented by the demo application 108, and the demo application 108 may be communicatively coupled with the demo curation module 230 to send the demo data to the demo curation module 230 for processing and storage thereby. The demo curation module 230 is coupled to the data store 210 to retrieve and/or store demo-related data, such as content segments 212, survey definition data 210, demo data 218, documents 220, and user profile data 222.

Figure 5:
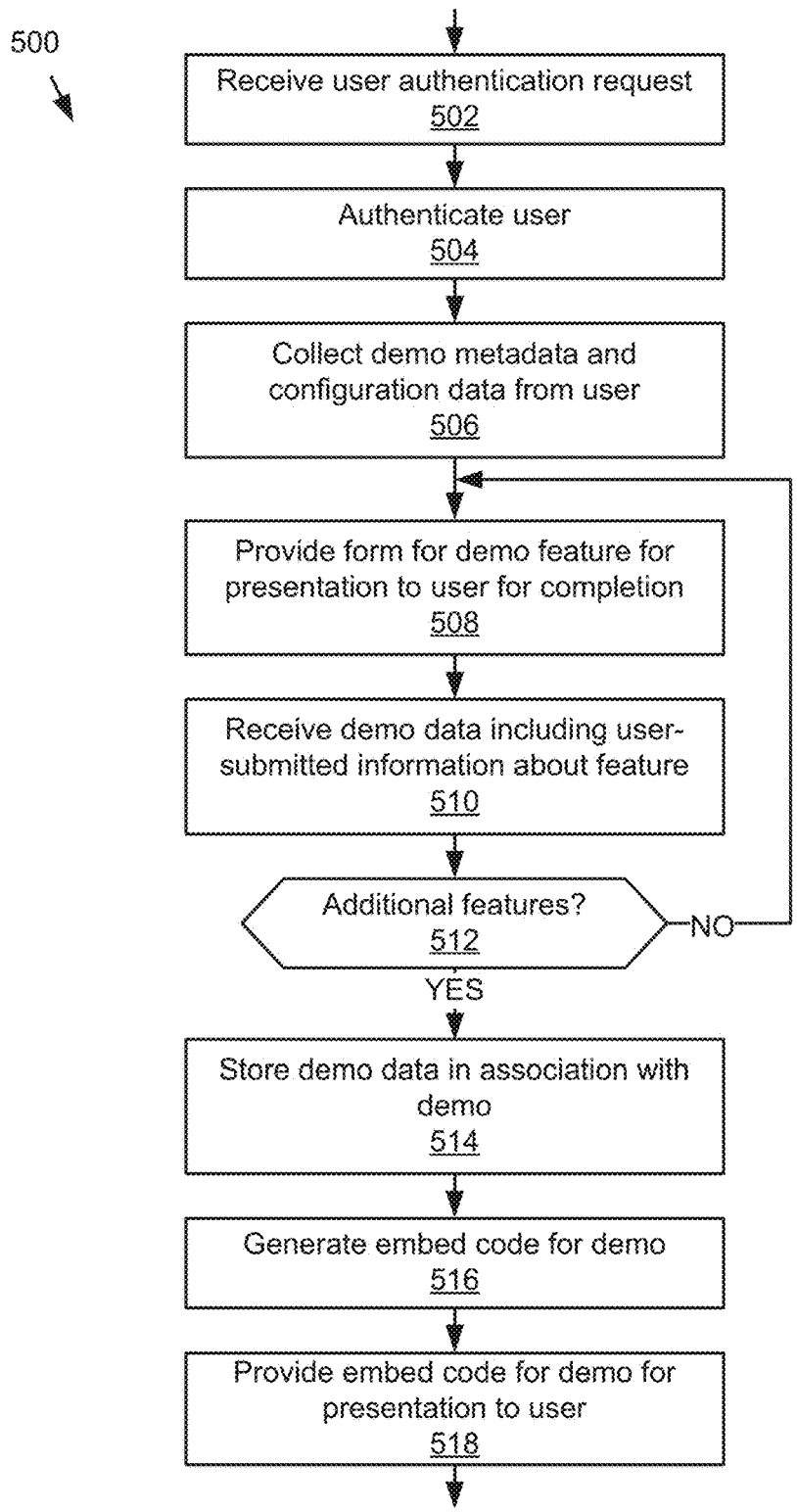
FIG. 5 is a flowchart depicting an example method 500 for curating a demo.

FIG. 5 is a flowchart depicting an example method 500 for curating a demo. In block 502, the DAAS module 118 receives a user authentication request. While not depicted, the DAAS module 118 and authentication module for authenticating users seeking to access the demo creation aspects of the DAAS module 118, and this module may receive the user authentication request in block 502, process the request, and authenticate 504 the user using standard authentication protocols. In some implementations, upon authenticating the user, the authentication module may provide an authentication token to the demo application 118 establishing the user's identity.

In block 506, responsive to the user being authenticated, the demo curation module 236 collects demo metadata and configuration data from the user. In some implementations, the demo application 108 presents forms to the curating user requesting the user input the configuration data. Non-limiting examples of configuration data include administrative information and metadata, such as a title, description, and logo for the demo, an introductory video for the demo, contact information for contacting a demo stakeholder, calls to action, any product offers and/or incentives, theme configuration data, and analytics configuration data and marketing data, etc.

In block 508, the demo curation module 234 provides a set of forms for presentation to the user creating the demo for completion. For example, in block 508, for each feature of the product to be demonstrated, the demo curation module 234 provides a form to the demo application 108 for completion by the user, and in block 510, the demo curation module 234 receives form data (demo data) which includes the user-submitted information about that feature of the product.

As a further example, the form is rendered and presented to the user by the demo application 108, and responsive thereto, the user completes and submits the form, and the demo application 108 provides the demo data input by the user for that feature back to the demo curation module 234 for processing and/or storage. Non-limiting examples of the different forms and type of information that can be input by the user are described with reference to at least FIGS. 6A-6N, although should be understood that any information applicable to the demo may be input and submitted as demo data to the demo curation module 234, and the demo curation module 234 is configured to process that information accordingly.

In block 512, upon receiving the demo data (incrementally, in bulk, etc.), the demo curation module 234 processes the demo data according to the future to which it corresponds and stores it in block 514 accordingly in the data store 210, as discussed elsewhere herein. Upon completion of the demo, the demo curation module 234, and generate in block 516 and provide in block 518 the embed code for presentation to the user, which the user can use to embed the demo in another application, such as website associated with the product being demonstrated.

By way of further illustration and not limitation, the method 500 is advantageous as it allows a stakeholder to easily create a dynamic demo that is easily customizable in real-time to differing needs of the stakeholder's potential customers. For example, the stakeholder logs into the demonstration system through an application interface (e.g., a web interface), selects a button to create a new product demo, fills out online forms for demo properties, adds custom questions for personalization survey, uploads a short summary video and a longer in-depth video for each feature (e.g., topic), finishes creating the demo and embeds the demo into a website he/she administers using embed code provided by the demonstration system, which allows the stakeholder's customers to view the demo via the website, as discussed elsewhere herein.

Figure 6A:
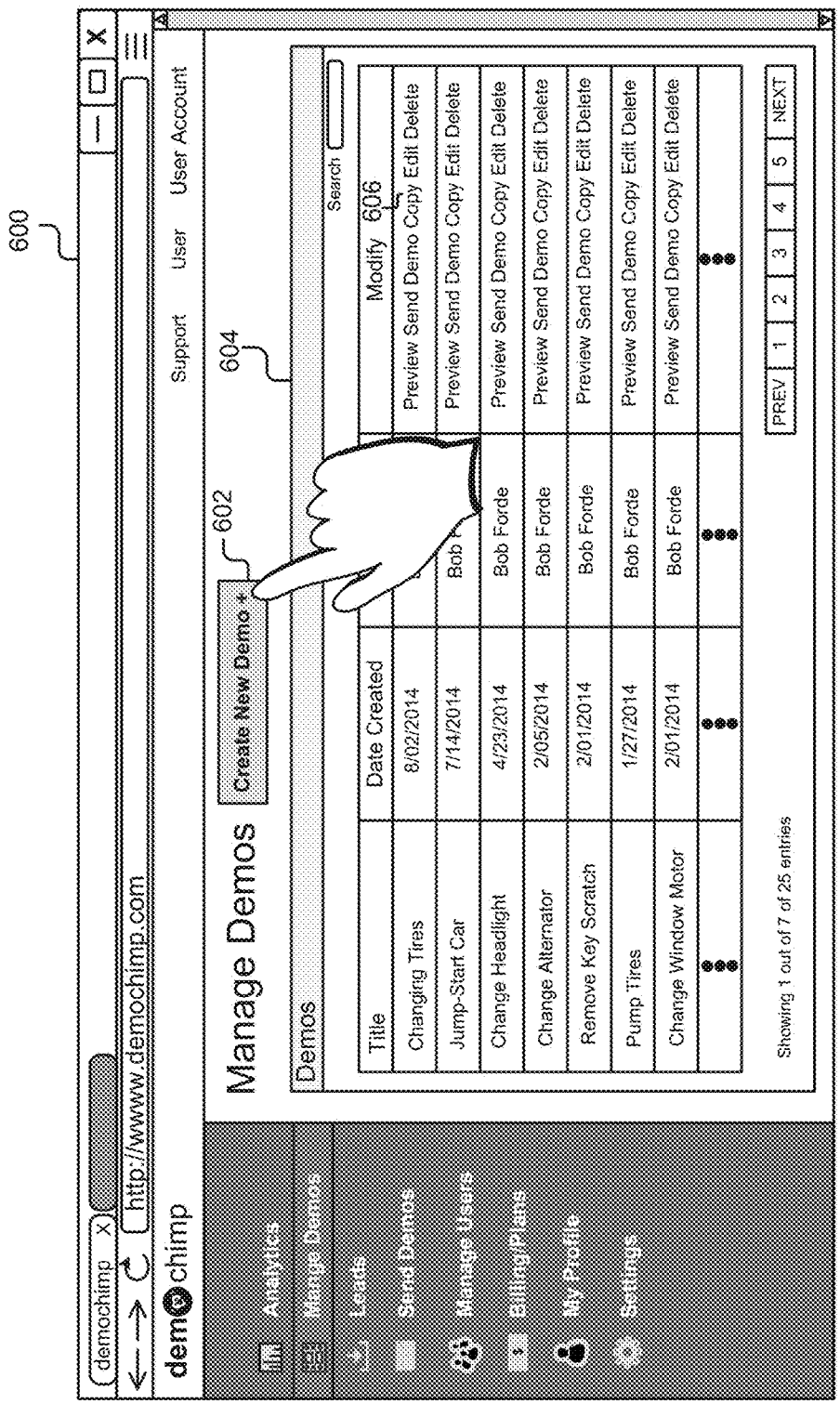
FIGS. 6A-6P depict example user interfaces for curating a demo using the demonstration system.
Figure 6B:
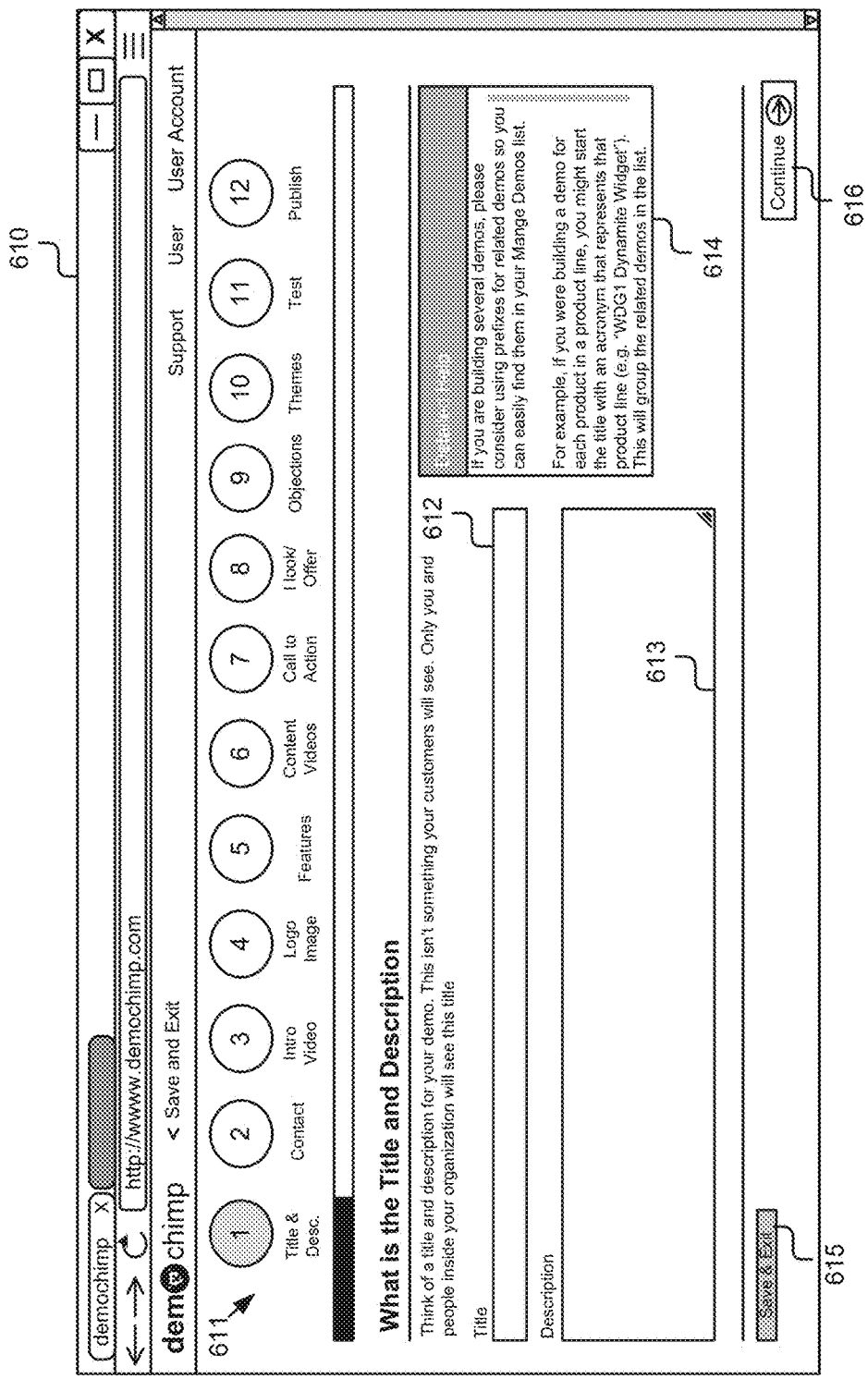
Figure 6C:
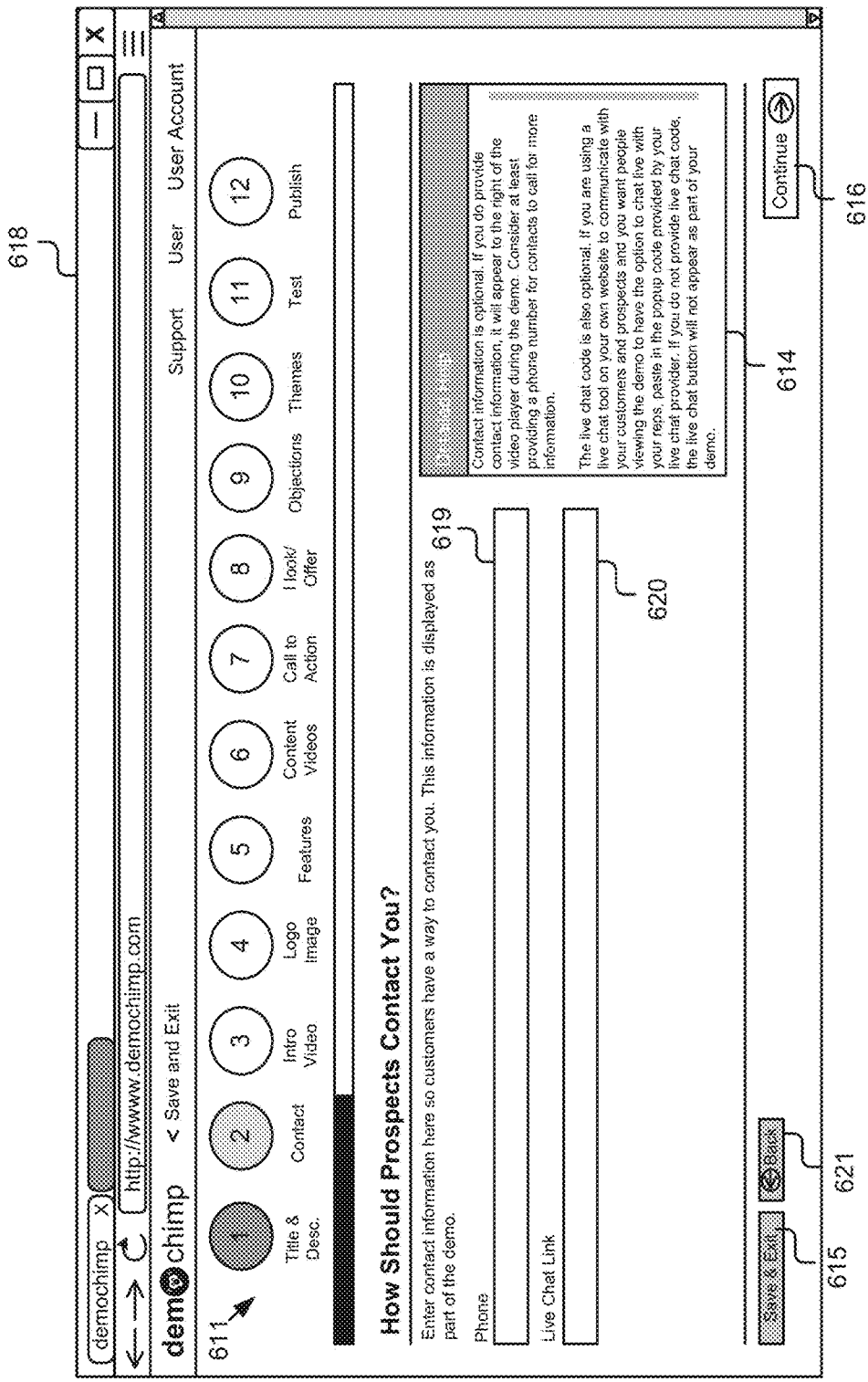
Figure 6D:
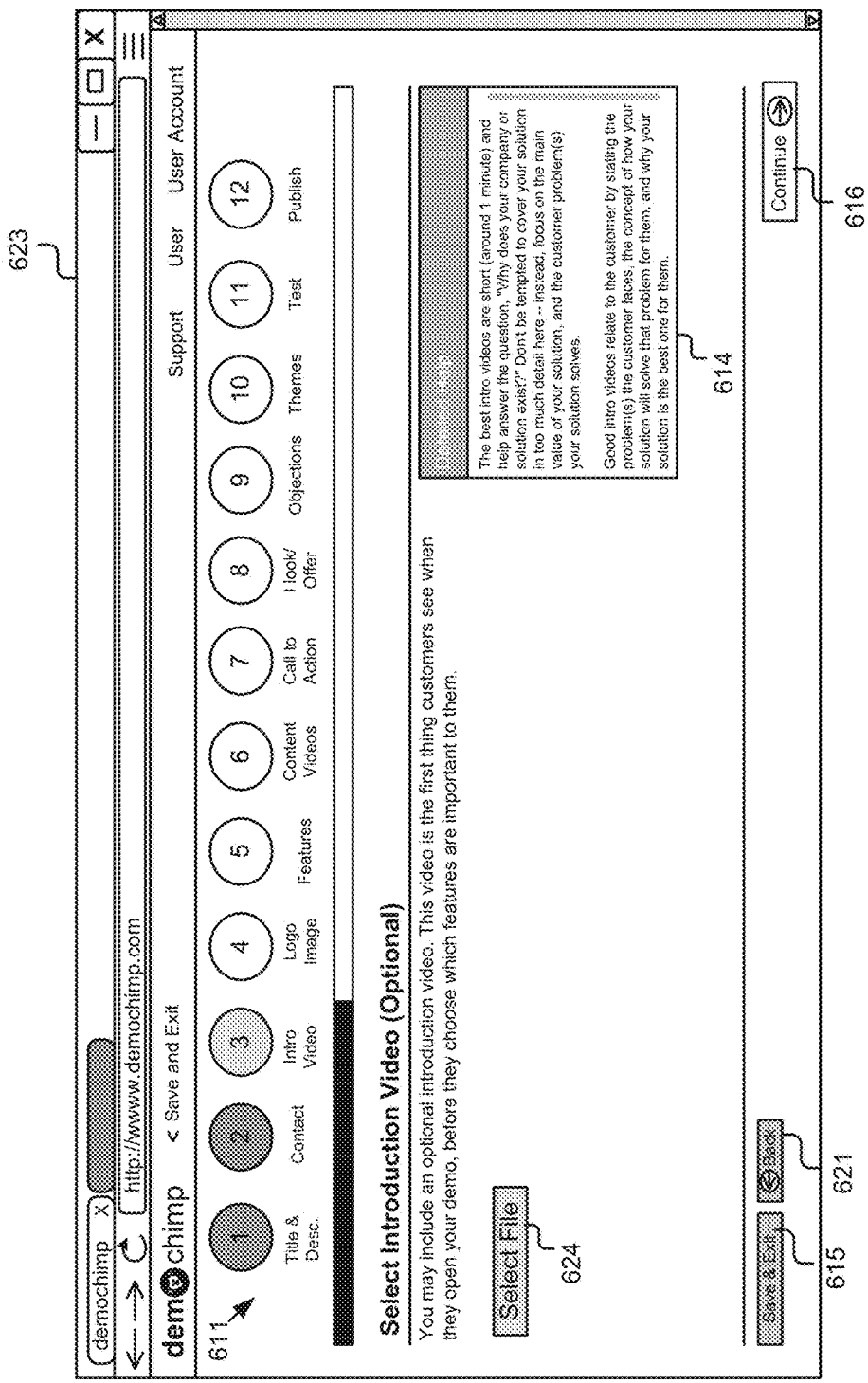
Figure 6E:
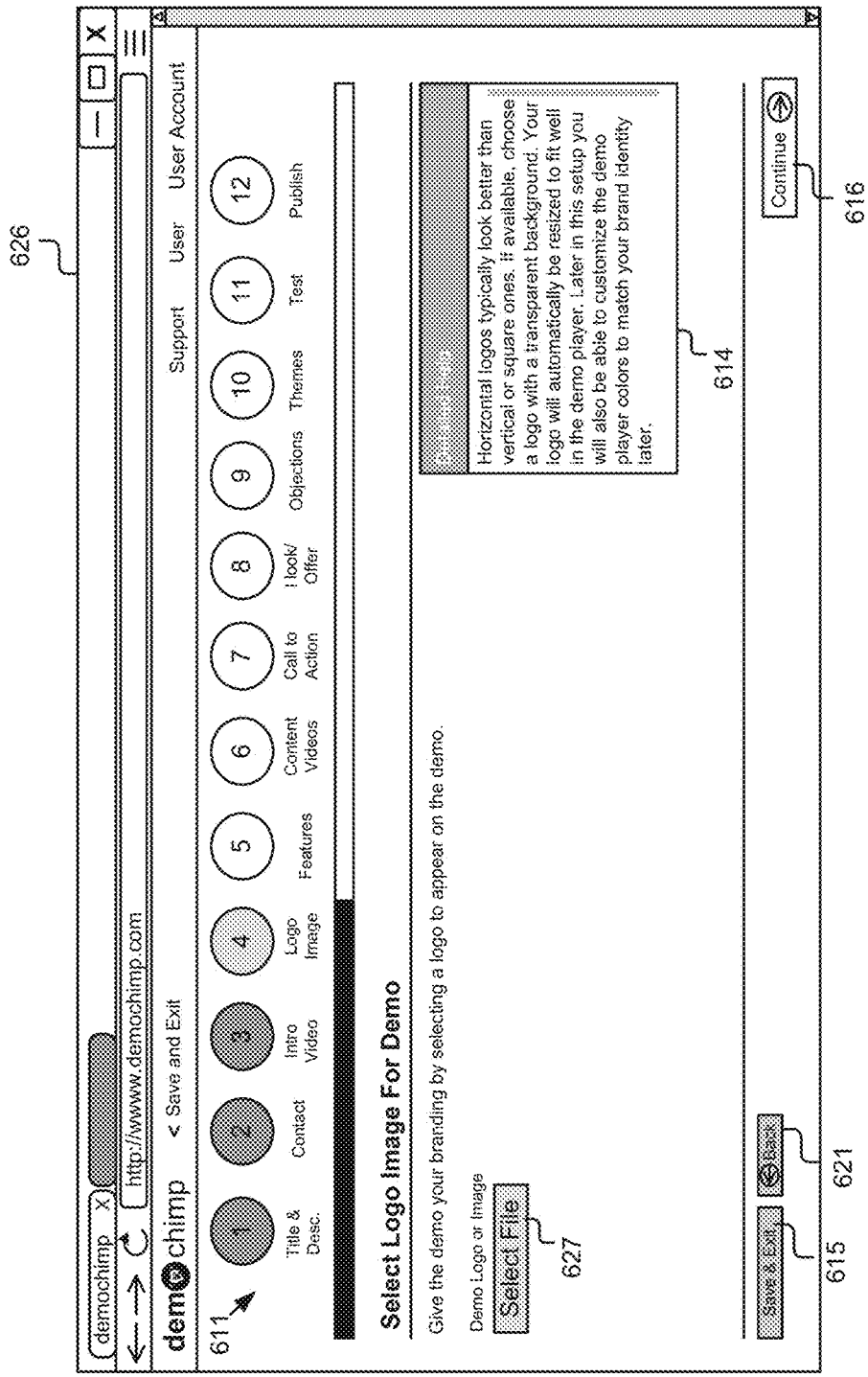
Figure 6F:
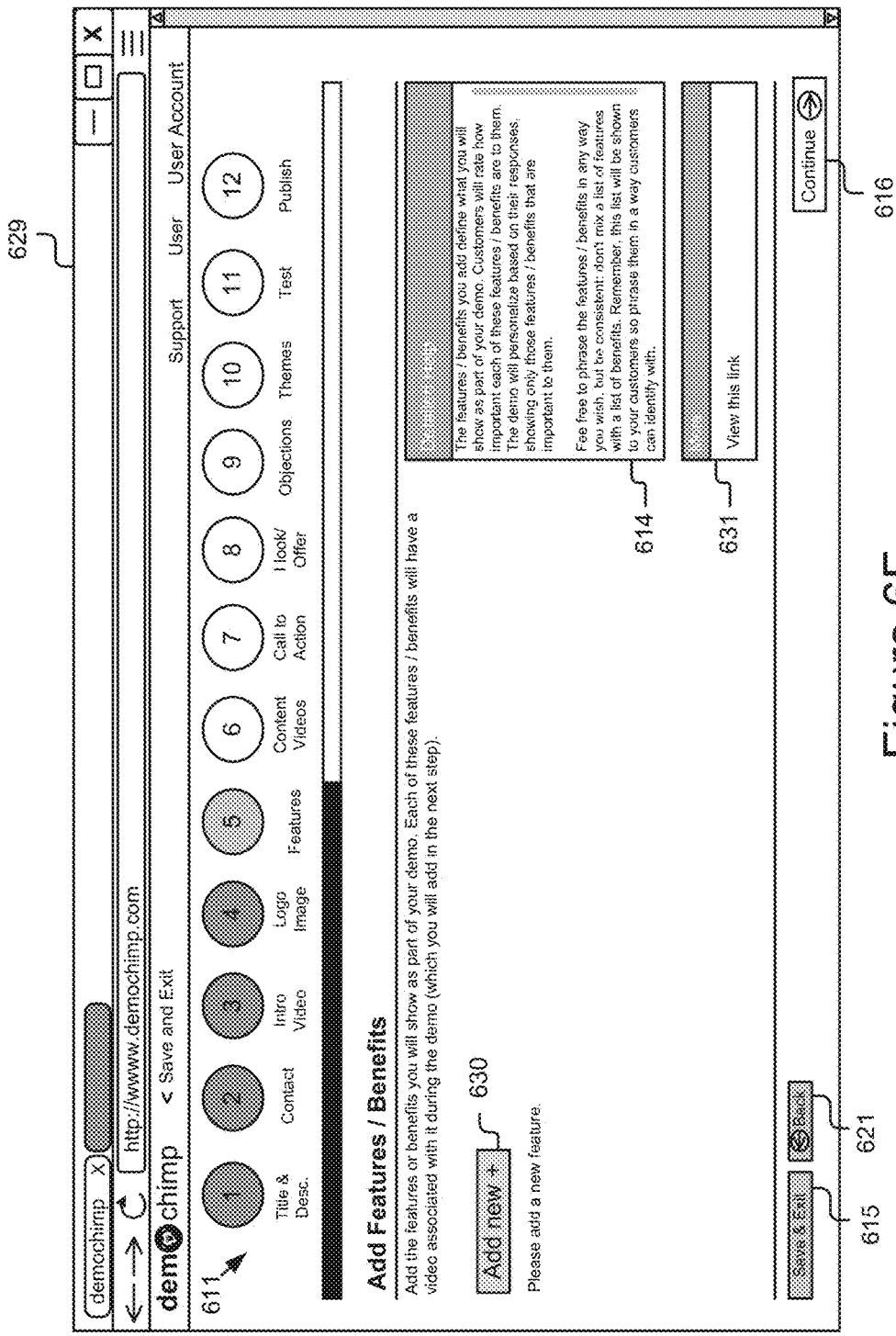
Figure 6G:
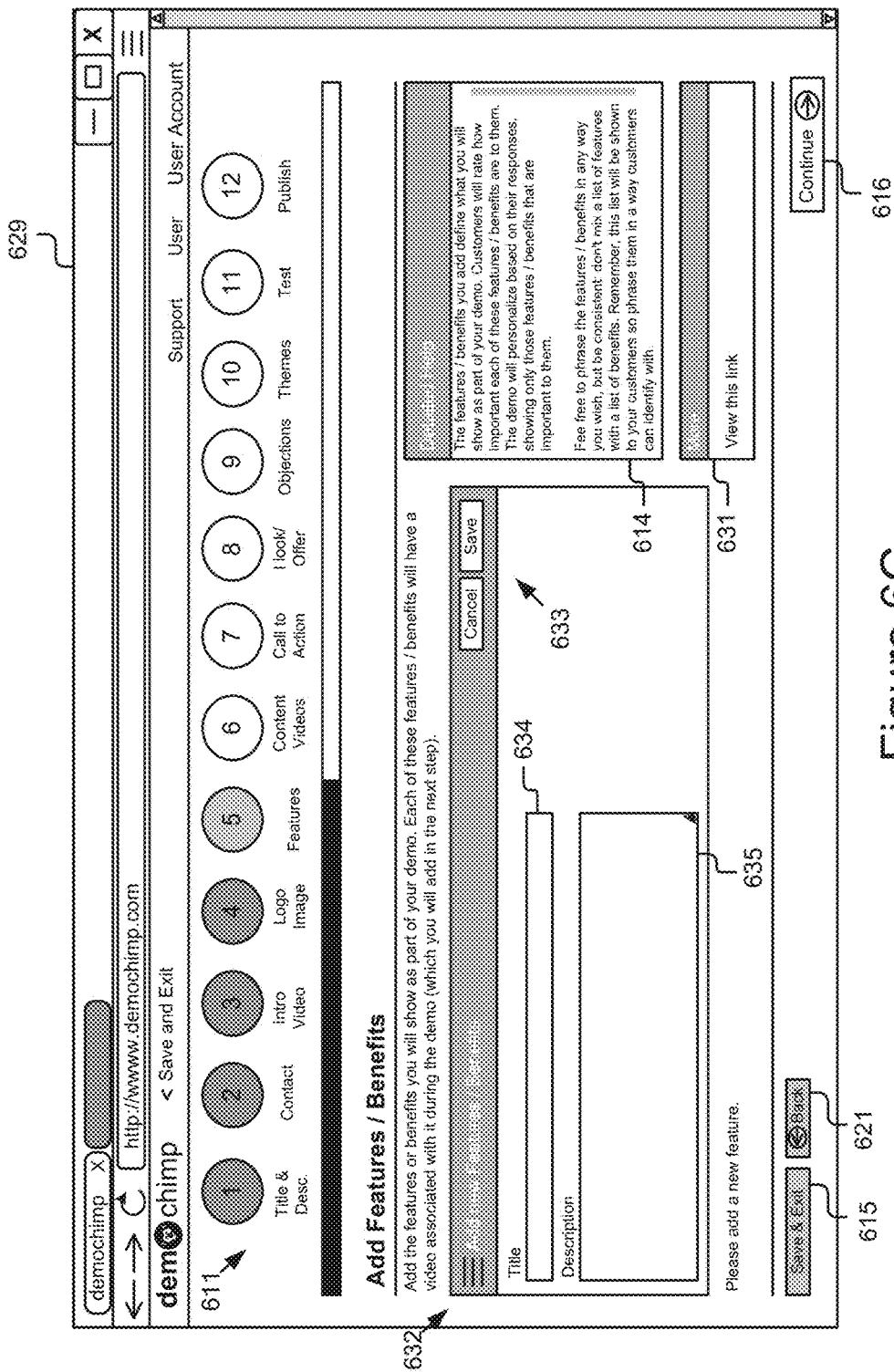
Figure 6H:
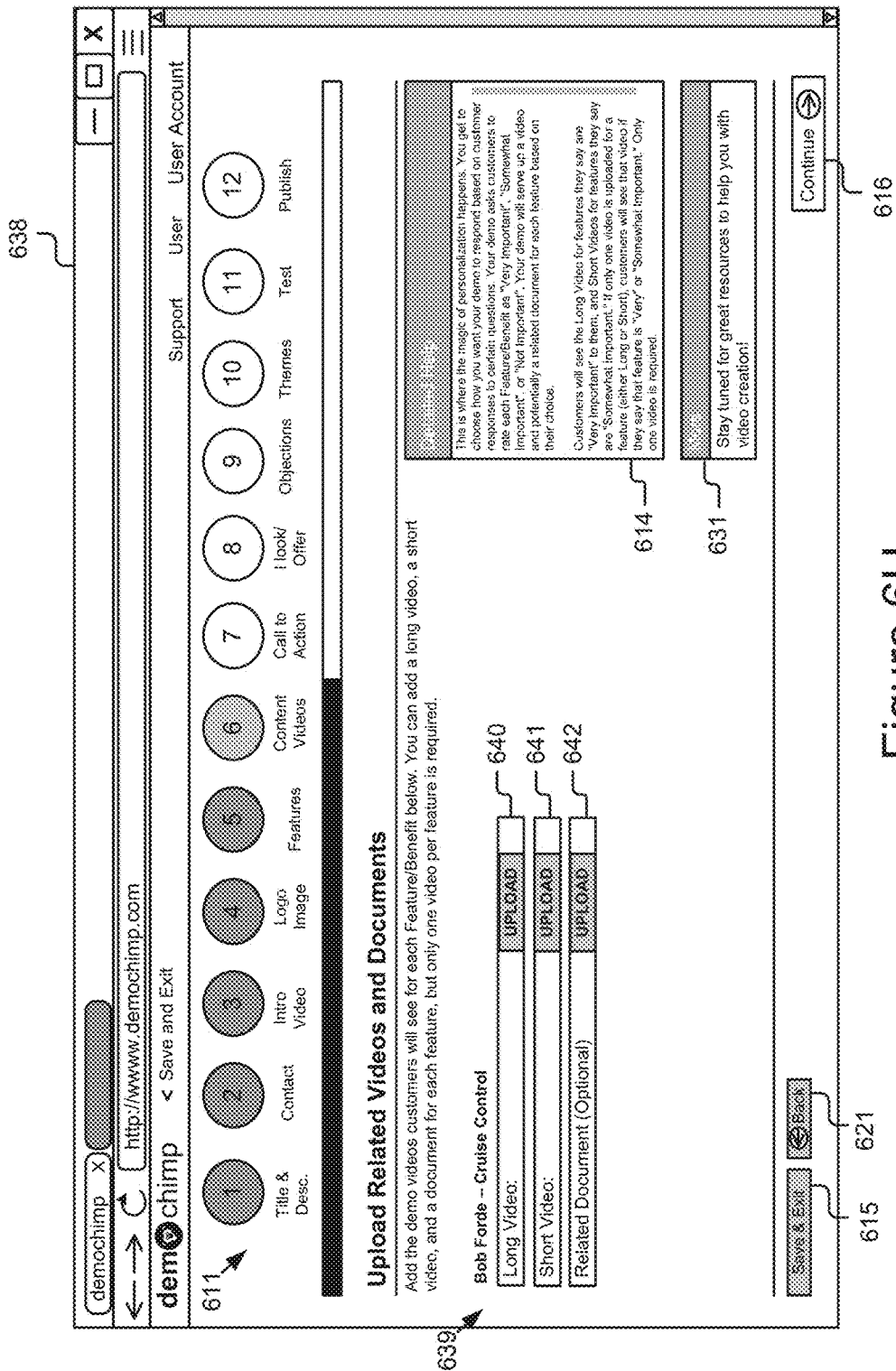
Figure 6I:
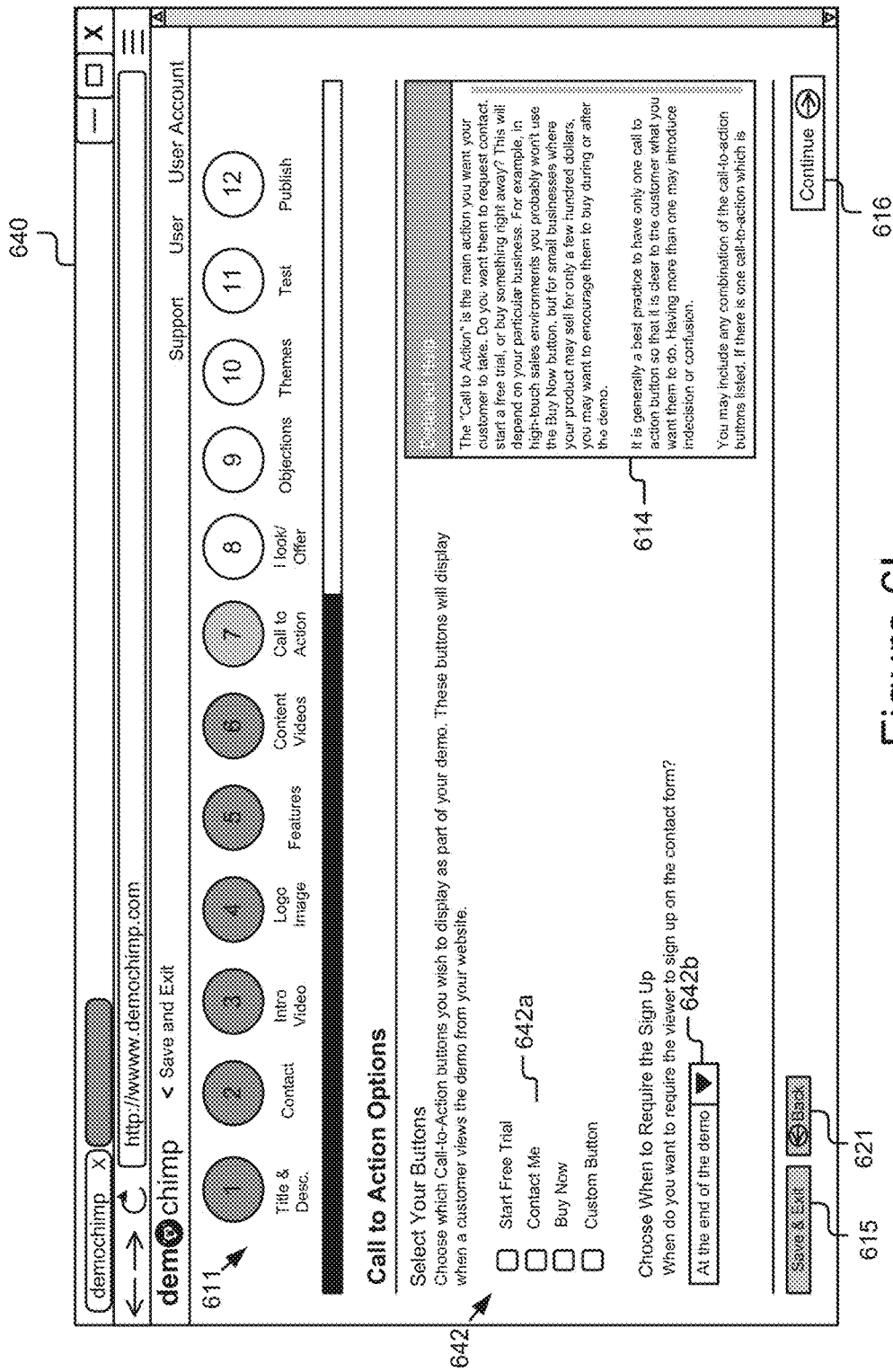
Figure 6J:
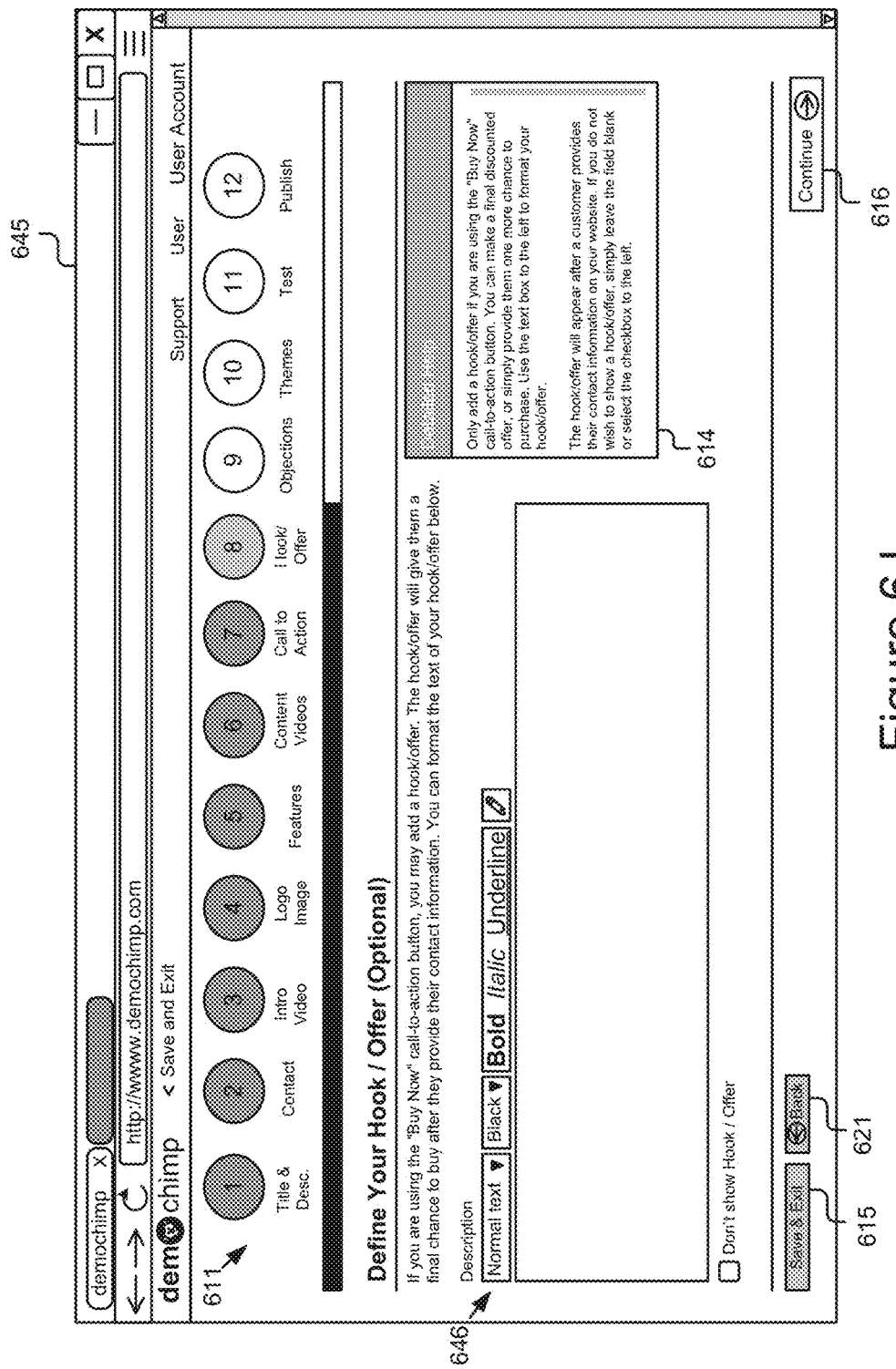
Figure 6K:
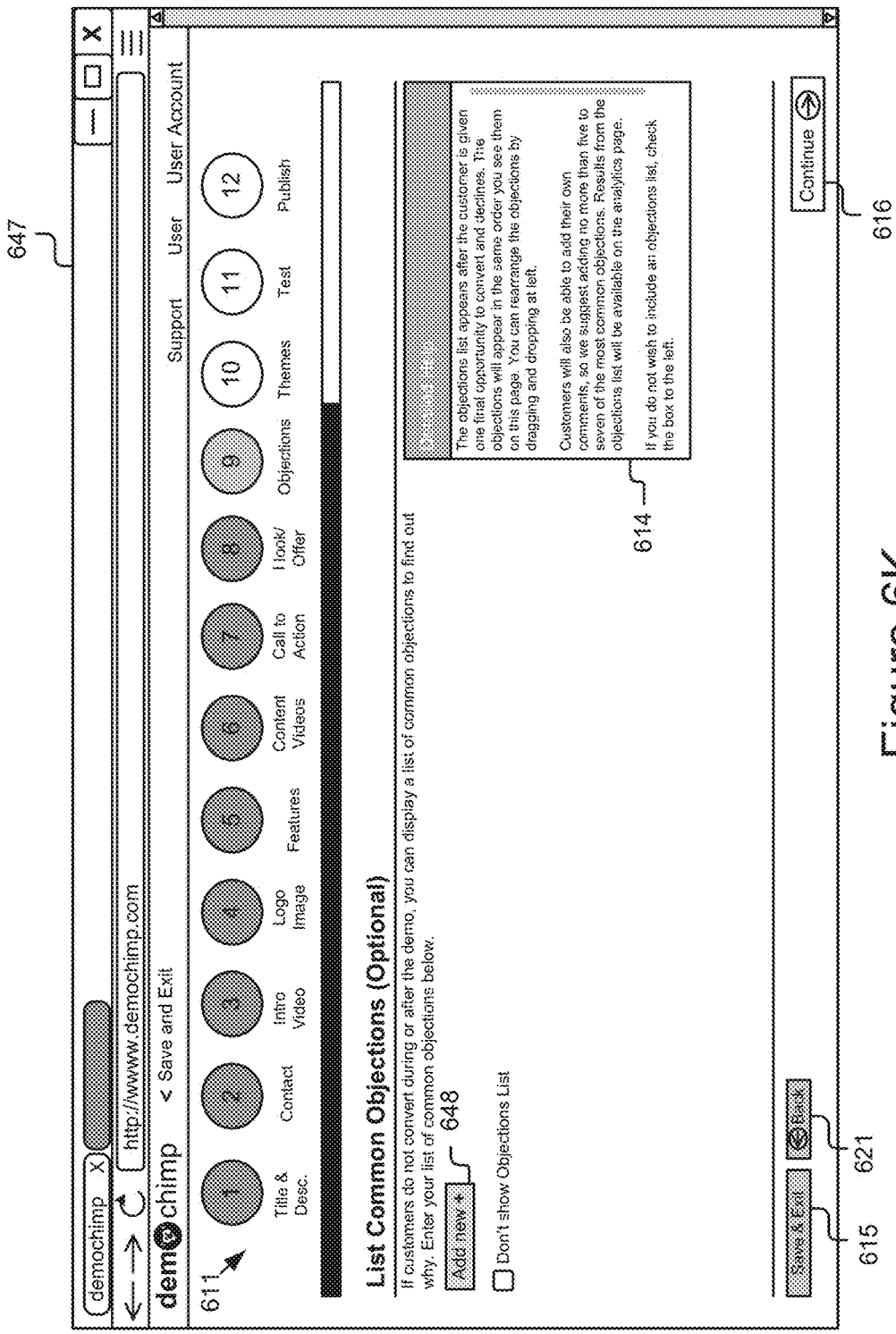
Figure 6L:
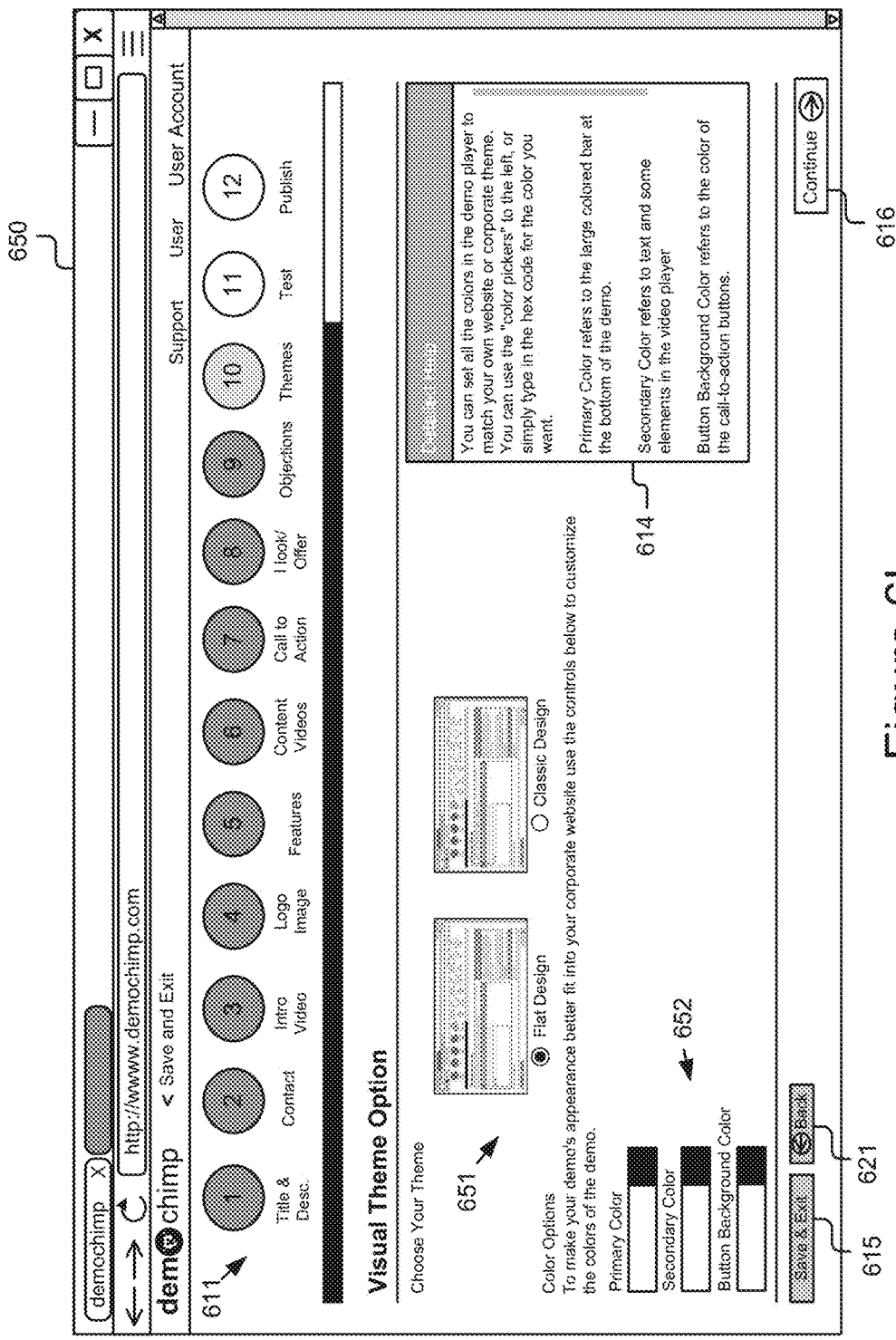
Figure 6M:
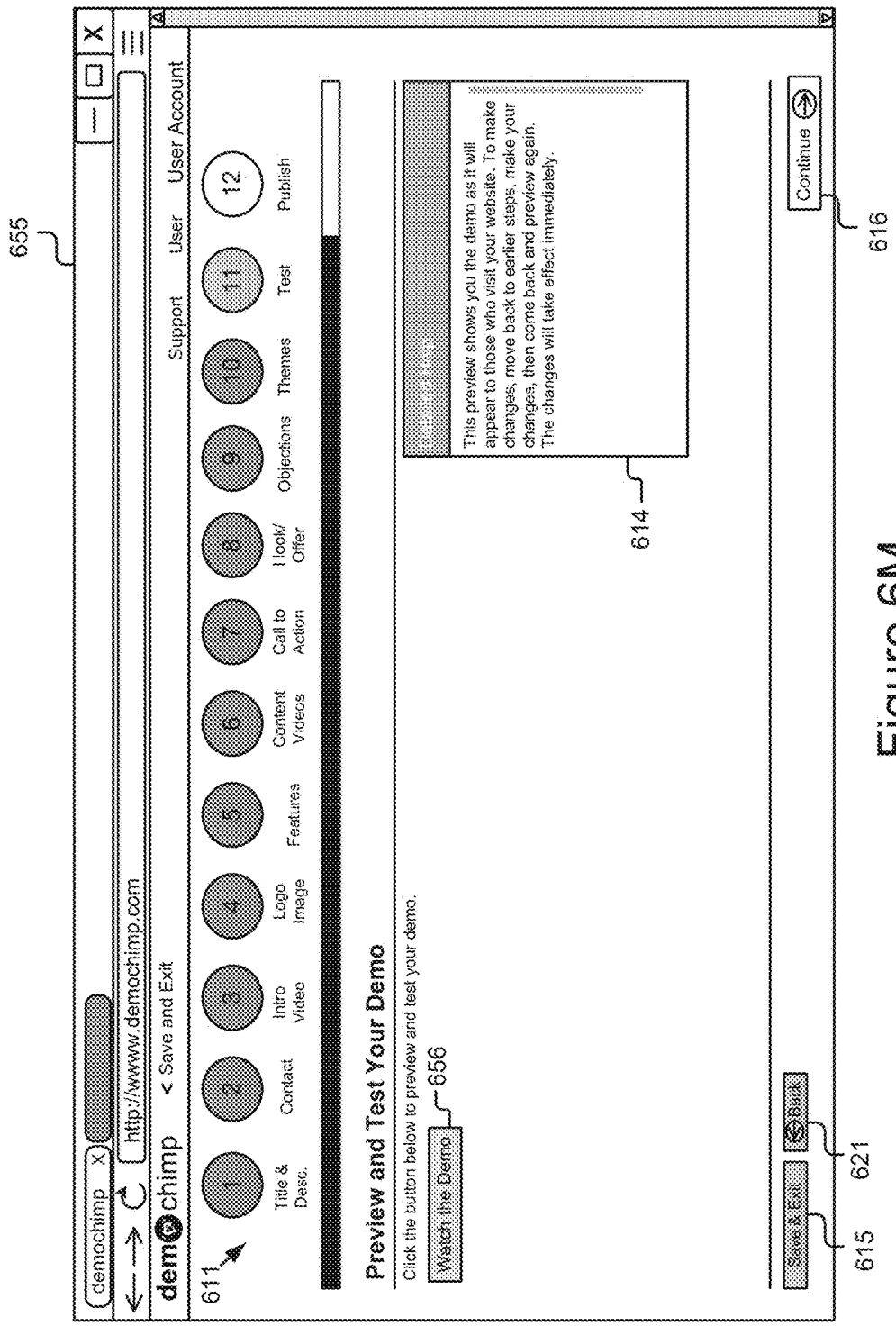
Figure 6N:
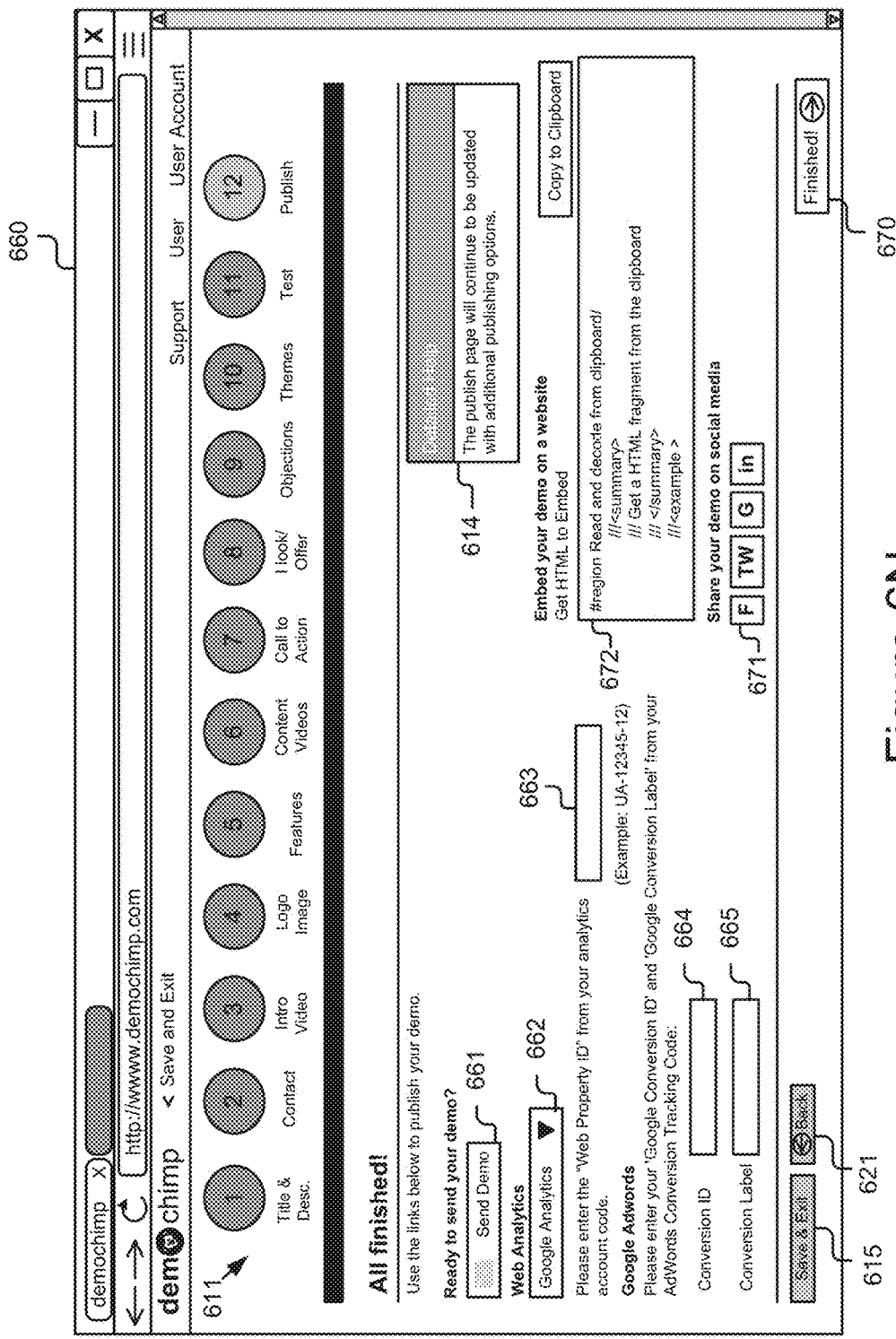
Figure 60:
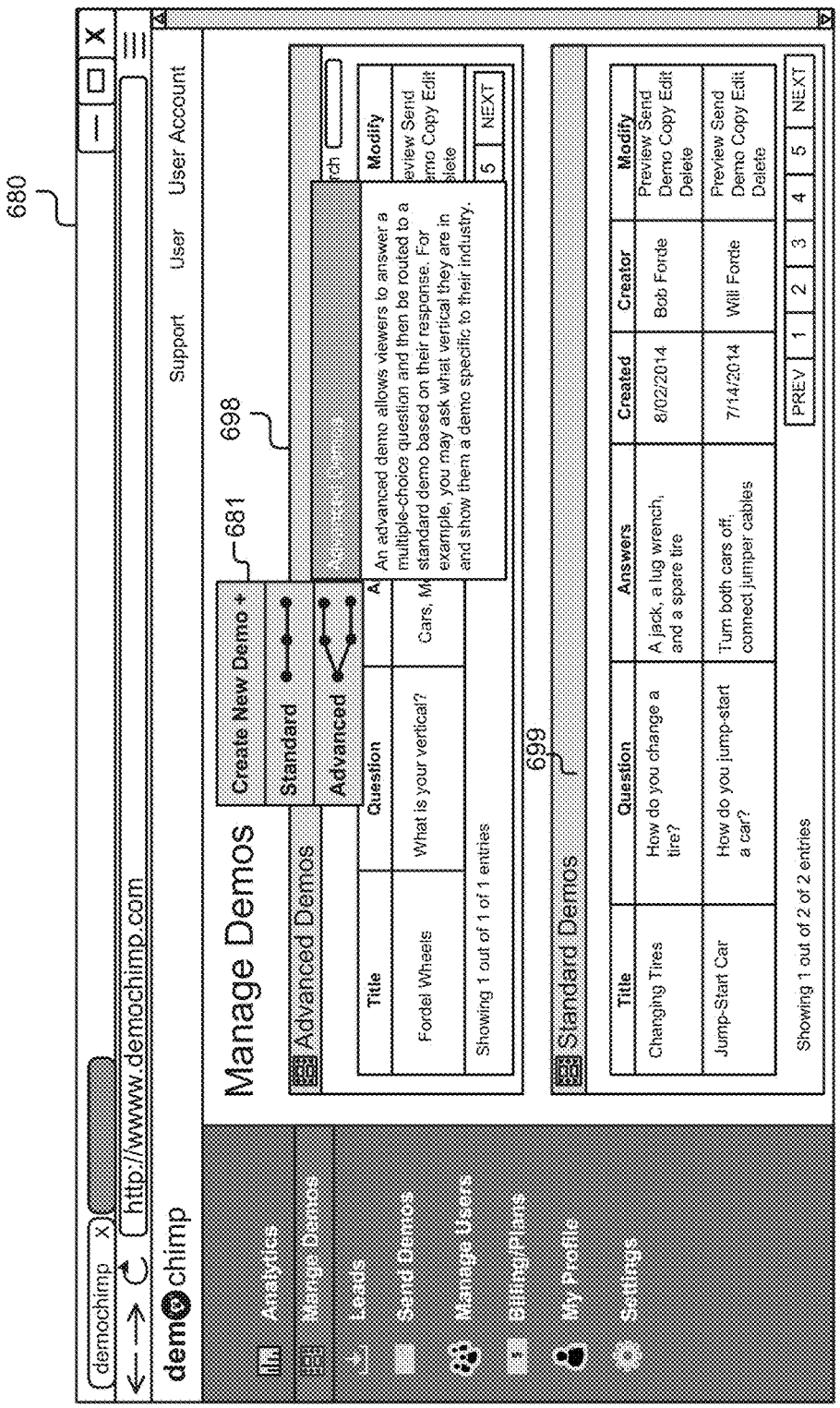

FIGS. 6A-6N depict example user interfaces for curating a demo using the demonstration system. In FIG. 6A, the interface 600 includes a button 602 selectable by a user, such as a sales person, marketer, etc., to initiate the creation of a new demo. In response to selecting the button 602, the demo application 108 presents a demo creation wizard. Examples interfaces for the demo creation wizard are depicted in FIGS. 6B-6N. The interface 600 also includes a list of previously created demos associated with the user along with options for previewing, sending, copying, editing, and deleting the demos. In some implementations, a user may create a new demo based on an existing demo by selecting a copy option 606.

In FIG. 6B, the interface 610 includes a form having a progress region 611 indicating the user's progress in creating the demo and fields for inputting information about a certain aspect of the demo. The progress region 611 provides a map of the curation process and allows the user to jump back and forth between the different steps/aspects (e.g., by selecting the corresponding circle in the progress region). In this case, the aspect associated with the form is general information about the demo and the form includes fields for inputting metadata, such as but not limited to a title field 612 and a description field 613. The interface 610 also includes a help region 614 including helpful advice on how best to complete the form, a save and exit button 615 selectable by the user to save the demo so the user can return later to complete it, and a continue button 616 to continue to the next aspect of the demo.

In FIG. 6C, the interface 618 includes the progress region 611 indicating the user has advanced to the form for the next aspect, which is to inform prospects about how to contact the user regarding the demo. The interface 618 includes corresponding form fields, such as a phone field 619 and a live chat link 620, which the user may populate with corresponding information. It should be understood that different and/or additional fields for other contact information may also be included. In addition, profile information from the user's user profile stored in the data storage 210, such as an email address and personal or business information about the user or other points of contact may also be retrieved and provided to prospects when the aspect associated with this form is presented to a prospect. The interface 618 also includes the help field 614, the save and exit button 615, a back button 621 selectable by the user to return to the previous step, and the continue button 616.

In FIG. 6D, the interface 623 includes the progress region 611 indicating the user has advanced to the form for the next aspect, which is an introduction video about the product being demonstrated. The interface 620 includes a button 624 selectable by the user to provide a dialog for selecting a video file to use as the introduction video. In some implementations, selecting the select file button 624 results in the demo application 108 presenting a file selection dialog displaying the local and/or remote file(s) available to the user. In some instances, the user may not only select video documents from a file system of the client device, but may select video documents hosted remotely, such as on a network file system, a video service hosted by a third party server 122 and embodied by a third-party application engineer 124 (e.g., YouTube™), or any other suitable information source. In these instances, in response to the completion of the selection of the video document(s) by the user, the demo application 108 initiates the uploading of the video document(s) to the computing system hosting the demo and corresponding content segments 212, such as the demo server 116 or a third-party server 122 from the source location of the file, whether it be local or remote. This computing system may receive the video document(s) and store them as content segment(s) 212 in the data store 210 for later access and/or retrieval as discussed elsewhere herein.

The interface 623 also includes the help field 614, the save and exit button 615, the back button 621, and the continue button 616.

In FIG. 6E, the interface 626 includes the progress region 611 indicating the user has advanced to the form for indicating a logo image for the demo. As with the interface 623 in FIG. 6D, the interface 626 includes a button 627 selectable by the user to provide a dialog for selecting, in this case, an image file to use as the logo for the demo. The process for selecting the file, and the storage thereof in the data store 210, is substantially the same as in FIG. 6D and will not be repeated here for brevity. The interface 623 also includes the help field 614, the save and exit button 615, the back button 621, and the continue button 616.

As with the interface 623 in FIG. 6D, the interface 626 includes a button 627 selectable by the user to provide a dialog for selecting, in this case, an image file to use as the logo for the demo. The process for selecting the file, and the storage thereof in the data store 210, is substantially the same as in FIG. 6D and will not be repeated here for brevity. The interface 623 also includes the help field 614, the save and exit button 615, the back button 621, and the continue button 616.

In FIG. 6F, the interface 629 includes the progress region 611 indicating the user has advanced to the form for indicating the specific features (e.g., benefits, etc.) covered by the demo. The interface includes an add new button 630 the help field 614, a more field 631 including additional resources associated with the form, the save and exit button 615, the back button 621, and the continue button 616. The ad new button 630 is selectable by the user to display the dialogue 632 depicted in FIG. 6G. The dialogue 632 includes various elements for defining the new feature, such as but not limited to the title field 634, the description field 635, and menu options 633, such as cancel and save options. The user may input a title for the feature in the title field 634, and description of the feature in the description field 635. By selecting the save option in the menu options, the information input by the user about the new feature is saved by the demo application 108. The more field 631 includes additional resources for the user, such as a link to preview what the interface for new feature looks like.

In FIG. 6H, the interface 638 includes the progress region 611 indicating the user has advanced to the form for providing resources for the features added using the interface 629, as described in FIGS. 6F and 6G. This interface includes a resource indication region 639, the help field 614, the more field 631, the save and exit button 615, the back button 621, and the continue button 616. The resource indication region 639 includes options selectable by the user to add various resources related to each of the newly added features for consumption by the viewers of the demo. For a given feature, the user may input more than one resource. In some implementations, the resources for a given feature input by the user and be complementary to one another or mutually exclusive. For example, one resource may be directed to a certain type of audience, and another resource may be directed to another type of audience. In a further example, a resource may complement another resource. For example, the user may input a document complementing a video also inputted by the user. The document may then be placed in a document locker during playback of the demo to a prospect, as discussed elsewhere herein. Numerous other variations as to the mix, length, and subject matter of the resources are also possible and contemplated.

In the depicted implementation, for the feature of cruise control, the user may input a long video about the cruise control feature by selecting the long video button 639*a* and a short video about the cruise control feature by selecting the short video button 639*b*. The user may also input one or supplemental documents related to the feature (e.g., articles about the feature, digital photos of the feature, etc.) by selecting the related document button 639*c*. Then, on playback of the demo, the demo personalization module 232 (e.g., see FIG. 2) is executable to select the appropriate video based on the survey response completed by the viewing user (e.g., the prospect) and present corresponding related documents in the document locker, as discussed elsewhere herein.

In FIG. 6I, the interface 640 includes the progress region 611 indicating the user has advanced to the form for calling the viewer to action. The interface includes an action region 642 having elements 642*a* for selecting predefined action options to be presented to a viewer of the demo, such as but not limited to, start a free trial, contact me, buy now, and the custom button that the user creating the demo may customize to his or her needs. The action region 642 also includes a selector 642*b* for selecting where to place the call to action page within the demo. The demo application 108 may transmit demo configuration data indicating ordering information for where to place the call to action page within the demo when creating a personalized demo for a user (e.g., prospect).

In FIG. 6J, the interface 645 includes the progress region 611 indicating the user has advanced to the form for inputting an offer in association with the buy now action element 642*a* in FIG. 6I. For example, if a prospect selects the buy now option while viewing the demo, the demo application 108 will present the offer input in the form depicted in FIG. 6J. As depicted, the interface 645 includes elements for inputting and formatting a textual description of the offer should be understood that the offer can include graphics and other content and, while not depicted, the interface may provide corresponding elements for inputting such content.

In FIG. 6K, the interface 647 includes the progress region 611 indicating the user has advanced to the form for configuring objections that a viewer might have when viewing the demo. The interface 647 includes an add new button 648, the help field 614, the save and exit button 615, the back button 621, and the continue button 616. The ad new button 648 is selectable by the user to display an input field for defining the objection type. Any number of objection types may be configured using the add new button 648. In some implementations, the user may select to omit the objections page in the demo (e.g., by selecting a corresponding checkbox).

In FIG. 6L, the interface 650 includes the progress region 611 indicating the user has advanced to the form for configuring the visual theme for the demo. The interface 650 includes theme selection region 651 including various pre-configured theme options that can be applied to the demo, and a color options 652 region for configuring colors for different elements of the visual theme (e.g., primary color, secondary color, button color, etc.). The interface 623 also includes the help field 614, the save and exit button 615, the back button 621, and the continue button 616.

In FIG. 6M, the interface 650 includes the progress region 611 indicating the user has advanced to the form for testing the demo as configured in the previous steps. The interface 650 includes a button selectable by the user to watch the demo, and upon doing so, return to any prior steps to revise the demo if necessary. Upon selecting the button 656, the demo application 108 may request the demo personalization module 232 generate and provide the demo data file to the demo application 108 for rendering to the user in an interface including options for the user to scrub, pause, etc., as discussed elsewhere herein.

In FIG. 6N, the interface 660 includes the progress region 611 indicating the user has completed the demo and advanced to the form for publishing the demo. The interface 650 also includes a button 661 selectable initiate sending the demo to one or more prospects, as discussed elsewhere herein, a selector 662 for selecting which analytics engine to use to track web analytics for the demo and a corresponding field 663 for inputting identifying information associated with the analytics engine, and marketing information for advertising the demo, such as advertising copy-related information (e.g., Google Adwords™ information such as a conversion ID and a conversion label using guilds 664 and 665).

The demo data input into the example interfaces described in reference to FIGS. 6A-6N, when submitted, is transmitted in a request by the demo application 108 to the demo curation module 234 for processing and storage thereby. The demo data includes information about each feature of the demo and the demo curation module 234 may process the data for each of these features and store them in association with those features in the data store 210. For example, the demo curation module 234 may store the content segments 212 uploaded via the interface 638 in the data store 210 in association with the features to which those content segments 212 correspond. The demo curation module 234 may store any documents uploaded using the interface 238 as documents 220 in association with the features to which those documents 220 correspond. These documents 220 may then be used in conjunction with the locked document library feature discussed elsewhere herein. In addition, in the metadata, options, descriptors, configuration data, and other information, may be stored as demo data 218 in the data store in association with the demo and the aspects of the demo to which they correspond.

The demo personalization module 232 includes computer logic executable by the one or more processors 202 to personalize a demo to survey response data 216 input by the user in response to being presented with a survey. Each product has a unique set of features (e.g., benefits, topics, etc.) that can be covered by corresponding demo. These features are embodied by content segments 212 stored in the data store 210. In some implementations, a given feature may be explained at different density levels (in different levels of detail). As a result, or more instances of a content segment 212 having differing levels of detail may be stored in the data store.

A demo is embodied by a data file dynamically customized and rendered for presentation (audio, visual, sensory, etc.) to the user. To customize a given demo data file for a particular product to a particular user, the demo personalization module 232 includes computer logic executable to retrieve user-submitted responses to a survey about the product from a non-transitory information source, such as the memory 204 and/or the data store 210, and uses the responses to determine which content segments 212 to generate the demo data file with. Stated another way, the data store 210 may store a library of content segments 212 for each product, and the demo personalization module 232 includes computer logic executable to selectively determine which of the content segments 212 to include in a customized demo based on the user-submitted responses to a corresponding survey for that product.

In determining which content segments 212 with which to generate the demo data, the demo personalization module 232 includes computer logic executable to query the data store 210 using the responses to determine which of the content segments match the survey responses. In some implementations, in executing the query, the demo personalization module 232 matches responses to the questions of the survey to corresponding entries in database storing the library of content segments for the demo, selects the matching segments from the database, and generates the demo based thereon. In a non-limiting example, the survey responses may include interest level indicators for various features of the product to be demonstrated. The interest level indicators respectively indicate the user's level of interest the features and the demo personalization module 232 matches the interest level indicators to corresponding fields mapped to corresponding content segments associated with the features, and based on the matching, determine which content segments to use to generate the demo data file with.

By way of further illustration and not limitation, in some implementations, the demonstration system is configured to automatically build a product demonstration that is unique to every website or mobile app visitor by asking each visitor to respond to specific questions, then automatically selecting not only the sequence of videos but also the video length to tailor the product demonstration to each visitor's specific needs. This level of personalization creates a unique experience for the visitor that should increase interest in the product by visitor (the prospective customer). This unique combination of content density and sequence is not necessarily limited to selecting and arranging videos and could be implemented with such things as dynamically built documents and/or other website or application content.

Figure 3:
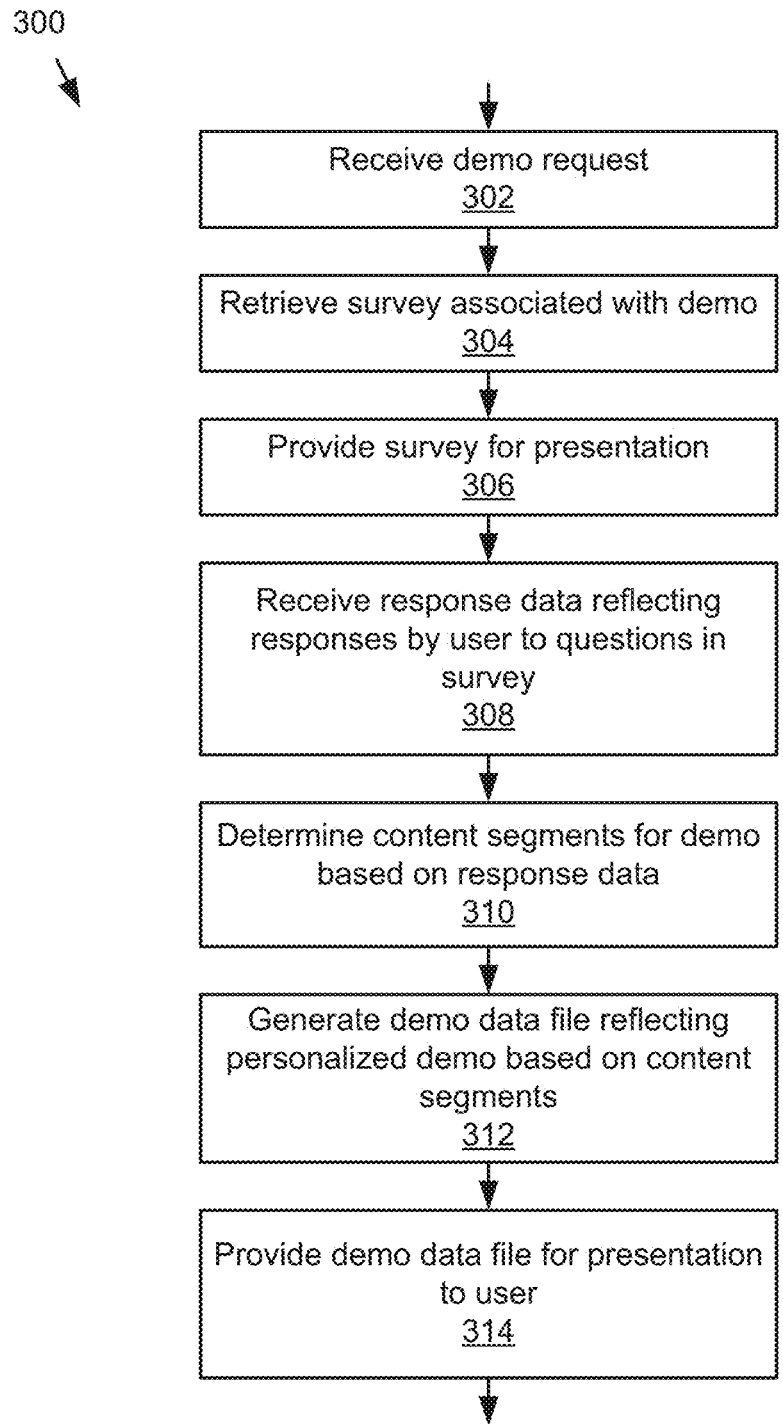
FIG. 3 is a flowchart of an example method 300 for generating and providing a personalized demo for presentation to a user.

FIG. 3 is a flowchart of an example method 300 for generating and providing a personalized demo for presentation to a user. In block 302, the demo personalization module 232 is executable by one or more processors 202 of a computing system to receive a demo request. The demo request may include data describing which product demonstration the user is interested in viewing. In response, the demo personalization module 232 may signal the survey module 230 to provide a survey to the user related to the product of interest. In block 304, the survey module 230 is executable by the one or more processors 202 to retrieve the survey associated with the demo, and in block 306, the survey module 230 is executable by the one or more processors 202 to provide the survey for presentation to the user. In some implementations, responsive to receiving the signal from the demo personalization module 232, the survey module 230 may retrieve the survey corresponding to the product of interest from an information source, such as the memory 204 and/or a data store 210, and transmit the survey (e.g., via the network 102) to the client device 106 of the user for presentation (e.g., by the demo application 108). In some implementations, the survey module 230 or a portion thereof may reside client-side and be operable by the client device 106 to retrieve the survey from local storage, from the data store 210 via the network 102, another information source, etc. Other variations are also possible.

In block 308, the survey module 230 is executable to receive response data reflecting responses by the user to questions in the survey and the data personalization module 232 is executable to determine content segments for the demo based on the response data in block 310. In some embodiments, the survey module 230 signals the data personalization module 232 to generate the demo responsive to receiving the survey response data. In response to receiving the signal, the data personalization module 232 may determine the content segments for the demo by matching aspects of the response data to corresponding content segments associated with the product to be demonstrated.

In block 312, the demo personalization module 232 is executable to generate a demo data file reflecting the personalized demo based on the content segments. In some embodiments, the demo data file may sequence the content segments of the demo and may include metadata describing the demo. In block 314, the demo personalization module 232 is executable to provide the demo data file for presentation to the user. In some embodiments, the demo personalization module 232 transmit the demo data file to the demo application 108, such as a web browser or mobile application, and the demo application 108 may process demo data file for the content segments and sequence, and request the content segments from the host hosting them in the sequence specified, such as the demo server 116 or a third-party server.

By way of further illustration and not limitation, the method 300 is advantageous as it allows the user, such as a website visitor, to conveniently experience a seamless, unified, and personalized demo experience. For instance, the website visitor starts the demo, which may be provided in the form of a multimedia presentation, and in response to starting the demo, is presented with questions as part of an online form that the visitor is required to complete. In response to completing the form, the demonstration system (embodied at least in part by the DAAS module 118 and/or the demo application 108) analyzes the responses and determines which content segments (e.g., videos) of which length should be shown in what order. The demonstration system displays the videos in a unified user interface with controls to view the demo, and the videos play back to back seamlessly to create the unified and personalized experience for the website visitor.

As discussed above and elsewhere herein, some implementations allow users to create customizable demos. These demos include a series of features that viewers rate based on interest and/or importance (e.g., no important, somewhat important, very important, etc.). Based on their ratings, a personalized demo is shown that includes a short video, a long video, or no video at all for each of the features. Creating a personalized seamless video content experience based on both content density and sequence has several advantages over a one-size-fits-all demo or a random list of video titles, such as increasing viewer satisfaction and the likelihood of the viewer moving forward in the purchasing process.

In some implementations, the demo personalization module 232 includes computer logic executable to further personalize the viewing user's experience based on a determination of provide advanced personalization of a demo. Advanced personalization allows stakeholder users to create what are termed advanced demos that route users to standard demos based on their response to further questioning.

A standard demo means a demo that is personalizable to the user based on the user's survey response data. An advanced demo means a demo that routes users to different standard demos based on additional (advanced) personalization. For example, an additional questionnaire may be presented to the user asking the user answer to the question: "What vertical are you in?", and based on the user's response, can route the viewer to a standard demo that is tailored to their industry.

FIG. 6O includes a graphical representation of an example interface 680 for managing demos. The interface 680 includes a create new demo selector 681 (e.g., a dropdown list) which provides the user with options for creating different tiers of demos that are targeted to different audiences. In the illustrated example, the user may select between the standard demo an advanced demo, where standard demo is a demo that is customizable to the user based on the survey results data as discussed elsewhere herein, and the advanced demo routes the users to different customizable demos based on the response to an additional questionnaire (e.g., a multiple choice question). As depicted, hovering over the options in the selector 681 provides additional information as to the difference between standard and advanced demos. Selecting standard redirects the user to the standard demo creation interfaces, such as those discussed with references to FIGS. 6A to 6N. Selecting advanced redirects the user to an advanced demo interface, such as the interface 685 depicted in FIG. 6P.

With reference to FIG. 6O, as depicted, the interface 680 also includes an advanced demos table 698 and a standard demos table 699. The advanced demos table 698 summarizes the advanced demos that the user has created. For example, the table may include the advanced demos that are created, the title of each of the advanced demos, the routing question that is asked, a delimited list of answers, the date the demo was created, the name of the creator of the demo, as well as modification links which allow the user to preview, send, edit, or delete the advanced demo. The standard demos table 699 summarizes the standard demos that the user has created in a manner similar to the advanced demos and provides modification links which allow the user to preview, send, edit, or delete the standard demos.

Figure 6P:
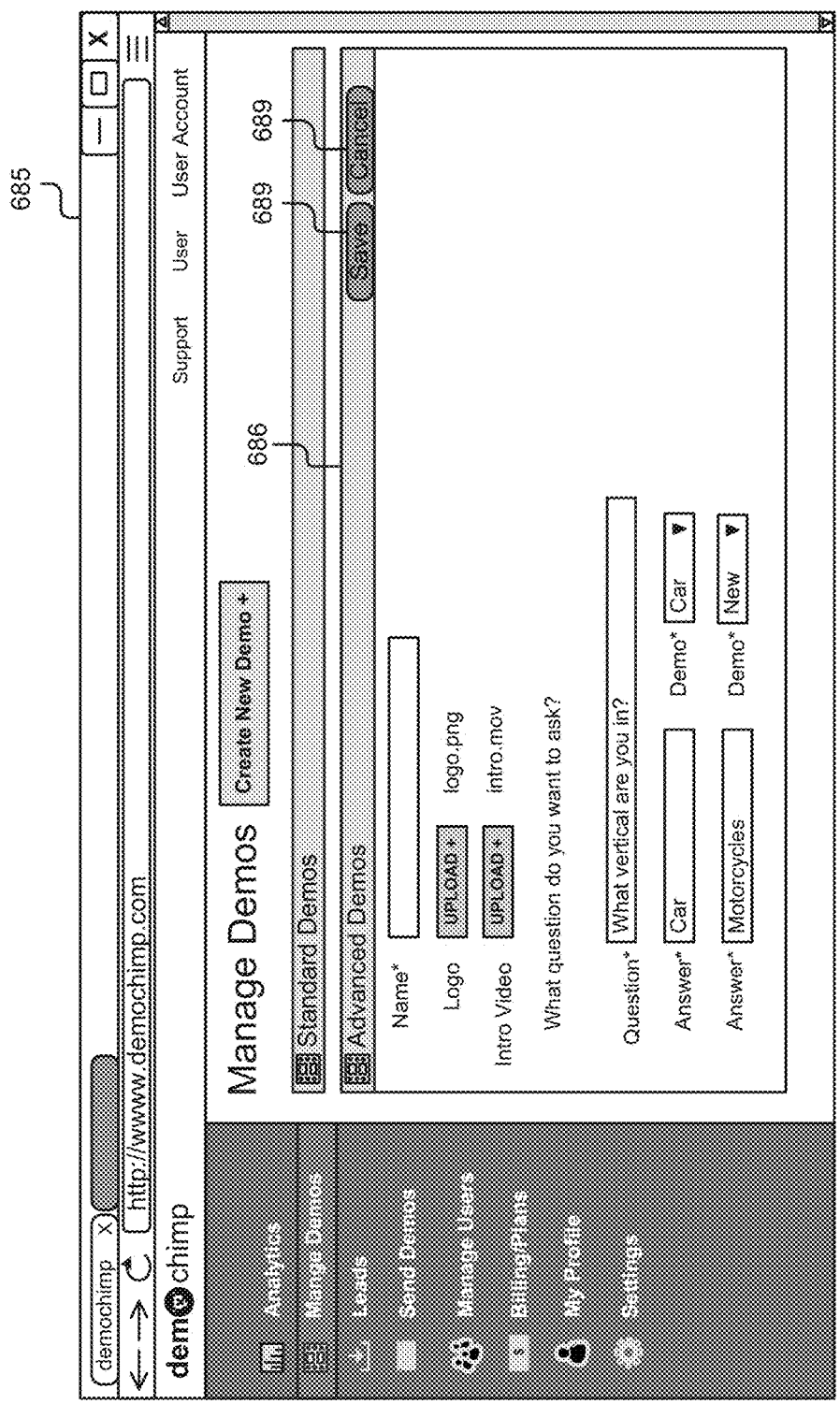

In FIG. 6P, the interface 685 includes an advanced demo region 686 that asks the user to enter the name of a new advanced demo, a logo, and an introduction video. The interface 685 also prompts the user to enter a question that will be shown to people watching the advanced demo and a list of possible answers to the question. For each answer, the user then chooses a standard demo to associate with the answer and that will be shown to the demo viewer upon that answer being selected in response to the question. If desired, the user can instead choose to create a new standard demo, upon which a new text box appears to the right with the label "Name", allowing the user to select a name for the new standard demo that will be created implicitly at the same time the advanced demo is created. This implicitly created standard demo will have no information associated with it at this point, but will be stored in the data store 210 for later setup.

By way of further example, the user may use the interface 685 to create an advanced demo by the name of "My Advanced Demo", upload a logo, upload an introduction video, input a question, and provide two or more answers. For instance, if a first answer (e.g., Construction) is chosen by the demo viewer, the user can be routed to the first (e.g., Construction) standard demo and if a second answer (e.g., Travel) is chosen by the demo viewer, the user can be routed to a newly created standard demo called Travel, which will be setup later on by the user. Each advanced demo in this particular example requires at least 2 answers, and users can add as many as are needed. By default, users are shown 2 fields for answers. However, a add button may be included in the interface 685 allowing users to add additional answers to the question. For instance, selection of the add button may trigger a new line to appear, asking for the answer and a corresponding standard demo. An option for deleting previously added answers and demos may also be included, allowing the user to remove the answer, upon which the existing answers may be repositioned (e.g., move up slightly to appear directly adjacent to other answers).

Selecting the save button 689 at the top right of the advanced demo region 686 section triggers the creation of the advanced demo and any needed standard demos, while selecting the cancel button 690 deletes any data input for the advanced demo and returns the user to the previous interface 685.

Locker Module 236 is computer logic executable by the one or more processors to aggregate documents unique to a demo viewer's needs in a locked document library during viewing of a demo and unlock the document library once a predetermined rule has been met. In some implementations, the locker module 236 interacts with the demo application 108 to manage the generation of the document library, the unlocking thereof, and the provision of the documents to the user once the predetermined rule has been met.

The predetermined rule may require that the user elect respond to one or more calls to action in order to obtain access to the documents (e.g., start a free trial, contact the sales person, purchase the product, a customized action specified by the demo administrator, etc.). Non-limiting examples of calls to action are depicted in FIG. 6I. As a further example, responsive to the user selecting a call to action, the demo application 108 generates interaction data describing the selection and provide it to the locker module 236, which may unlock the document library based on the interaction data satisfying the predetermined rule. The locker module 236 may then signal the demo application 108 to notify the user that the document library has been unlocked and provide access.

The locker module 236 determines which documents to include in a document library based on the survey response data collected and provided by the demo application 108, as discussed elsewhere herein. The documents are each affiliated with one or more segments of the demo, and association data associating the documents with their corresponding segments is stored in the data store as demo data 218.

In some implementations, the locker module 236 receives interaction data that reflects a user's progression through a given demo. For instance, the demo application 108 may provide the interaction data (e.g., at various intervals or upon detecting various events) to the locker module 236. In a non-limiting example, the interaction data indicates when the user reaches the introductory segment, any of intermediate segments, or a final segment of the demo, thereby reflecting the current segment being consumed by the user. The locker module 236 uses the identity of the current segment to determine which documents are relevant to that segment, and then filters out any documents that do not match with corresponding answers in the survey results data. The locker module 236 adds the matching documents for that current segment to the document locker. In conjunction, the demo application 108 may notify the user that additional documents have been added to the document library.

In some implementations, the demo application 108 displays animations illustrating to the demo viewer when documents are placed into the locked document library. For instance, the demo application 108 may, for the current feature, display an animation showing the additional document(s), which are relevant to that feature, being added to a graphical representation of the locked document library to the user. This is advantageous and it generates user interest in the locked document library. In some implementations, the user may select or over a representation of a given document in the locked document library, and upon detecting the event, the demo application 108 may retrieve and present a preview of the document (e.g., a snapshot) to further elevate user interested in unlocking the document library. In some instances, the demo application 108 may retrieve the document previews form the locker module 236. In some instances, the document previews (e.g., graphical representations of the document) may be cached upon initial loading of the demo data file received by the demo application 108 to reduce latency and increase interface responsiveness. If the user selects to open a document from a still locked document library, the user may be prompted by the demo application 108 to take a call to action required to unlock and provide access to the documents in the document library.

The locker module 236 is advantageous as it, in conjunction with the demo application 108, employs a methodology that can ensure that only documents that fit the website visitor's unique needs are included in the locked library, thereby increasing the chances that the visitor will take the desired action to unlock and obtain the documents. In other words, because the documents in the document library are associated with specific user's needs, this provides a uniquely personal incentive and the user will be more likely to accept the call to action to access the locked documents. This allows web marketers to increase conversion rates as the incentive to take the converting act (e.g. completing an online request to be contacted or start a free trial of software) is much higher. It also allows companies to build their own custom responsive locked document library that is tightly integrated within a demo.

Figure 11A:
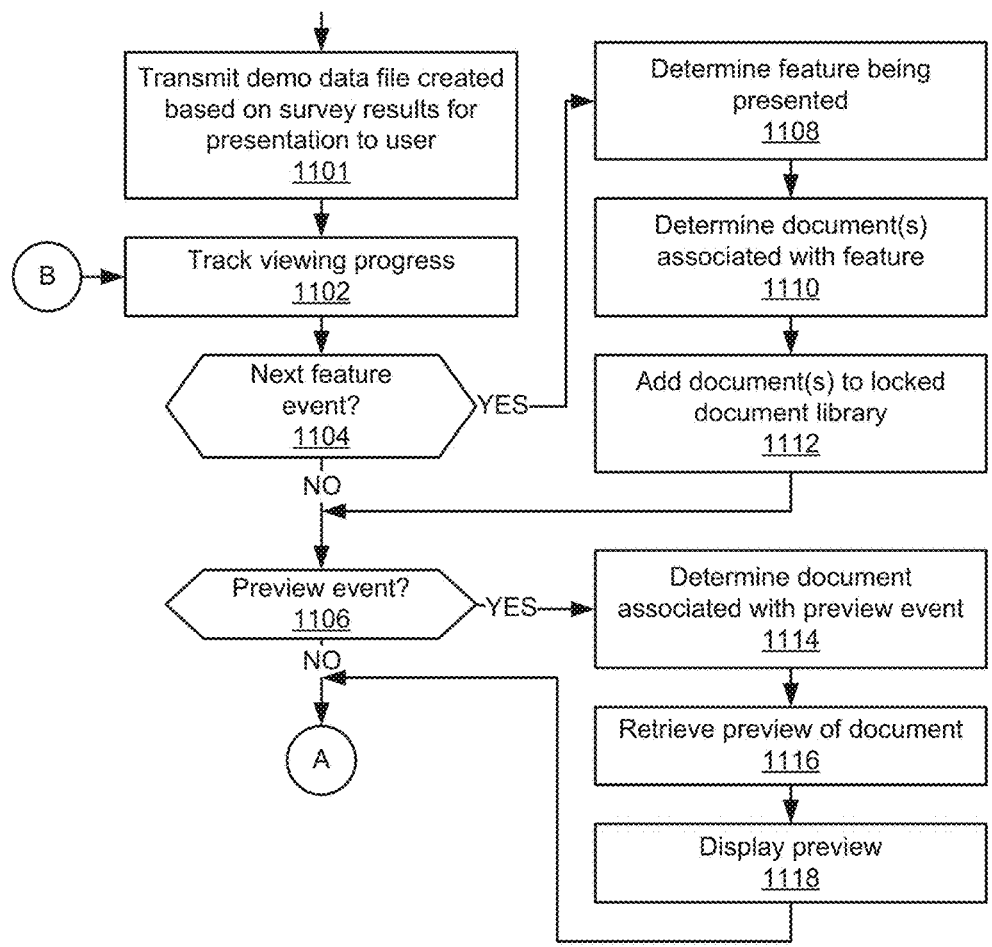
FIGS. 11A and 11B are flowcharts of an example method for managing a locked document library.
Figure 11B:
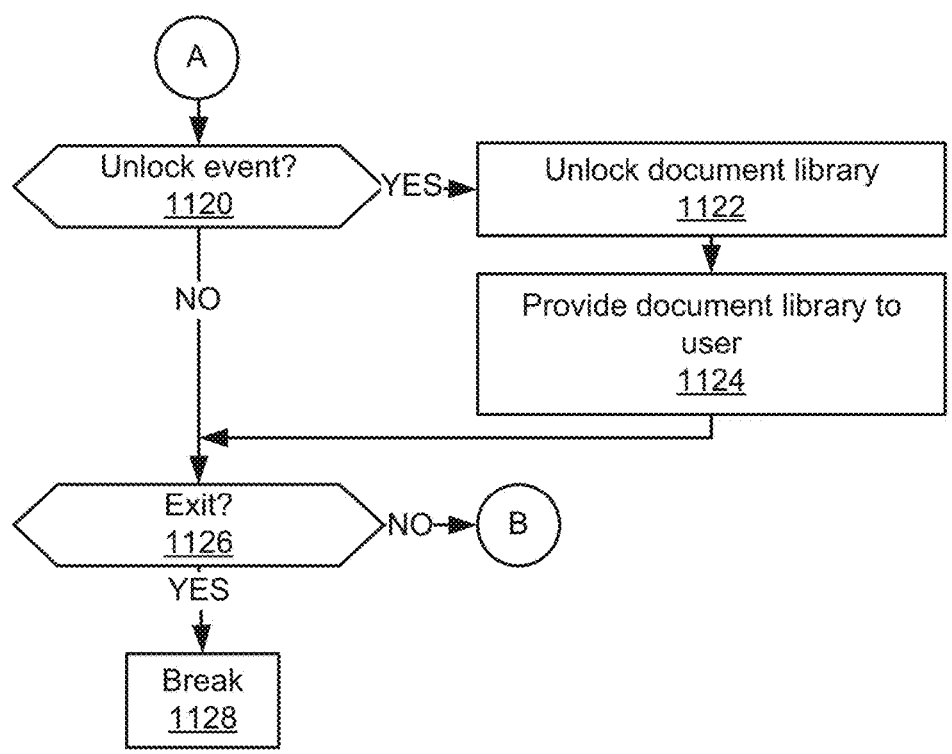

FIGS. 11A and 11B are flowcharts of an example method 1100 for managing a locked document library. In block 1101, the demo personalization module 232 transmit demo data file representing a demo created based on survey results data associated with a given user to the demo application 108 for presentation to a user. The demo application 108 may process the demo data file, retrieve the different segments of the demo, including the introductory, feature, and pitch-related segments for presentation and/or playback to the user based on the sequence indicated in the demo data file. During the presentation of the demo, the locker module 236 tracks the viewing progress of the user. In some implementations, the demo application 108 may process and/or provide interaction data reflecting the events that occurred during viewing of the demo. The demo application 108 and/or the locker module 236 may process the events included in the interaction data and manage the locked document library based thereon.

In block 1104, the demo application 108 detects the next feature event indicating that the user has begun viewing the initial feature or has transitioned to a subsequent feature of the demo. Responsive to detecting the next feature event, the demo application 108 provides the event to the locker module 236, which determines the active feature, for example, based on identifying information included in the interaction data that identifies the current feature. For example, the features may be numbered sequentially and the number corresponding to the current feature may be provided in the interaction data and the locker module 236 may parse the number. In block 1110, the locker module 236 determines the document(s) associated with the feature based on the interaction data and in block 1112 adds the document(s) to a locked document library. In some instances, the locker module 236 adds the document(s) by populating a running list embodying the locked document library with identifiers referencing the document(s). Continuing the previous example, the locker module 236 may query the data store 210 for documents matching the feature number parsed from the interaction data but that should not excluded based on the survey responses, and then adds the compliant document(s) to the locked document library. The method 1100 then proceeds to block 1106.

In block 1106, the demo application 108 determines whether a preview event has been detected, and if so, determines which document is associated with the preview event in block 1114, retrieves a preview of the document in block 1116, and displays the preview of the document to the user in block 1118. Non-limiting examples of a preview event include a hover event, an onclick event, etc. In some instances, the event includes a document identifier identifying the document associated with the preview event, and the demo application 108 uses the document identifier to retrieve the document preview. The demo application 108 may retrieve the document preview by requesting the document preview from the locker module 236 (e.g., via the network 102), retrieve the document preview from memory, such as the memory 204, or from another suitable information source. The method 1100 then proceeds to block 1120.

In block 1120, the demo application 108 determines whether an unlock event has been detected. If so, the demo application 108 provides the event to the locker module 136 and unlocks the document library 1122 provided the unlock event (e.g., user consent to/selection of a call to action option) satisfies a predetermined rule, as discussed elsewhere herein. Once unlocked, the locker module 136 provides the document library to the user 1124 for consumption thereby. For example, when the demonstration is complete, the demo application 108 may generate and present an interface prompting the user to take a specific action to unlock the document library and obtain access to the documents, and upon taking the action, the demo application 108 may display an electronic link to the documents, the locker module 236 may transmit an electronic message to an electronic address of the user enclosing the documents and/or a link thereto, etc. The method 1100 then proceeds to block 1120.

In block 1126, the demo application 108 and/or the locker module 236 determines whether to exit the method 1100. If not, the method 1100 returns to block 1102 to track viewing progress and/or process additional events.

By way of further illustration and not limitation, a user (e.g., website visitor) who loads the website (e.g., using the demo application 108) is presented with a demo viewer interface and starts the demo (e.g., multimedia presentation) by clicking a button. For example, the demo may be a survey demo called "Take a Tour". In response to selecting the button, the demo application 108 presents the user with several questions as part of an online form that the user must respond to before viewing the demo. The survey module 230 records the user's responses and gathers documents most suited to the user's responses. The user's responses are associated with specific documents 220 stored in the data store 210. As the user watches different parts of the demonstration, the locker module 236 places document(s) related to that part of the demonstration and to the user's specific needs as reflected by the user's responses to questions in the form in a locked list (library).

If the user places a pointing device, such as a mouse, over the list of items displayed to the user via display as the locked document library, the demo application 108 provides the user a preview of the items, as discussed elsewhere herein. The list is updated in real-time and visible to the user via the demo application 108, but the user cannot access the documents until the user chooses to take a predetermined action, such as provide his/her contact information (e.g., register) or another action specified by the demo administrator in order to access the documents in the list. For instance, the demo application 108 presents on the display options for the user to unlock the document library by taking a specific actions (e.g., submitting contact information, starting a free trial, etc.). Once the user takes an approved action, the demo application 108 refreshes the interface to unlock the document area allowing the user to download and/or otherwise access the documents. Upon selecting to download the documents, the computing system hosting the documents receives a corresponding document requests, retrieves the documents, and transmits them to the user's client device 106 for presentation and/or storage thereby.

In some implementations, access to the documents may be tiered. For instance, for each action the user selects to take, a portion of the documents is provided up to a total. That way if the user selects to take all specified actions, the user can have access to all the documents in the locked library, and if the user selects only a portion of the actions, only apportion of the documents in the locked library are provided. Other variations are also possible and contemplated.

Figure 8A:
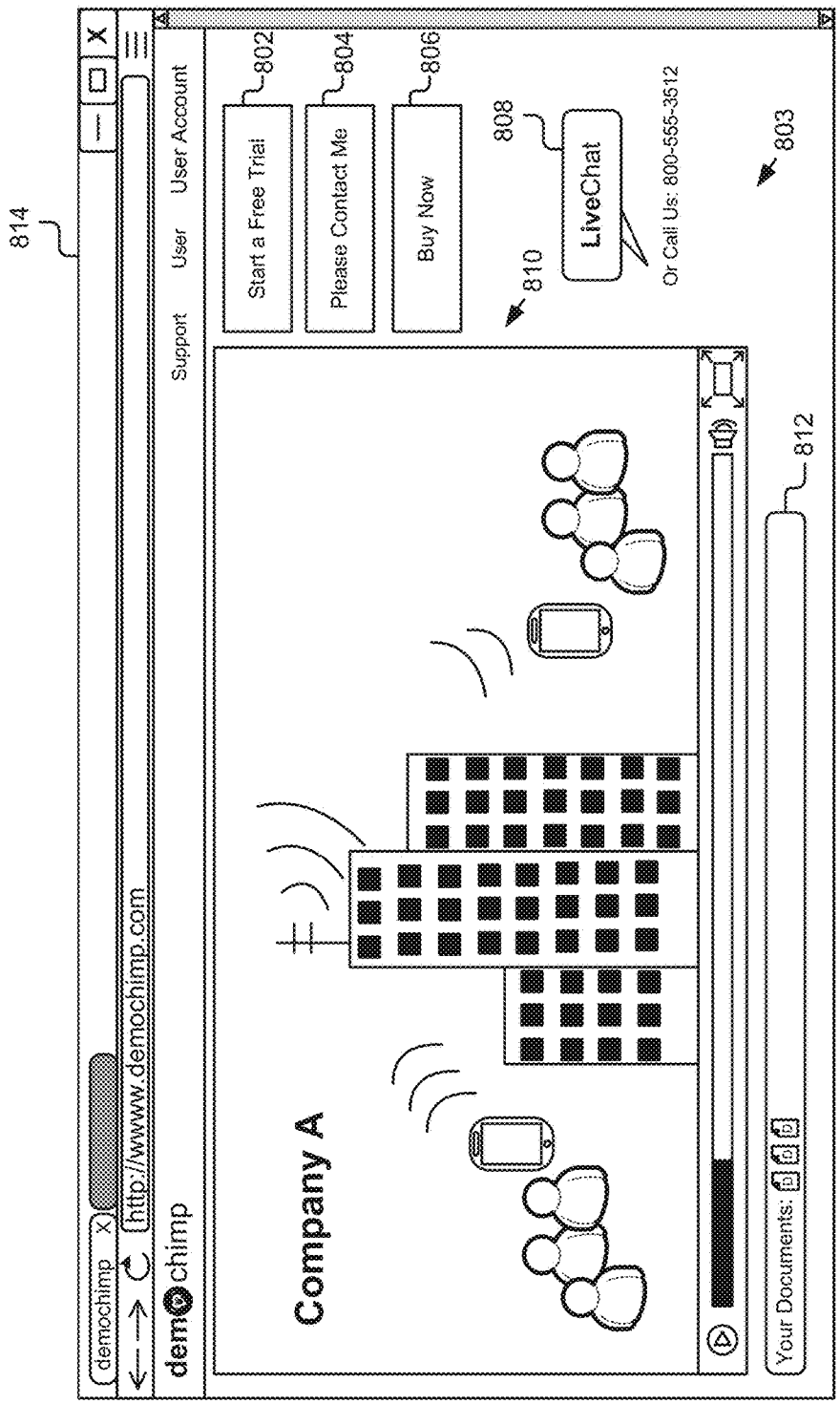
FIGS. 8A-8G are graphical representations of example user interfaces for interacting with a demo.

FIGS. 8A-8G are graphical representations of example user interfaces for interacting with a demo. Upon selecting to view a given demo, the demo application 108 and present the interface 814 as depicted in FIG. 8A to the user. The interface 814 includes an interaction region 803 providing unified viewing experience to the user. The interaction region 803 includes elements for calling the user to action, such as elements 802, 804, and 806, which in this example invite the user to start a free trial, contact the creator/administrator of the demo, or purchase a product demonstrated by the demo. It should be understood that this area of the interface may also include product incentives, offers, and other items enticing the user to engage. The interaction region 803 also includes a locked document library 812 that lists documents aggregated therein is a user proceeds through the demo. A demo viewing region 810 is also included in the interaction region 803 and an option for engaging in real-time synchronous communication with a stakeholder in the demo, such as a salesperson of the product being demonstrated by the demo. The viewing region 810 may include a toolbar for navigating the demo, such as a play button and a scrub bar, and option to place the viewing region 810 in full-screen mode, a volume adjustment selector, etc. In an example, selecting the live chat button 808 initiate the display of a chat window and a real-time communication session with another note on the network with which the viewer may communicate (e.g., ask questions, get additional information, be contacted by, etc.).

Figure 8B:
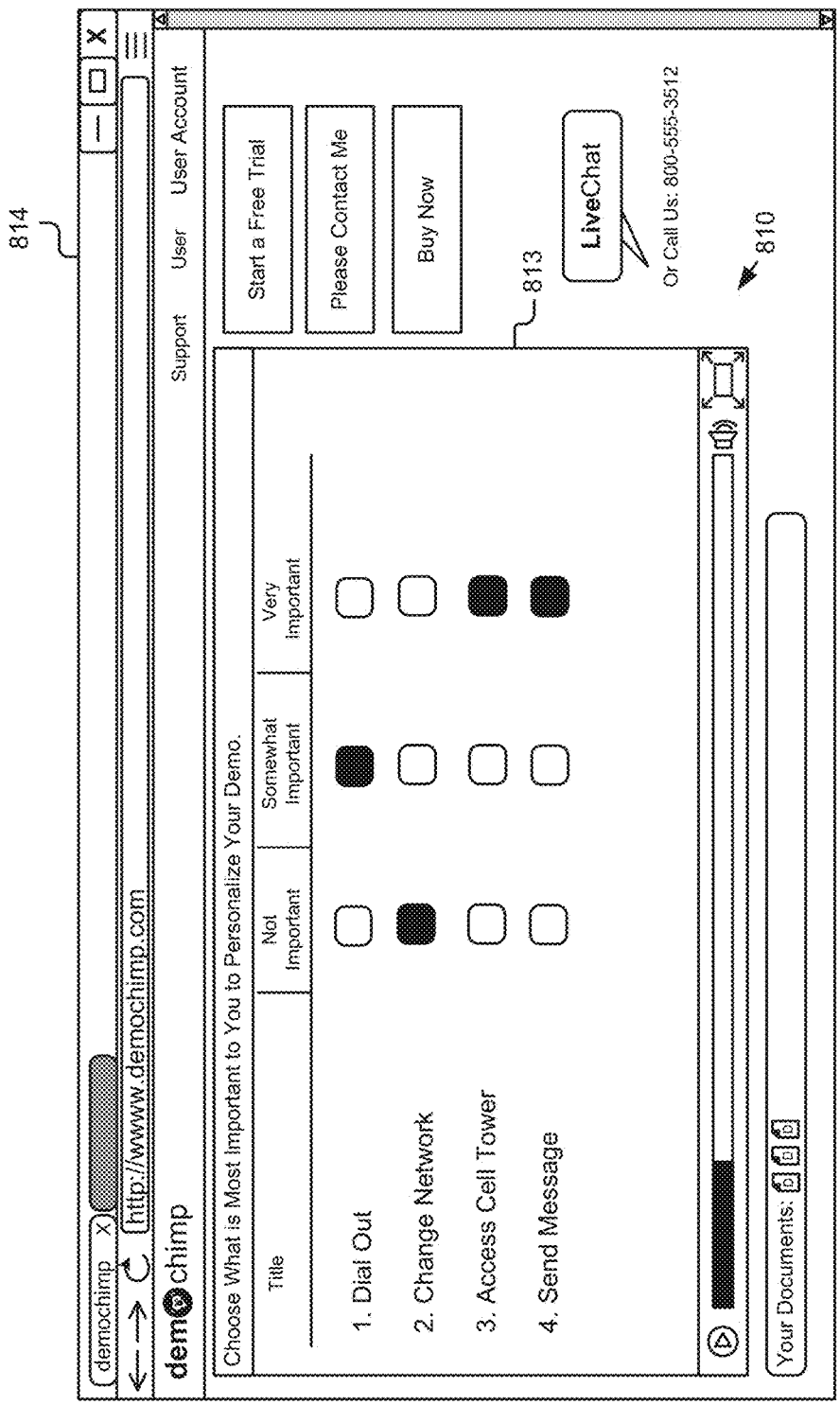

In FIG. 8B, the viewing region 810 of the interface 814 may display a survey 813 prompting the user answer questions by indicating a level of importance in the features that can be covered about the product by the demo.

Figure 8C:
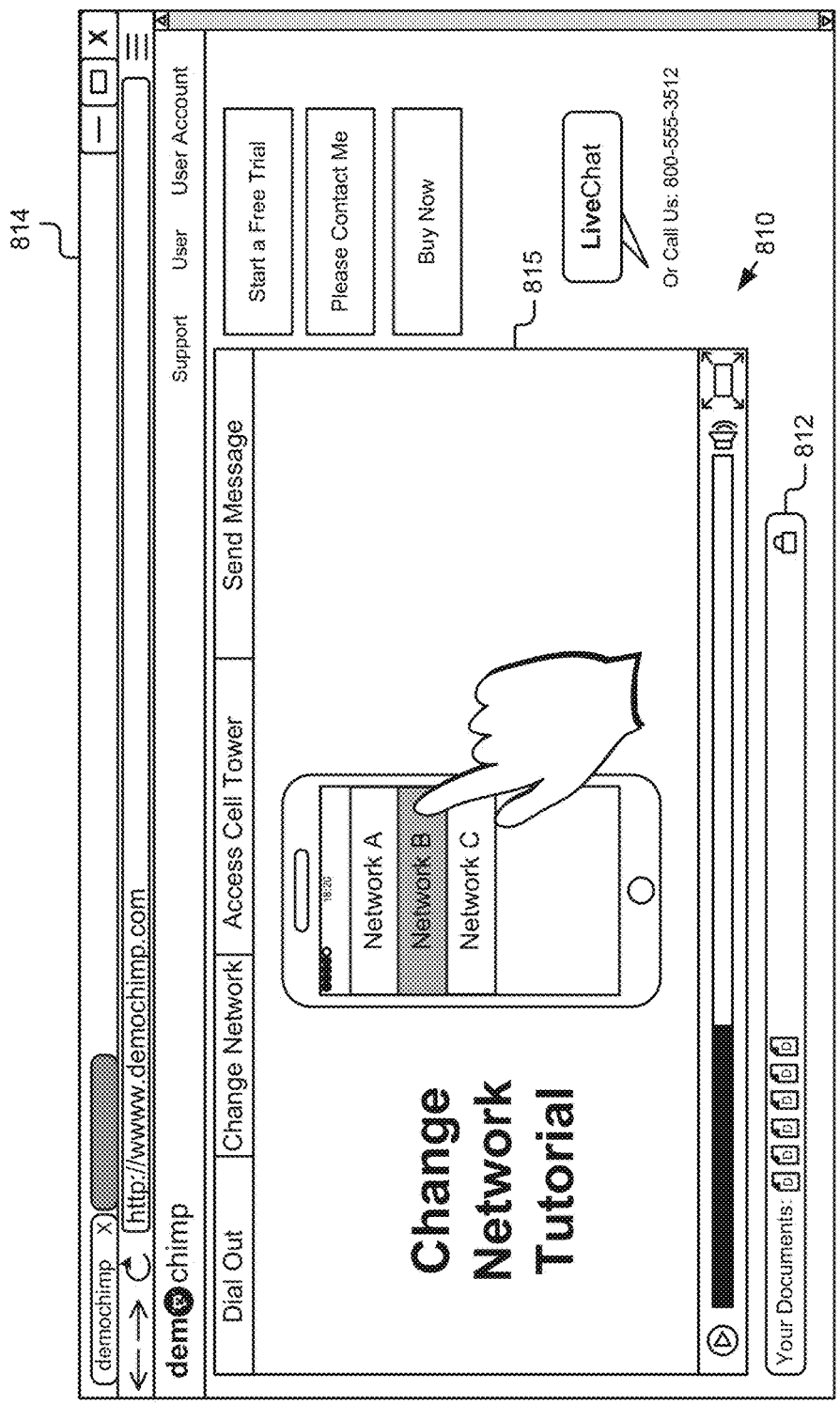

In FIG. 8C, the viewing region 810 of the interface 814 is displaying a video segment 815 of the demo about an aspect of the product (e.g., how to change networks). As a user proceeds through the different segments of the demo, additional documents about the segments are added to the document library 812.

Figure 8D:
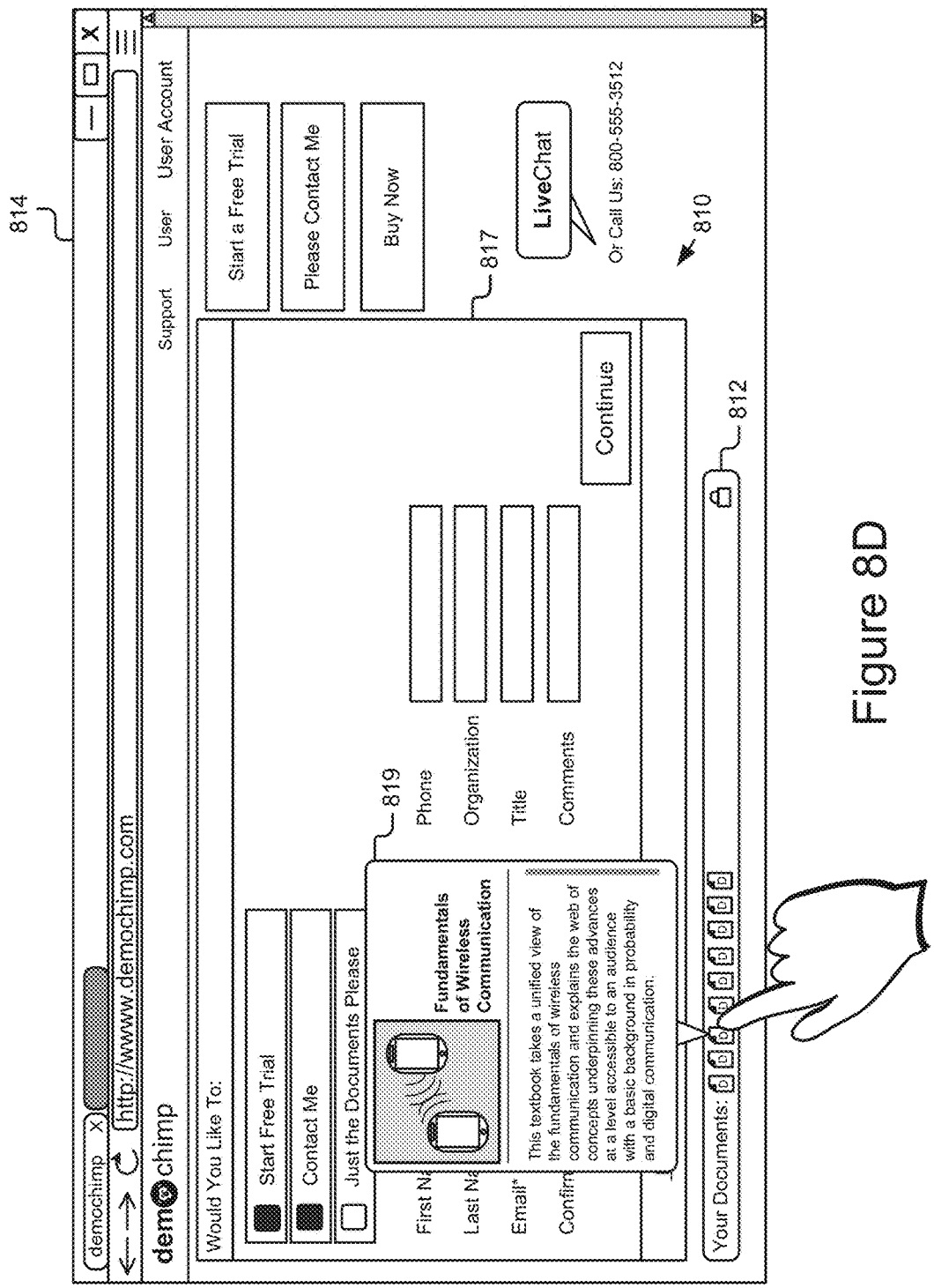

In FIG. 8D, the viewing region 810 of the interface 814 is displaying a page 817 including various calls to action to the user and, in response to the user interacting with one of the documents in the locked document library 812, the demo application 108 is displaying a preview 819 illustrating the contents of the document, thereby enticing the user to select at least one of the calls to action.

Figure 8E:
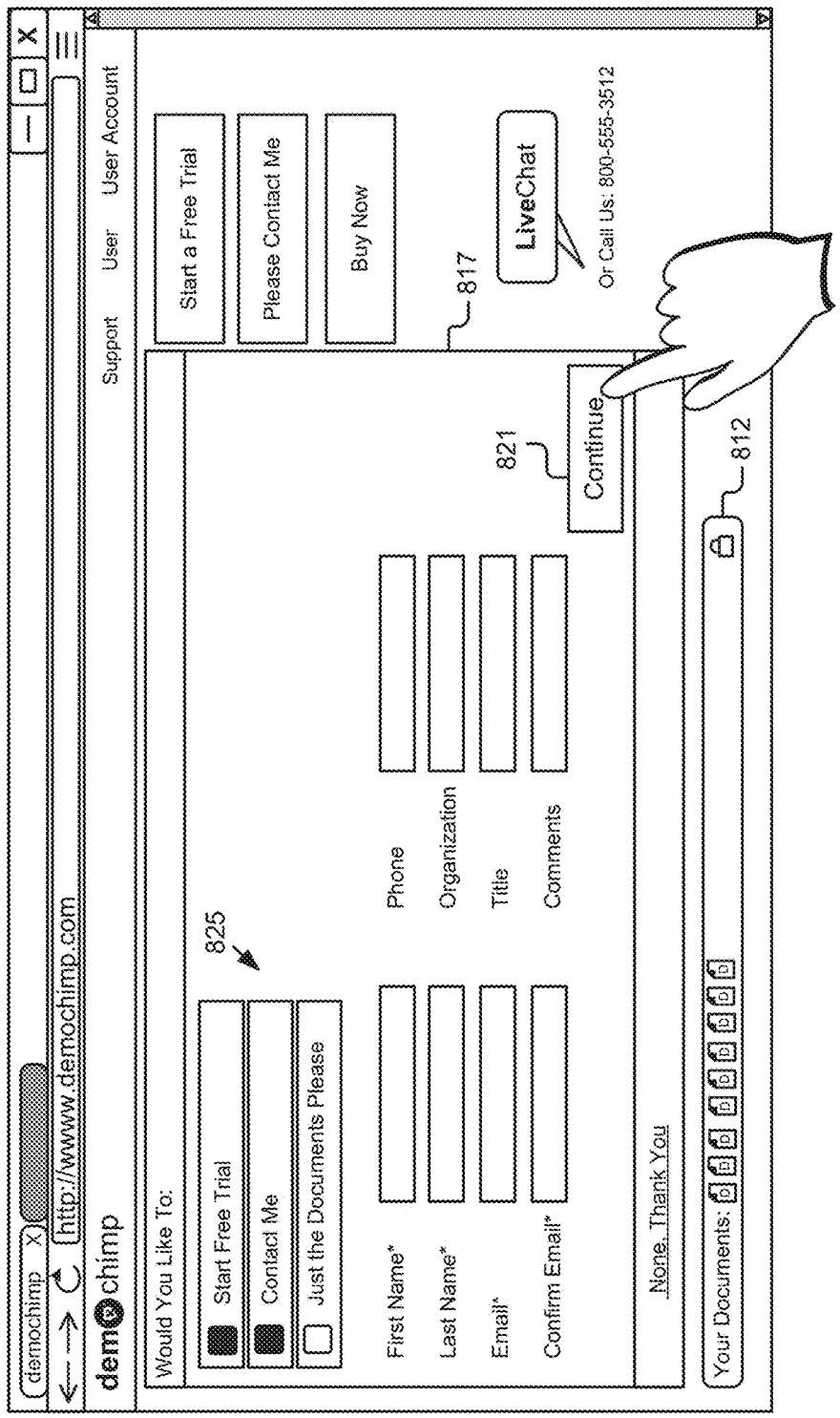
Figure 8F:
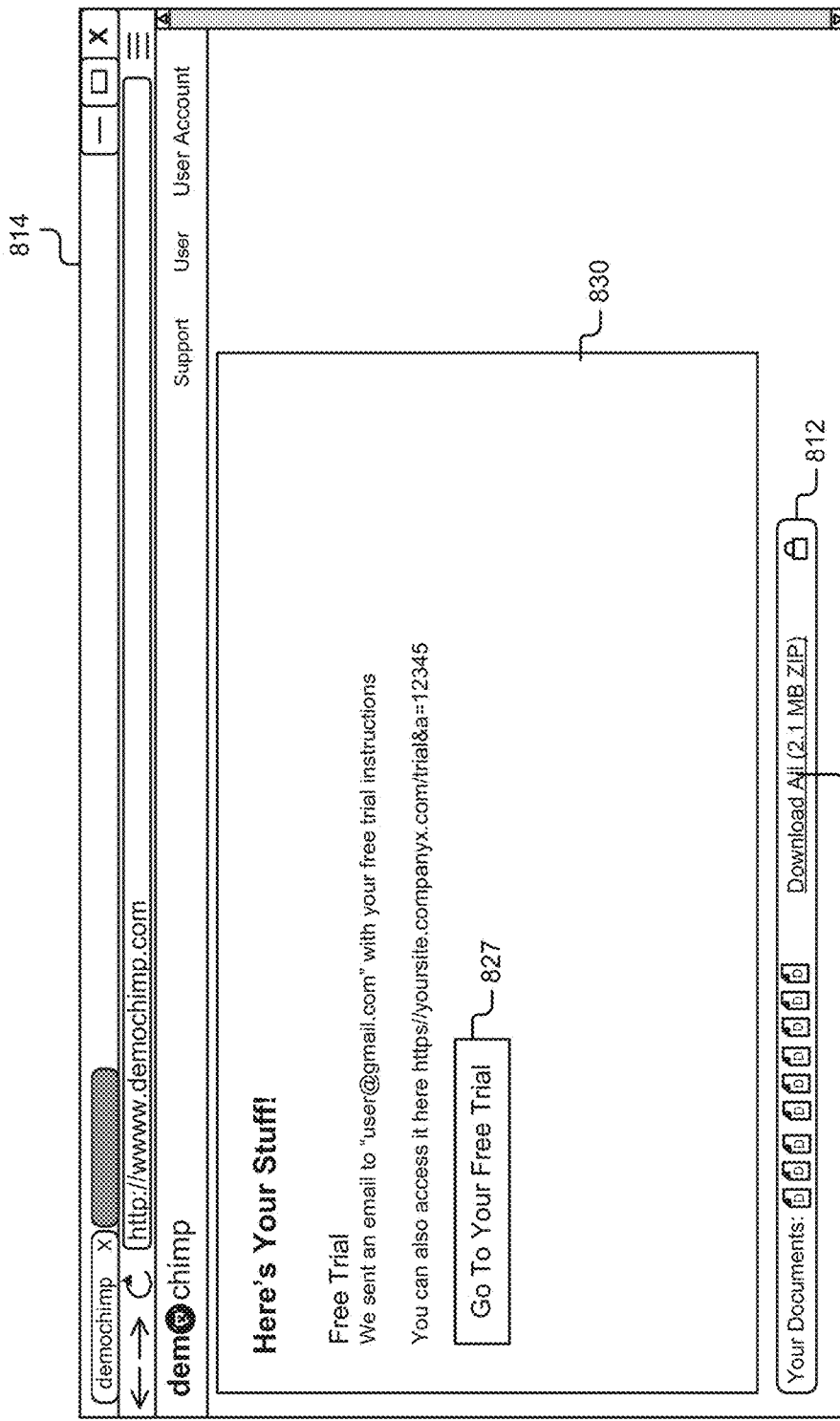

In FIG. 8E, the page 817 includes two calls to action 825 having been selected and the user is selecting the unlock the locked document library 812 and submit the form data related to the calls to action by selecting the continue button 821. Responsive to the selection of the continue button 821, the demo application 108 displays a page 830 in the interface 814 including a link to the free trial selected by the user in the previous interface as well as a link 831 for downloading the documents (e.g., PDFs, JPGs, PNGs, videos, other content) of the now unlocked document library 812.

Figure 8G:
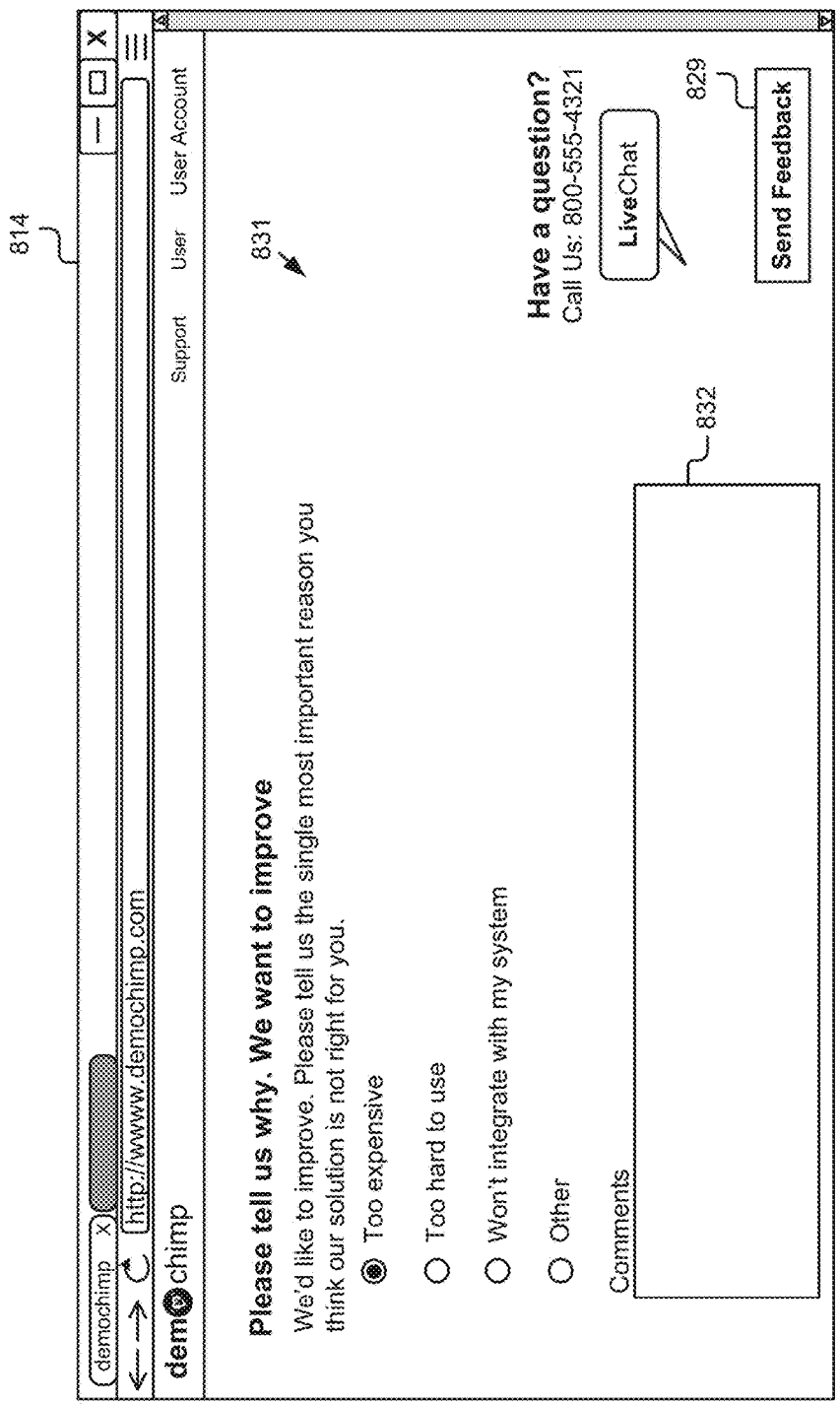

In FIG. 8G, the interface 814 includes a feedback region 831 including a feedback questionnaire for feedback on the demo. For instance, in the depicted example, the questionnaire as the user about how the demo can be improved and why the product in the demo is not the right solution for the viewer. In this example, the viewer can select from among preconfigured answers from input his or her own answer in the comments field by selecting the "other" option. The user may submit the feedback by selecting the send feedback button 829. In response to selecting the send feedback button 829, the demo application 108 may send the feedback (also referred to herein as objections) to the demo presentation module 232 which may process and store the feedback in the data store for use by the other components of the system 100, such as the analytics module 238.

Figure 12:
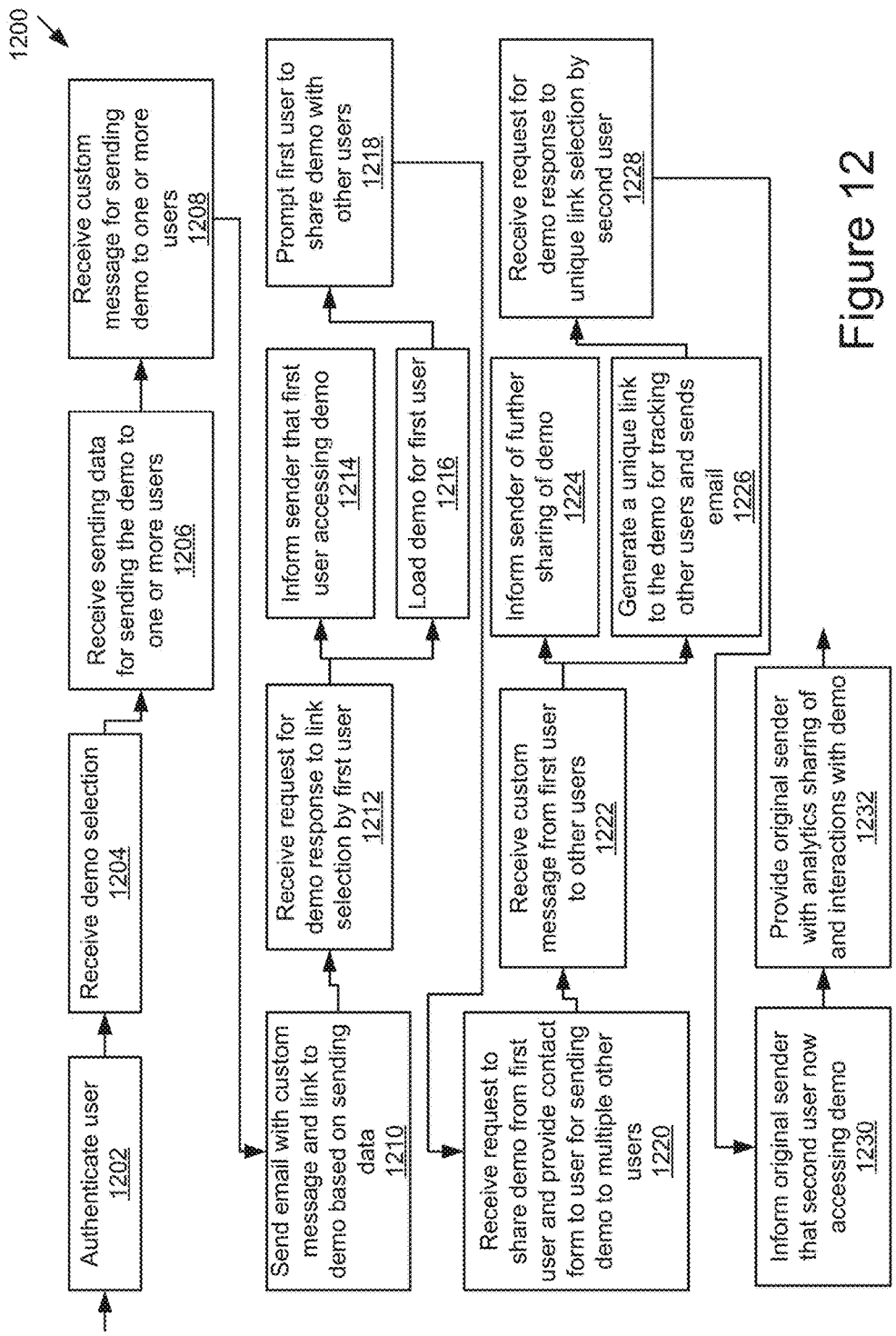
FIG. 12 is a flowchart of an example method for tracking the sharing of demos between users.
Figure 13:
FIG. 13 is a graphical representation of a user login interface.

The demo curation module 234 includes computer logic executable to share demos with other users. The demo curation module 234 may cooperate with the analytics module 238 to track user responses to receiving messages about demos. FIG. 12 is a flowchart of an example method 1200 for tracking the sharing of demos between users. In block 1202, the DAAS Module 118, or an authentication component thereof, authenticates a user, such as a creator of a given demo, to the use the demonstration system, as discussed elsewhere herein. In block 1204, the demo curation module 234 receives a demo selection from the user and retrieves demo-related data for that demo from the data store 210 and provides it to the demo application 108 for presentation to the user. The user may select to send the demo to one or more other users, and responsive thereto, the demo application 108 may display an interface including options for the user to send the demo to one or more other users. In block 1206, the demo curation module 234 may receive sending data for sending the demo to one or more first users. The demo curation module 234 may also receive in block 1208 a custom message to include when sending the demo to the one or more first users. In block 1210, the demo curation module 234 may use the sending data and the custom message to generate an email including a link to the demo and sends the email to the one or more first users. In block 1212, the demo personalization module 232 receives a request from a first user for the demo responsive to a user selection of the link included in the email. In block 1214, the demo personalization module 232 informs the initiating user that the first user is accessing the demo. This is advantageous as the first user may use the real-time synchronous communication feature or other communication methods for communicating with the first user while the first user is accessing the demo to increase the likelihood that the first user will convert by heading to a call of action.

In block 1216, the demo personalization module 232 may a demo personalized to the first user to the demo application 108 of the first user, and the demo application 108 a load the demo for the first user for consumption. During playback of the demo, the demo application 108 may prompt the first user to share the demo with other users, and responsive to, the demo application 108 may receive a request share the demo from the demo application 108 of the first user, and responsive thereto, may provide a contact form to the user for sending the demo to one or more second (other) users. In block 1222, the demo curation module 234 may receive a custom message from the first user to the second users, in block 1226 may generate a unique link to the demo for tracking the second users and generates and sends an email including a custom message from the first user and the unique link to the second users. In block 1224, the demo curation module 234 may inform the original user/sender of the further sharing the demo by the first user, for example in an email or an administration interface of the demonstration system. Responsive to sending the email, the demo curation module 234 they receive a request to view the demo in response to the selection of the unique link by a second user in block 1228. In block 1230, the demo personalization module 232 informs the original user/sender that the second user is now accessing the demo so the original user may take steps to engage with the second user. In addition, in block 1232, the analytics module may provide the original user with analytics describing the sharing of the demo and user interactions with the demo. For example, the analytics may describe the chain of interactions between discussed with reference to the method 1200 to give the sending user additional insight as to which downstream users the most effective in getting the word out about the demo and engaging other users to view the demo.

By way of further illustration and not limitation, the following additional examples are provided to illustrate the advantages of the present disclosure with respect to the sharing and tracking features described herein. In some implementations, a product demo resides on a website. Using the innovative technology described herein, the salesperson logs into the site, selects the demo they want to share, inputs contact information for those they want to share it with, including email address, and innovation technology sends a link to the demo to the prospective customer (the primary recipient). The primary recipient clicks the link and views the demo. While viewing the demo innovation technology encourages the recipient to invite other colleagues to view the demo. If they choose to, they fill out a form that includes contact information of those they want to share it with. The technology sends the invitation to the secondary recipient(s) and they click the link to view the demo. Simultaneously the technology sends an email to the salesperson letting them know the demo was shared and who it was shared with. The salesperson also receives an email when the demo has been viewed, also indicating who it was viewed by. The salesperson can also look at reports later that show details about who the demo was shared with and how each person who viewed the demo interacted with the demo. This provides salespeople with valuable information that helps them discover and engage the entire buying panel. It is noted that the technology is not limited to use with videos, but could also include documents or other kinds of sales collateral content.

The following is a further non-limiting example associated with the sharing aspects of the demonstration technology described herein. A prospect may receive an email urging the user to watch a demo. For instance, the email may include a "Watch the Demo" button, which, when selected, redirects the user to the demo application 108 and loads a corresponding demo associated with a link corresponding to the button. The link is specific to the prospect (e.g. https://www.demochimp.com/app/view/i/[Invitation ID], where [Invitation ID] is a 40 character string of text consisting of letters and numbers), which allows the demonstration system to track the user. For example: https://www.demochimp.com/app/view/i/a42ca9e9a60a7ebd69d91d2b709afd78b5a3e9 64. It should be under stood that URLs described herein are merely examples. Because this URL is tied to a specific prospect, forwarding the email to someone else can result in inflated analytics and incorrectly attributing demo watching behavior to the original recipient. In order to solve this problem, the DAAS module 118, in cooperation with the demo application 108, is configured to guide potential demo viewers into identifying themselves in order to attribute their behavior to the correct person. Doing so also results in greater identification and access to the buying panel, allowing sales people to know who else may be involved in the buying process.

Specifically, when the button in the above-described email is selected, users—whether they are intended recipients or those who were forwarded the email—are redirected by the DAAS module 118 to a screen (e.g., see FIG. 10) indicating what company the demo has been prepared for and prompting the user to identify him/herself. The user has the option of choosing his/her name from the list if the user was previously invited to watch the demo, or if they are not listed, the user can choose a new viewer option and enter his/her information so the user can be added to the list. Once the user is identified, the screen prompts the viewer to watch the demo by selecting a corresponding button.

After the prospect enters their information and selects the button, the user's information is added to the data store 210 in a corresponding user profile, and the DAAS module 118, in cooperation with the demo application 108, tracks the user's viewing activity and associates the viewing activity with the user's individual identity/user profile. In addition, the demo application 108 begins playback of the demo, as discussed elsewhere herein.

Figure 10:
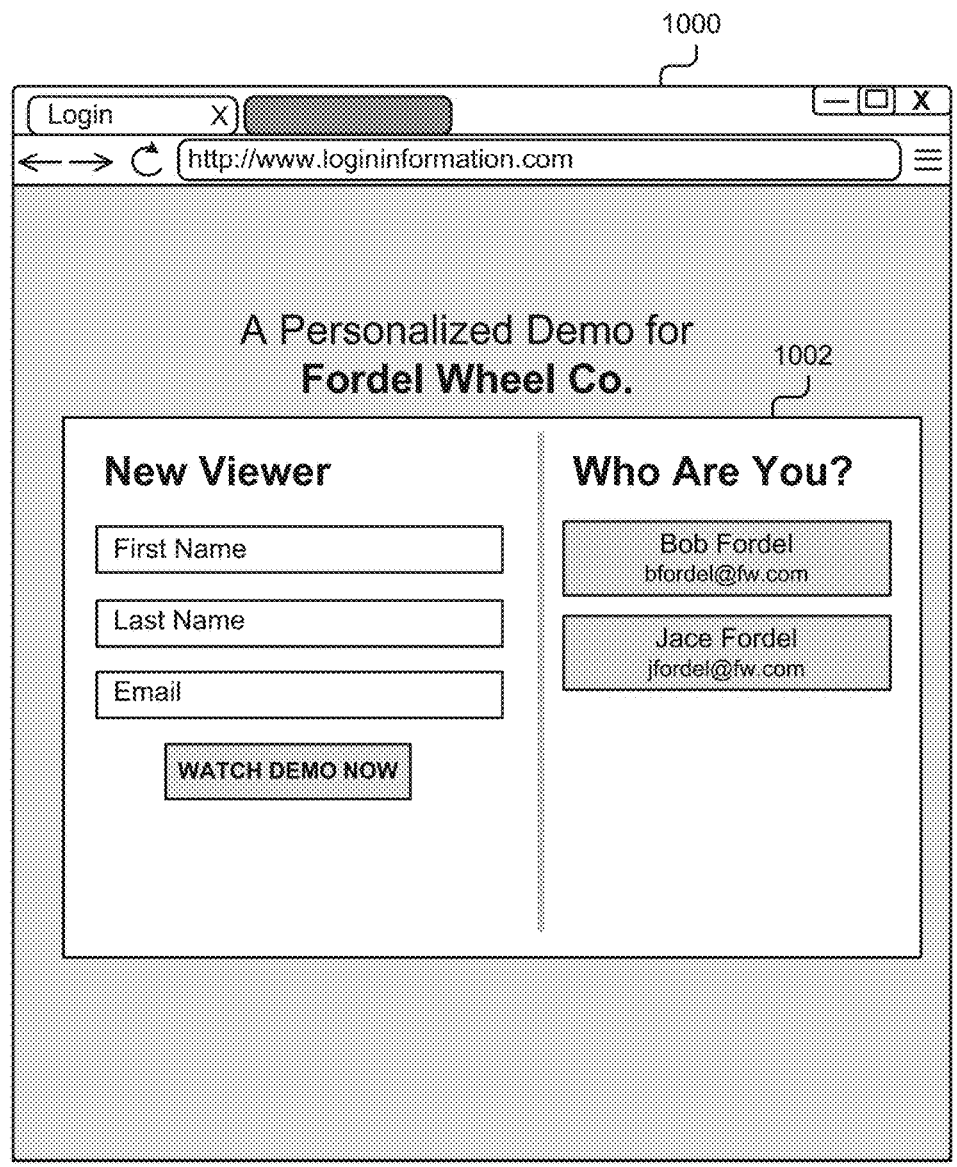
FIG. 10 is a graphical representation of an example user login interface.

FIG. 10 is a graphical representation of an example user login interface 1000. In FIG. 10, the interface 1000 includes a login dialog 1002. The login dialog 1002 includes a mechanism and process that requires demo viewers to identify themselves in order to generate individual analytics for each viewer. Furthermore, the login dialog 1002 provides greater identification and access to the buying panel, allowing sales people to identify which demo viewers are involved in the buying process.

Figure 7A:
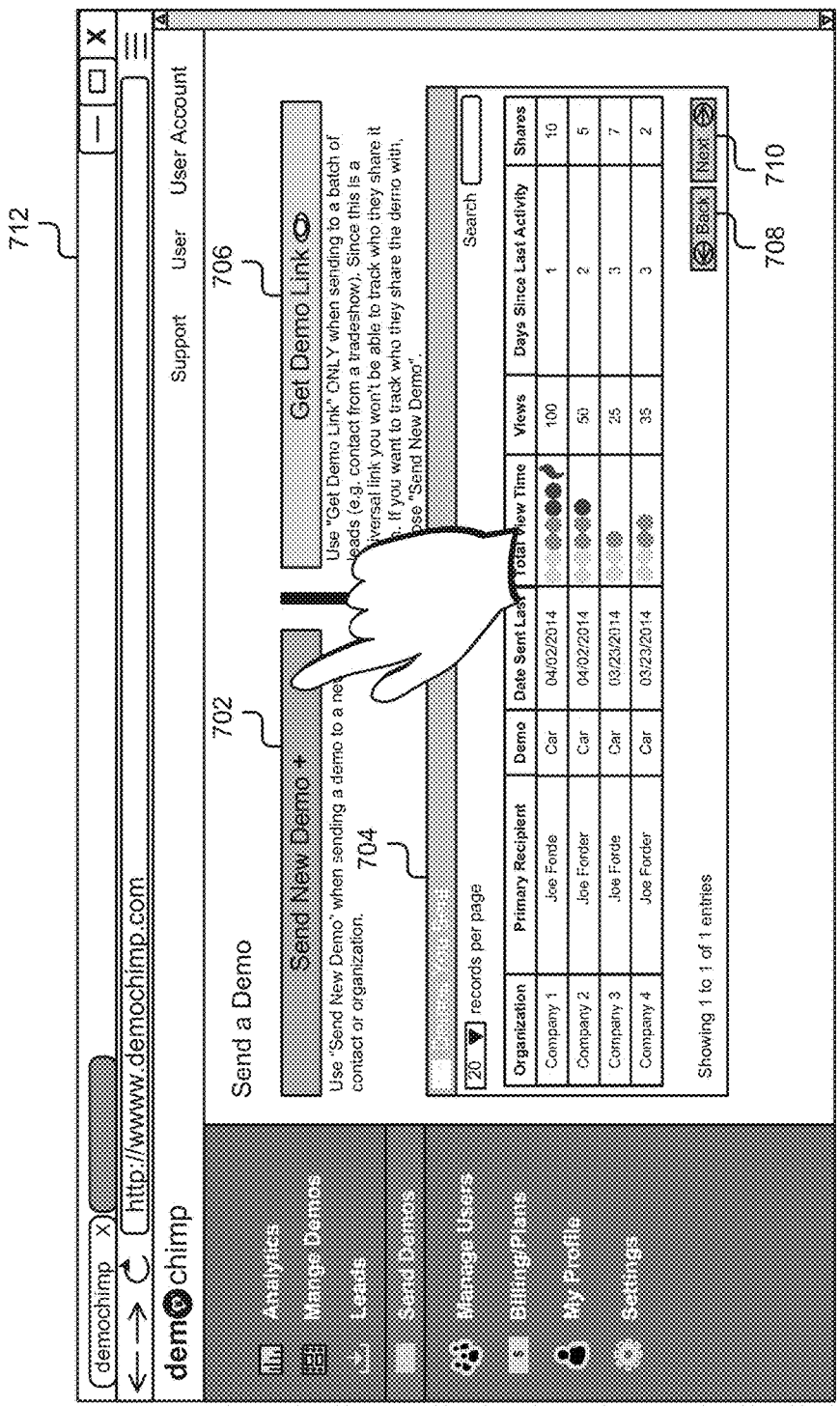
FIGS. 7A-7C are graphical representations of example user interfaces for electronically sharing a demo.
Figure 7B:
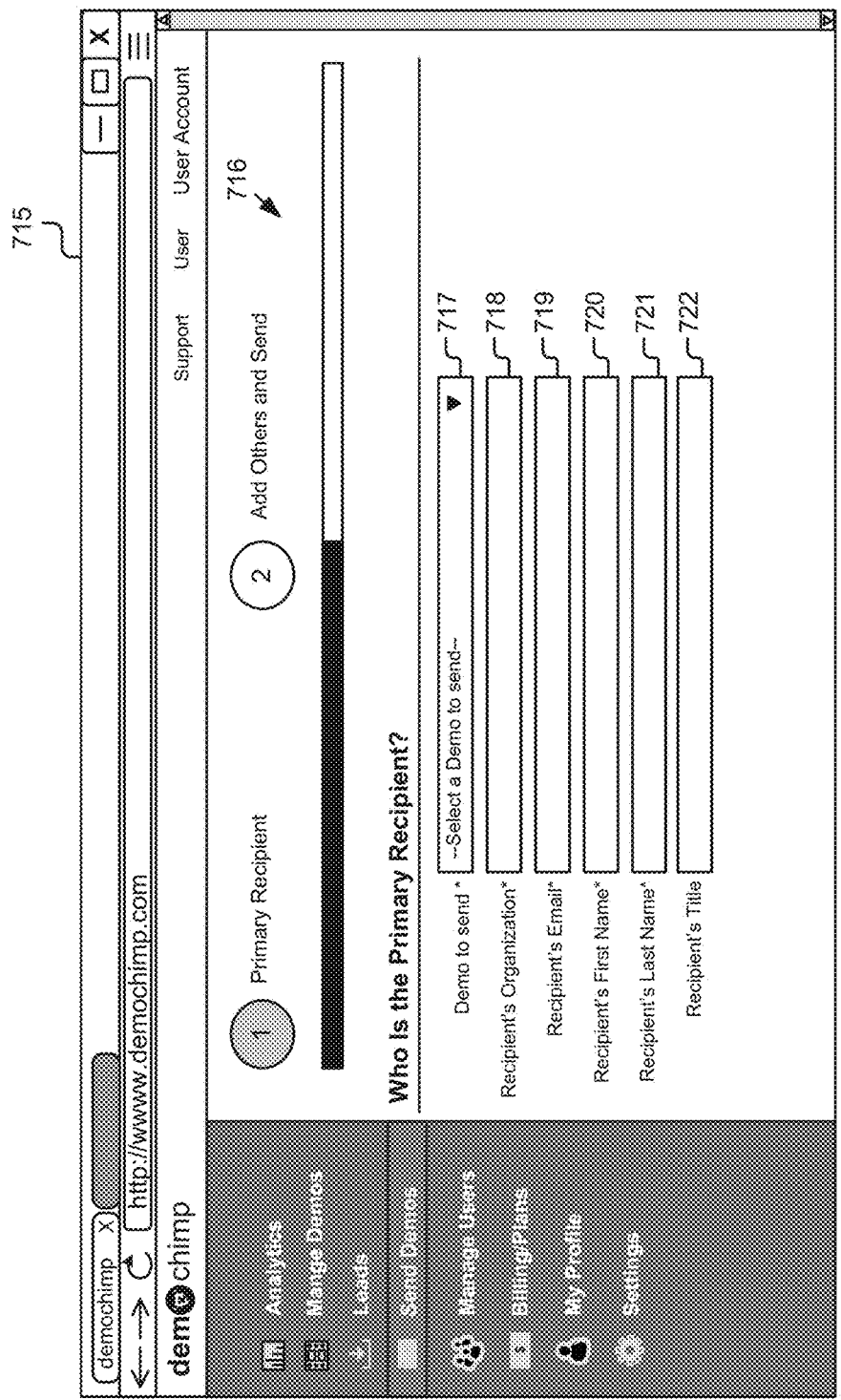
Figure 7C:
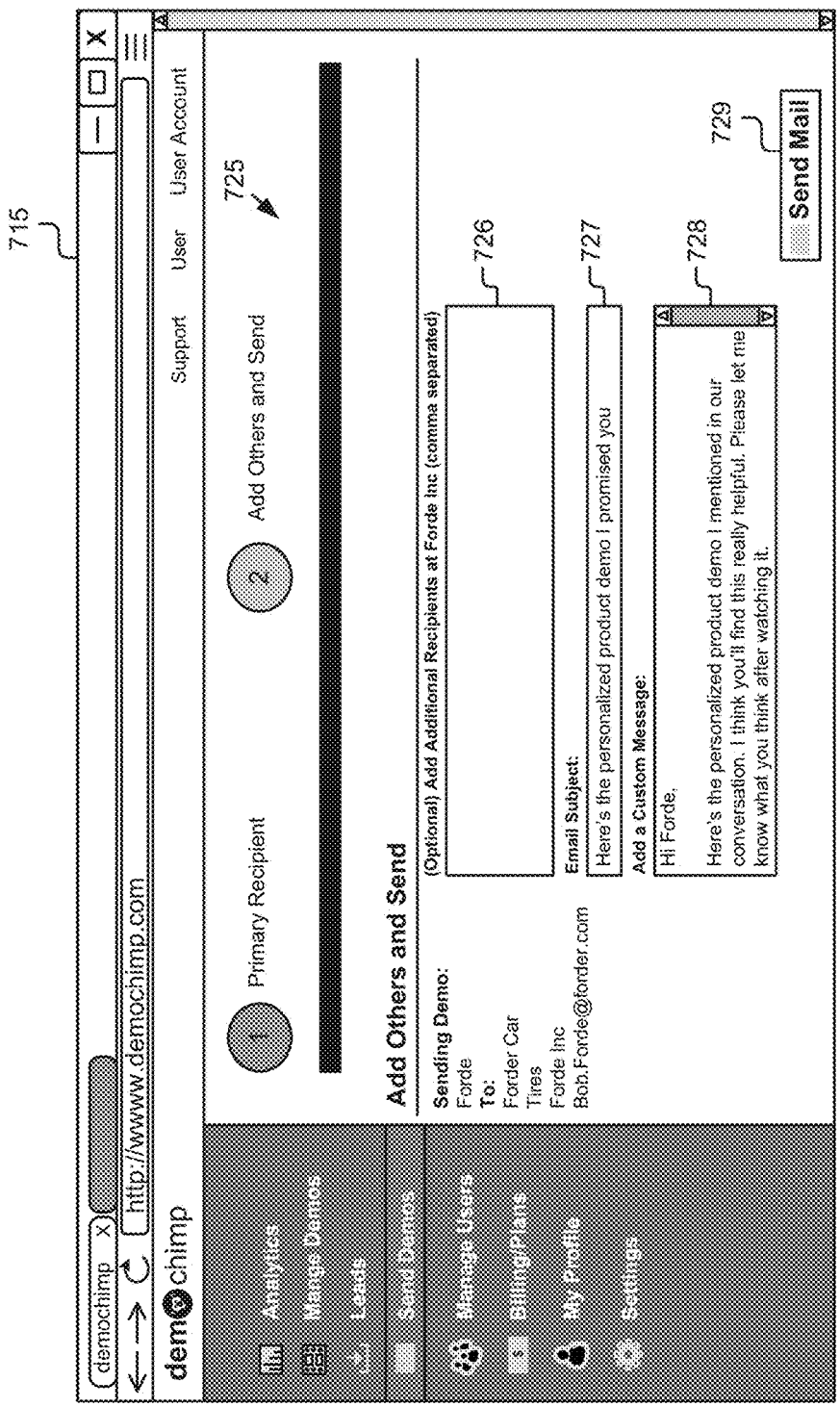

FIGS. 7A-7C are graphical representations of example user interfaces for electronically sharing a demo. In FIG. 7A, the interface 712 includes a button 702 selectable by the user (e.g., sender, sales person, marketer, etc.) which redirects the user to the interface 715 on FIG. 7B. The interface 712 also includes a summary table 704 that includes information related to past demos sent by the user. In some instances, the summary table 704 includes information related to the recipient such as organization name, primary recipient name, the name of the demo sent, a sending date, the total view time of the sent demo, the number of views of the demo, days since last activity and the number of times the demo has been shared. In some instances, the interface 712 includes a button 706 for generating a link (e.g., URL) of the demo. In some instances, the user may navigate from the interface 712 by selecting the back button 708 or next button 710.

In FIG. 7B, the interface 715 includes dialogs 716, 717, 718, 719, 720, 721, and 720. The primary recipient region 716 includes recipient information to be populated by the sender. In some implementations, the dialog 717 includes a drop down menu for the sender to select which demo is to be sent. In some instances, the primary recipient region 716 includes the dialog 718, which includes information related to the organization associated with the recipient, the dialog 719, which includes the recipients email address, the dialog 720, which includes the recipient's first name, the dialog 721, which includes the recipient's last name, and the dialog 722, which includes a field for the sender to enter the recipient's title.

In FIG. 7C, the interface 715 includes an email sending dialog 725 that includes a dialog 726, 727, and 728, and a button 729 selectable by the sender for sending the demo electronically to the recipient. In some instances, the dialog 726 includes an optional field for the sender to specify any additional recipients. The dialog 727 and dialog 728 includes information that is populated by the sender such as a subject of the email and a custom message.

In implementations involving advanced personalization, users may choose whether to send an advanced demo or a standard demo. Choosing a standard demo allows the user to simply send a standard demo as discussed in various implementations described herein. Choosing an advanced demo, however, results in the demo application 108 displaying at least two options. In an example, by default, the first option, which requires a response to a question for routing the demo, may be selected. With this option, the user indicates that he/she would like the demo viewer to be asked the question. If, however, the user would like to choose the answer for the demo viewer, they can check an option to answer on behalf of the viewer and select from among the answers that were added at the time the advanced demo was created. Answering on behalf of the viewer results in the demo viewer being sent the standard demo associated with the answer for that advanced demo. Choosing the standard demo to begin with would have resulted in the same thing, but if users are unsure which standard demo they would like to send, it may be helpful for them to locate it by going through this process.

By way of further illustration and not limitation, the following describes an example experience of viewing an advanced demo. Upon loading the advanced demo using the demo application 108, the demo viewer is presented with the logo and introduction video. If no introduction video was uploaded, this step is be skipped. After the introduction video, the demo application 108 presents the question chosen when creating the advanced demo along with the list of predefined answers which the viewer may select from. Upon selection of an answer, the demo viewer is then routed the standard demo associated with the answer that they chose and presented with the introduction video of that standard demo.

The analytics module 238 includes computer logic executable by the one or more processors 202 to generate analytics about the demos curated and viewed by users using the demonstration technology described herein. In some implementations, the analytics describe the level of user activity in interacting with the demos, the level of sales resulting from the demos, the user interest and/or dissatisfaction with various aspects of the demos, etc. Detailed non-limiting examples of the types of analytics generated by the analytics modules are depicted in FIGS. 4A-4G and 9 for example, which are discussed elsewhere herein.

The analytics module 238 may generate analytics based on interaction data received by the DAAS module 118 while users interact with the demos (e.g., playback, provide feedback on, fill out surveys for, share, communicate with others about, etc.). The interaction data describing these interactions may be received by the DAAS module 118, or a component thereof, and stored in the data store 210 for later analysis and/or retrieval.

In some instances, the analytics module 238 may receive an analytics request (e.g., from the demo application 108) and may process the corresponding analytics based on the interaction data received by the DAAS module 118 and generate a report of the analytics may include being presented on the display 209. Detailed non-limiting examples of the displays including the analytics generated by the analytics modules 238 are depicted in FIGS. 4A-4G and 9 for example, which are discussed elsewhere herein.

In addition or alternatively, the analytics module 238 may be coupled to a third-party server 122 hosting an application engine 124 executable by the third-party server 122 to track user behavior when consuming demos hosted by webservers and/or embedded in user applications (e.g., mobile apps). A non-limiting example of an analytics engine is Google Analytics™. The analytics module 238 may ingest analytics from the analytics engine (e.g., in response to a request sent to the analytics engine by the analytics module 238). The analytics module 238 may use these more general analytics in combination with the unique analytics collected in response to receive survey response data, advanced demo questionnaire data, demo data, and/or other data from the demo application 108 during the playback and/or curation of demos.

In some instances, for example, a prospective customer may sign up through a contact form provided by the demo application 108. For example, the demo application 108 may match the prospective customer's analytics by retrieving data (e.g. survey response data 216 and demo data 218) from the data store 210 and contact information, and provide valuable additional information for sales follow up.

In some implementations, the demo viewer interacts with the demo application 108, which monitors the interactions and sends interaction data describing the interactions to DAAS module 118 which stores it in the data store 210. The analytics module 238 generates analytics based on the interaction data, such as, for example, time spent overall using the demo application 108, time spent viewing each feature, documents downloaded by the viewer, and the purpose for NOT moving forward with a call to action (the process), etc. This advantageously allows for the demonstration system to gather information automatically from prospective customers (e.g. demo viewers).

In some implementations, the analytics module 238 may track the popularity of the features of the demo over time and over the body of users or a segment thereof. For example, each time users skip, mute, hide, or otherwise ignore a given feature, interaction data reflecting the users' actions is provided by the DAAS Module 118 by the instances of the demo application 108 being used by users, and the DAAS Module 118 stores data reflecting the performance of the features in the data store 210 as demo data 218. The analytics module 118 can retrieve this data and analyze which features have been ignored, objected to, or skipped the most. On the other hand, interaction data reflecting the features of the demos that users frequently viewed, rewound, viewed again, shared, commented on, communicated with others about, etc., may also be analyzed by the analytics module 118 and determined to be popular compared to the previously described, poorly performing features. The popular and unpopular features may be further segmented by importance as indicated in survey results data, which adds additional dimension to the value of the popular and unpopular features. This way, underperforming features of the demo that are also deemed unimportant may be surfaced to the administrator, and the administrator may take action to remove and/or revise those features to increase their performance and/or importance.

By way of further illustration and not limitation, during the period in which the demo application 108 displays demo interface in survey questions to a viewer with texture another message explaining the answering the questions will provide them with a personalized demonstration, the demo application 108 may begin gathering analytics data, such as the time the user began the demo and whether the user access the demo in response to the demo having been shared with the user using a unique link, as discussed elsewhere herein. Next, as the user answers survey questions, the demo application 108, in real-time, may send the survey response data asynchronously to the survey module 118 for storage in the data store 210. Based on the responses, the demo personalization module 232 provides the demo data file reflecting the demo to the demo application 108 for presentation, during playback of the demo, the demo application 108 gathers analytics data, such as interaction data reflecting the user's interaction with the demo, such as the time spent in each segment of the demo, which video topic the user was viewing when the demo was closed etc. In response to the user being presented with calls to action by the demo application 108 that encourage the user to take a next step in the sales process, the demo personalization module 234 monitors the outcome of the calls to action and stores information reflecting either whether the user accepted a call to action or did not, and if not, stores the reasons why (e.g., objections) provided by the user in the data store 210. The user does except a call that action, the demo personalization module 232 receives demo data including contact information for the user submitted by the user using the demo application 108 (e.g., a contact form presented thereby), and the analytics module 238 uses this contact information and combines it with the users specific analytics information and stores the information is a lead record, which may be later accessed/provided to a stakeholder in the demo for follow-up.

In some implementations, the analytics module 238 may segment demo-related information by user based on the user's activity data/interaction data, such as their viewing time, the features they like or not, their feedback, etc. As previously mentioned, an additional benefit of being able to reliably identify and store interaction data of the user in association with the users of the demonstration system is that additional buying panel identities are captured, which allows sales people to be more aware of those who are involved in the decision making process.

Figure 4A:
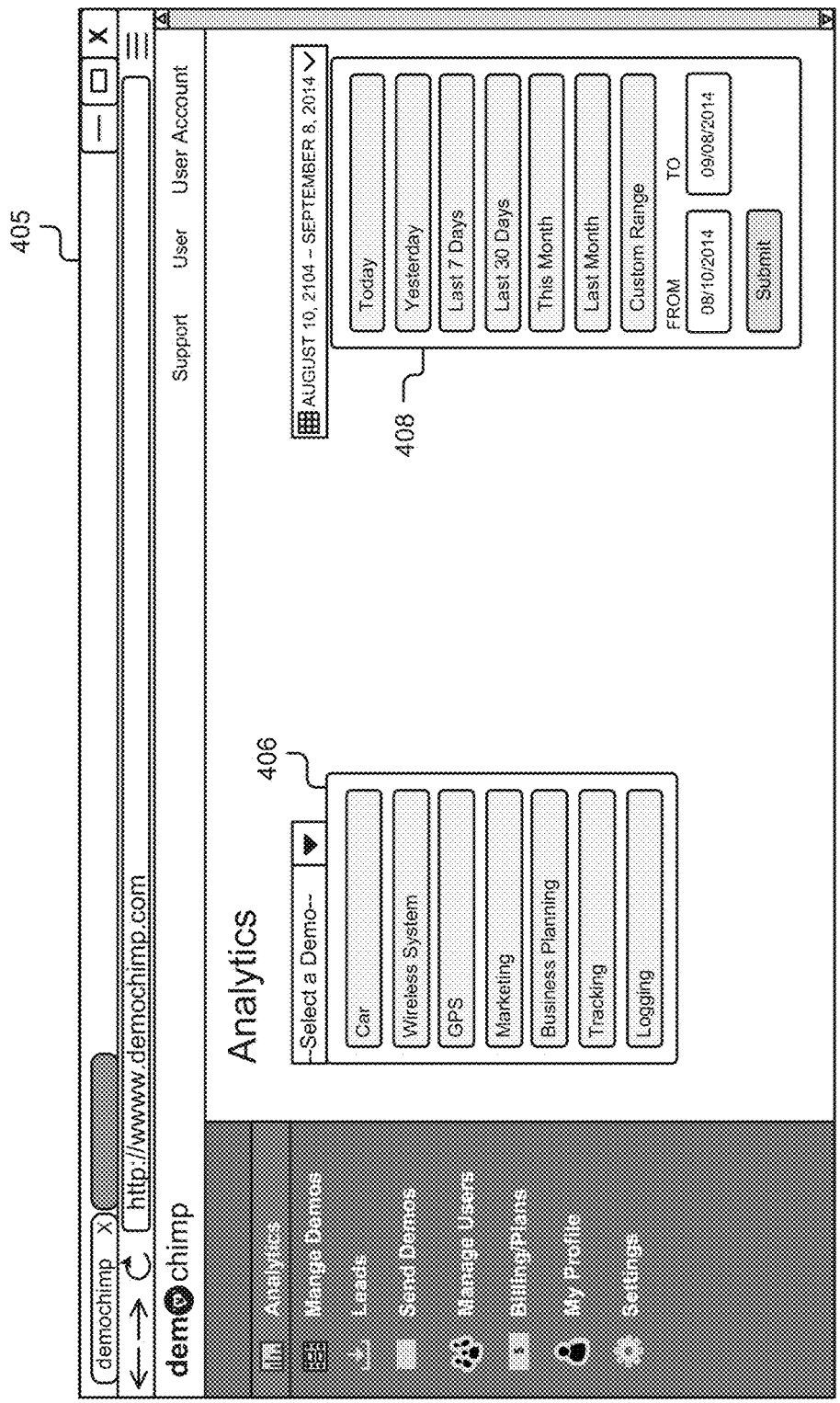
FIGS. 4A-4G are graphic representations of example user interfaces for viewing demo-related analytics.

FIGS. 4A-4G are graphic representations of example user interfaces for viewing demo-related analytics. In FIG. 4A, the interface 405 may include a drop-down list 406 of previously created demos associated with the user (e.g., Car, Wireless System, GPS, etc.) Furthermore, the interface 405 in FIG. 4A may include a drop-down menu 408 for the user to specify a date range for processing the analytics for the selected demo. For example, the user selects the Car demo in the drop-down list 406 and requests to process the analytics of the Car demo for the specified date range from Aug 10, 2014 to Sep 8, 2014. In some instances, the selected date may be a particular day (e.g., past and present day) or a range (e.g., previous week, month, etc.).

Figure 4B:
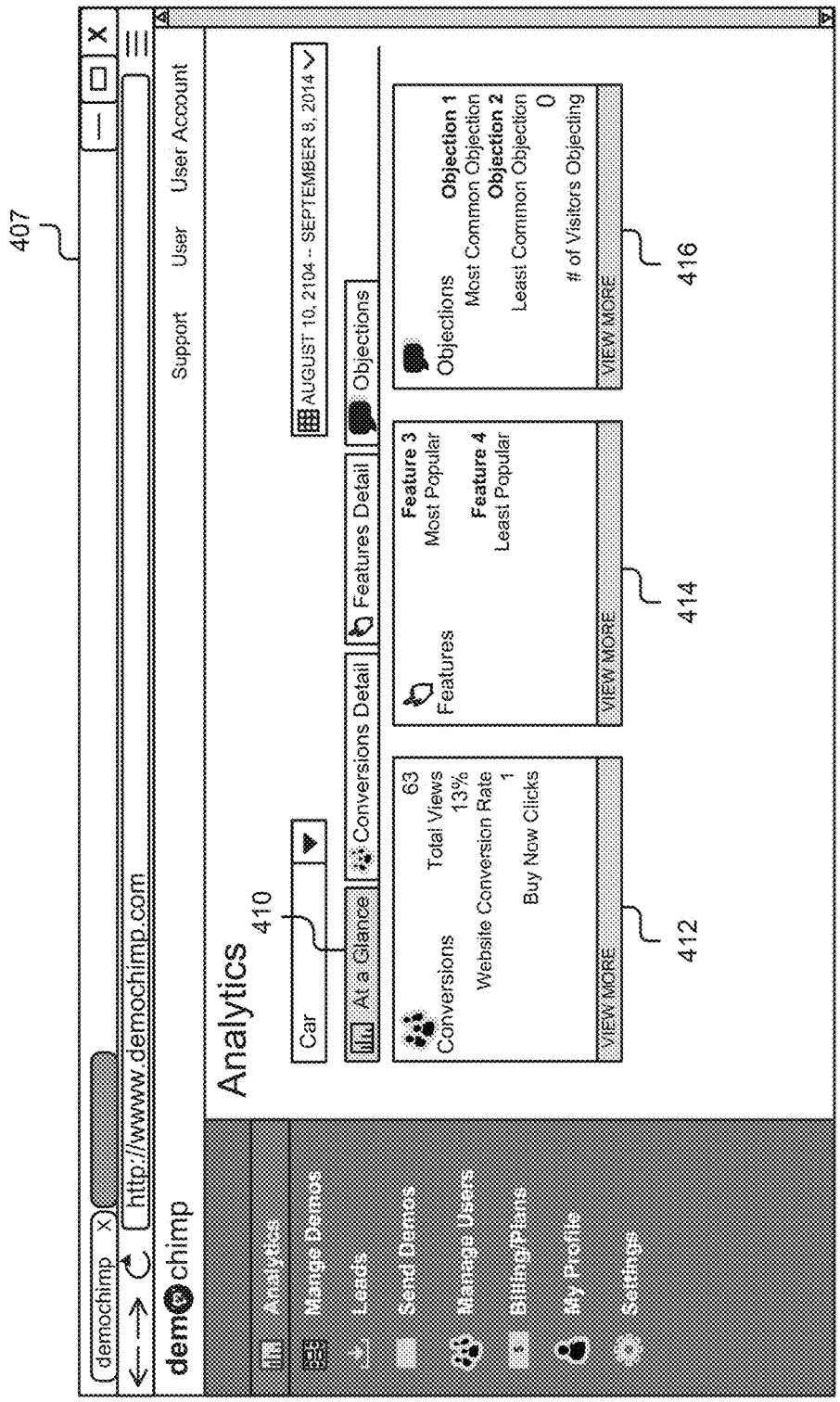

In FIG. 4B, responsive to selecting the demo in FIG. 4A, the demo application 108 may present the interface 409, various tabs, such as the at a glance tab 410, for viewing different aspects of the analytics generate by the analysis module 238. The analytics may reflect user interest in different aspects of the demo. In some implementations, the analytics may include various indicators and statistic related to conversions, demo features, and objections.

For example, as depicted, the interface 409 includes a conversion dialog 412, a feature dialog 414, and an objection dialog 416. The conversion dialog 412 includes a total number of views (e.g., 63) the demo has received, a website conversion rate of the demo (e.g., 13%), and a number of buy-now clicks selected by previous viewers that have viewed the demo (e.g., 1). The features dialog 414 indicates which features of the demo are the most popular (e.g., feature 3) and the least popular (e.g., feature 4). Non-limiting examples of the features of the Car demo may include the engine, the suspension, the interior, the styling, etc. The objections dialog 416 includes a most common objection (objection 1), a least common objection (objection 2), and a number of visitors objecting (zero).

Figure 4C:
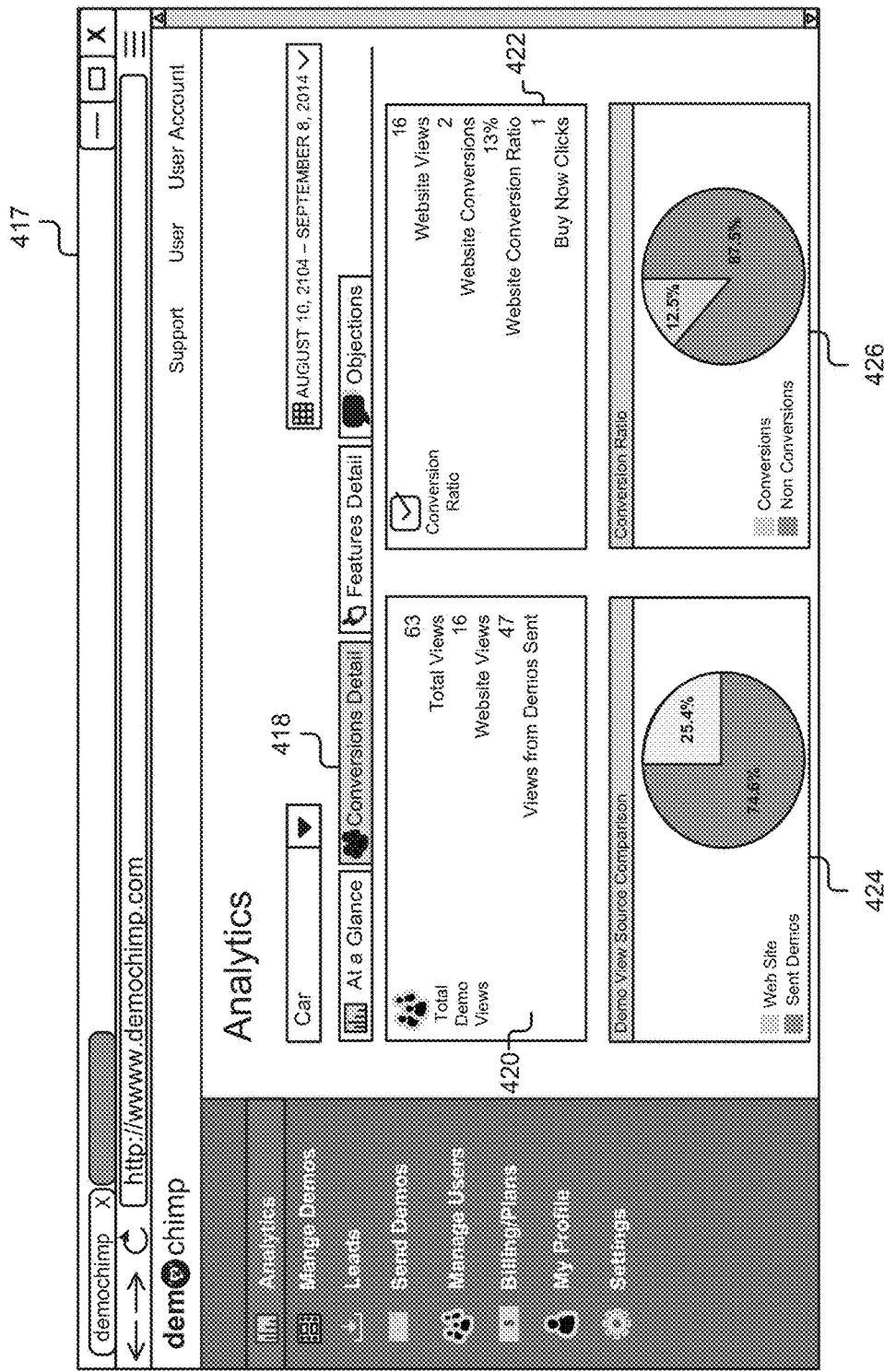

In FIG. 4C, tab 418 of the interface 417 is shown as selected by the user to display detailed conversions analytics, which includes a total demo views dialog 420 and a conversion ratio dialog 422. The total demo views dialog 420 includes view levels associated with the demo, such as the total number of views (e.g., 63), the total number of website views (e.g., 16), and the number of views from the demos sent by the user to other viewers (e.g., 47). In some instances, the interface 417 may present a graphical statistical comparison as shown in the graphical dialog 424, which compares the total number of views of the website by viewers and the number of viewers that viewed the sent demo. The conversion ratio dialog 422 includes conversion-related information associated with the demo, such as the total number of website views (e.g., 16), the number of website conversions (e.g., 2), the number of website conversion ratio (e.g., 13%), and the buy-now clicks (e.g., 1) performed by viewers that have previously viewed the demo. In some instances, the interface 417 may present a graphical statistical comparison as shown in the dialog 426, which compares statistical comparison between website conversions and non-conversions.

Figure 4D:
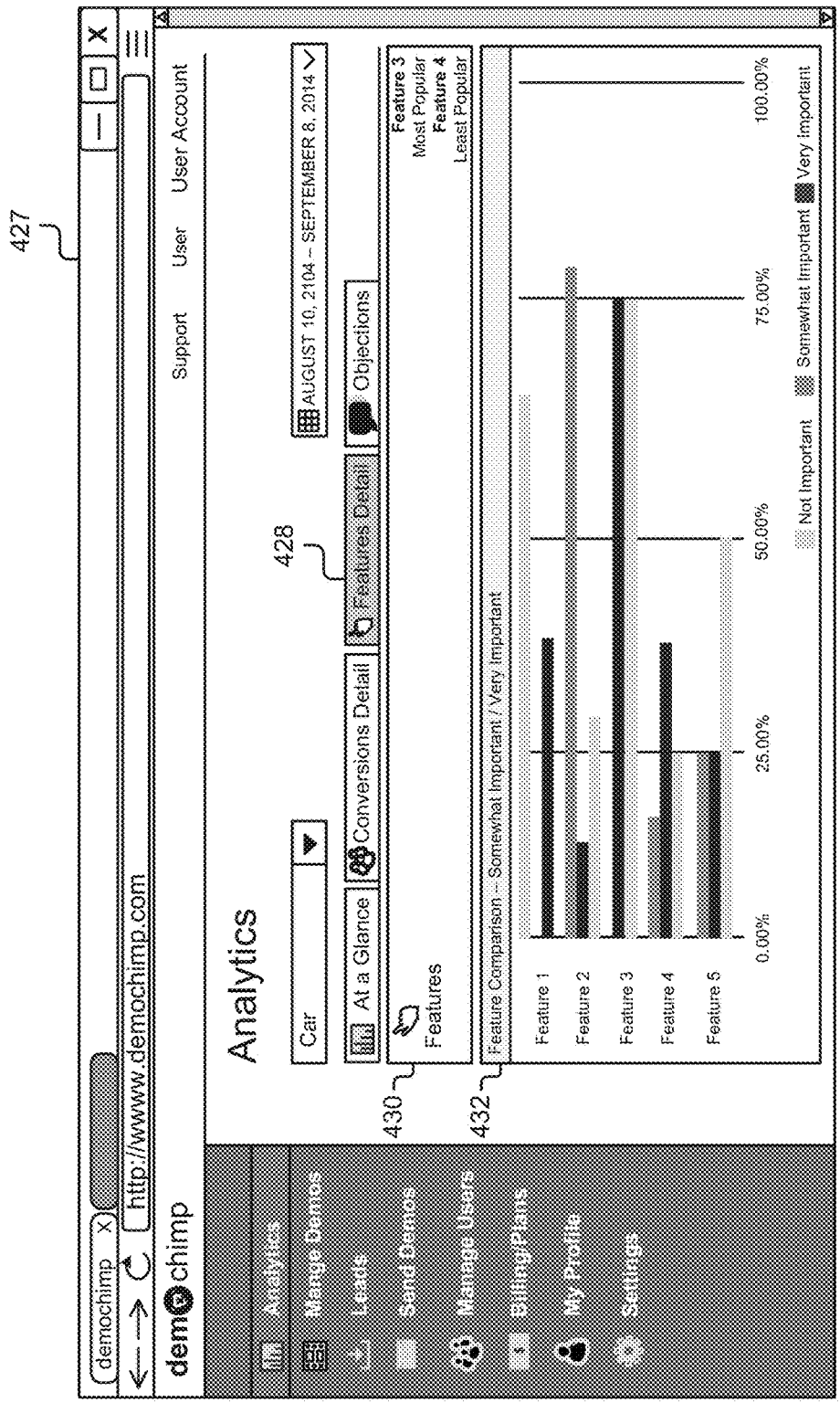

In FIG. 4D, tab 428 of the interface 427 is shown as selected by the user to display feature-related information, which includes a dialog 430 and a feature comparison 432. The dialog 430 displays the most and least popular features of the demo. For example, the dialog 430 shows that feature 3 is the most popular feature in the demo, and that feature 4 is the least popular feature presented in the demo. The feature comparison 432 includes graphical statistical information about the features (e.g., bar chart, pie chart, etc.). In some instances, the feature comparison 432 displays a comparison between all the features included in the demo. In some instances the comparison of the features is measured by importance (e.g., not important, somewhat important, and very important, etc.), as indicated by the previous viewers of the demo. In some instances, based on the importance measurement data presented in the analytics report, the user of the demo may select to remove features from the demo to promote more user traffic to the demo.

Figure 4E:
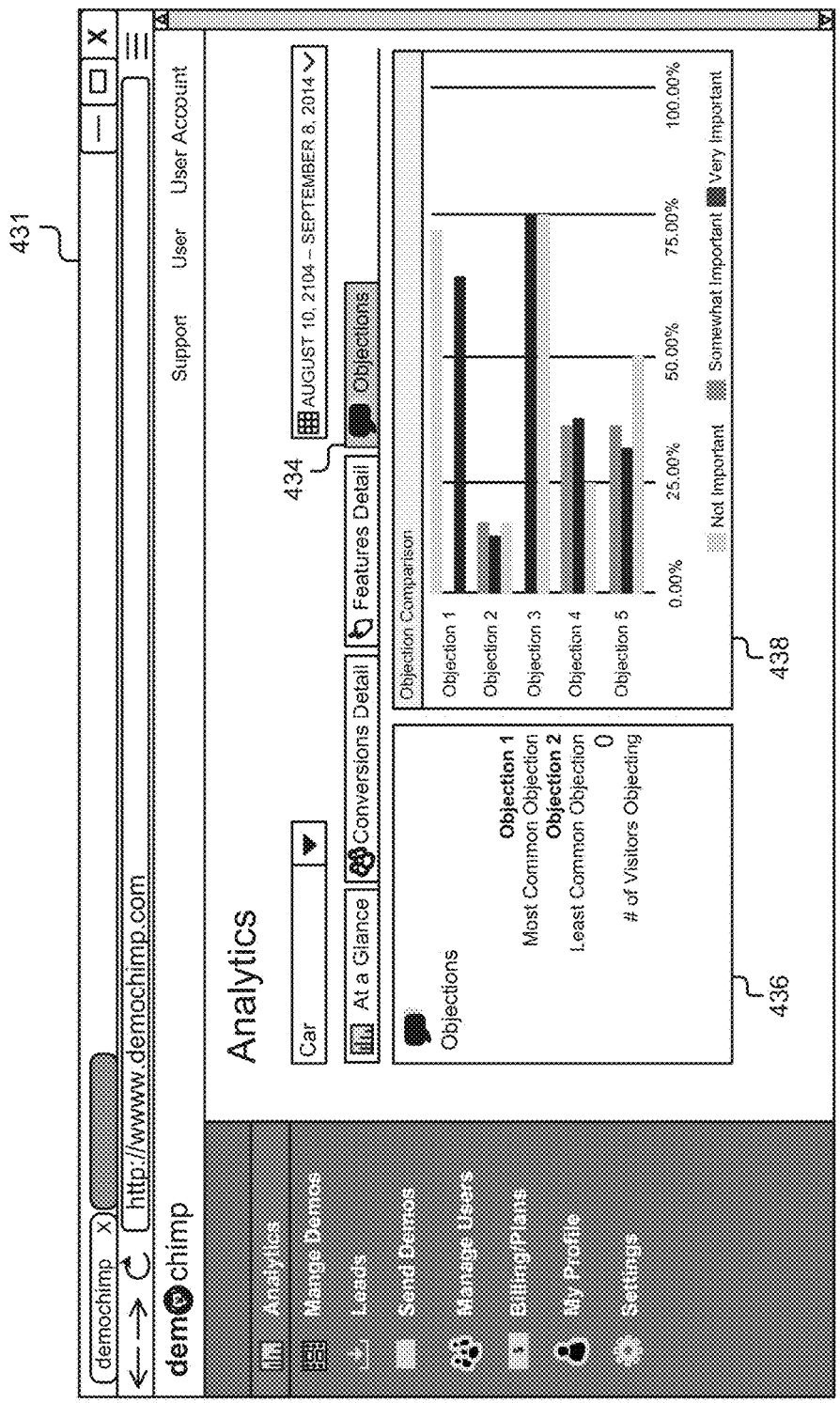

In FIG. 4E, tab 434 of the interface 431 is shown as selected by the user to display objection-related information, which includes the objection dialog 436 and the objections comparison 438. The objection dialog 436 may include information indicating the most common objection, the least common objection, and the number of visitors to the demo that indicated an objection. The objections comparison 438 includes graphical statistical information about the objections (e.g., bar chart, pie chart, etc.). In some instances, the objections comparison 438 displays a comparison between all the objections included in the demo. In some instances the comparison of the objections is measured by importance (e.g., not important, somewhat important, and very important, etc.), as indicated by the previous viewers of the demo. The administrator of the demo may use the most common objections to adapt the demo to address the deficiencies associated with those objections.

Figure 4F:
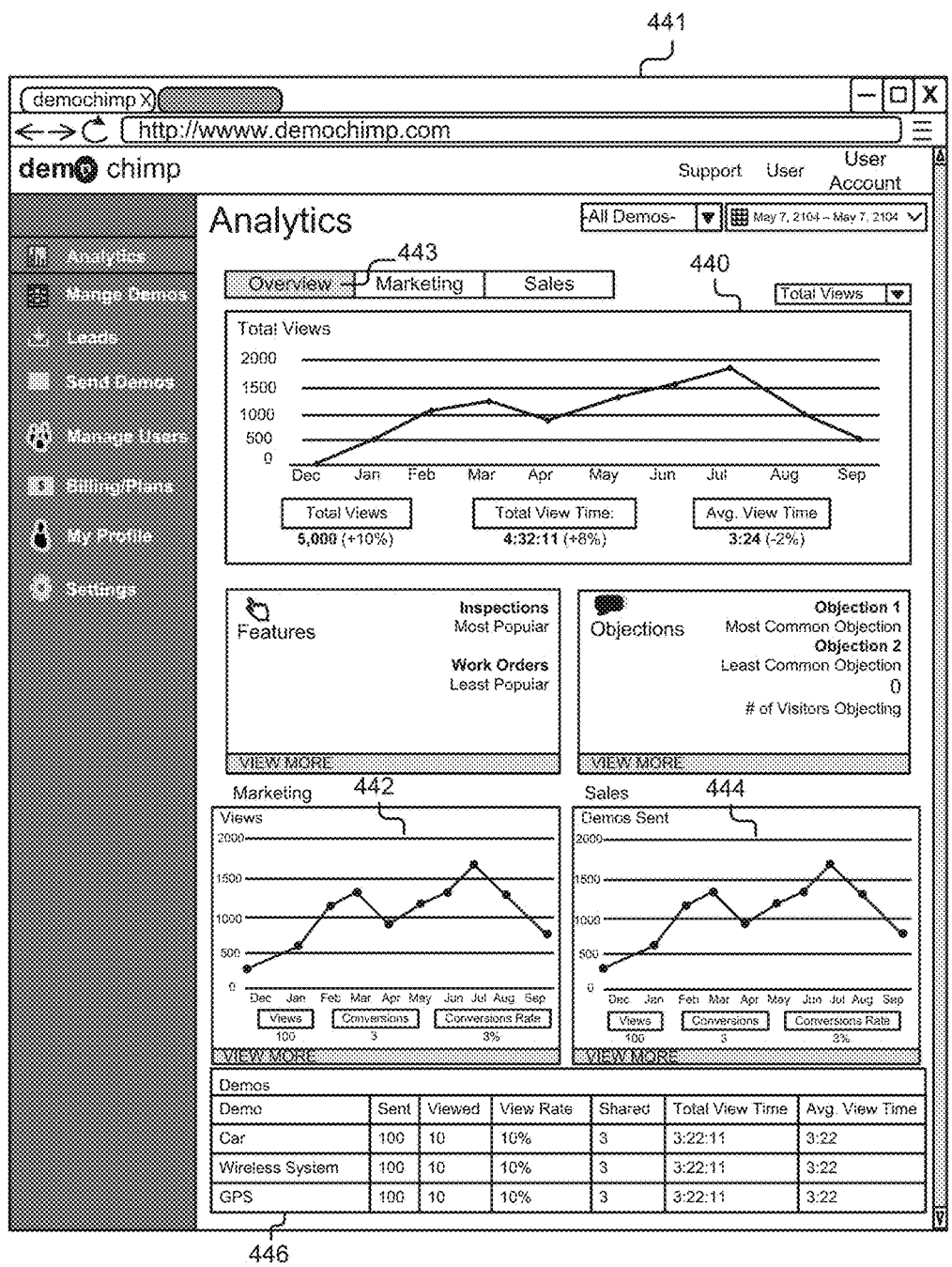

FIG. 4F illustrates an example analytics report for an example demo. FIG. 4F includes an interface 441 that includes a button 443, when selected by the user, displays an overview of the analytics to the user. The interface 441 may also include dialog windows 440, 442, 444, and 446. The dialog 440 may include a statistical summary of total views the demo received associated with a specified date range. The dialog 440 may also include additional viewing statistics associated with the total views for example, a total view time and an average view time. For example, the total view time may include a combined view time by viewers of the demo and the average view time may include the average amount of time viewers spent viewing the demo.

In some instances, the dialog 442 may include marketing information associated with the demo. The dialog 442 may also include statistics associated with the marketing information for example, the number of views, conversions, and conversions ratio.

In some instances, the dialog 444 may include sales information associated with the demos sent to other users. The dialog 444 may also include additional sales statistics for example, the number of views, conversions, and conversions ratio associated with the demo. For example, the dialog 442 may display the sales information in a graph. For example, the graph inside the dialog 442 displays the total number of views of the sent demo for the date range.

In some instances, the interface 441 may include the dialog 446 for displaying statistical information associated with one or more other demos created by the user. For example, the statistical information may include the number of demos sent, the number of received views for the demo, the view rate, the number of times the user has shared the demo, the total view time, and the average view time.

Figure 4G:
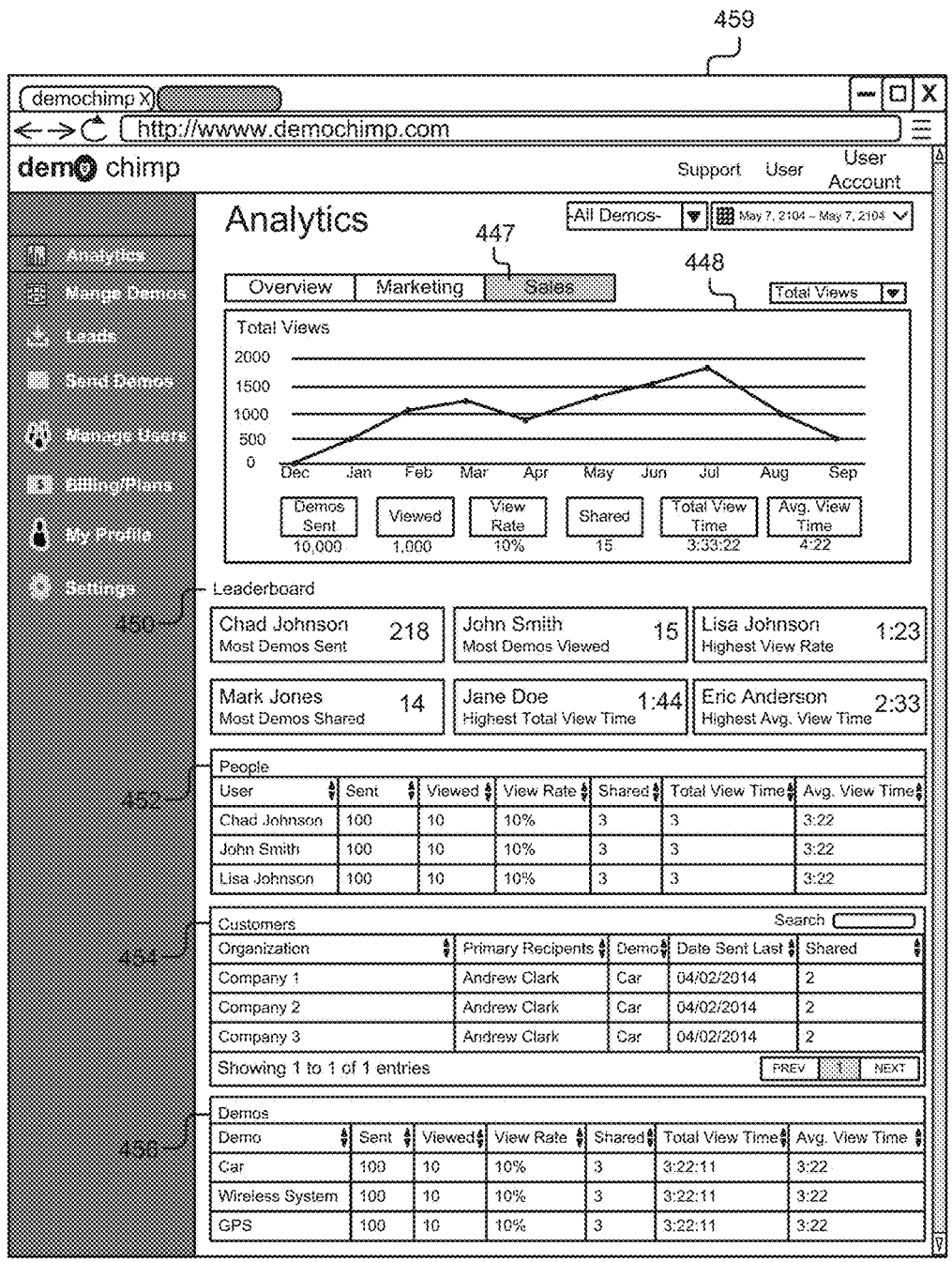

In FIG. 4G, the interface 459 a sales aspect of the example analytics report for the example demo. The interface 459 includes a button 447 when selected by the user displays sales analytics associated with the demo. The interface 459 may also include dialog windows 448, 450, 452, 454, and 456. The dialog 448 in some instances may include a statistical summary of the total views the demo received during a specified date range. The dialog 448 may also include additional viewing statistics associated with the total views, for example, the total number of demos sent to other users, the total number of received views, the view rate, the total number of times the demo was shared, the total view time, and the average view time. In some instances, the dialog 450 may include a leader board showing the best performers (e.g., users with most demos sent, most demos viewed, most demos shared, highest average view time, etc.). In some instances, the dialog 452 may include a people section individualizing the demo-related activity. In some instances, the dialog 454 may include a customer section indicating organizations (e.g., businesses, groups, etc.) that have received invitations to view the demo.

In some instances, the interface 459 may include the dialog 456 for displaying statistical information associated with one or more other demos created by the user. For example, the statistical information may include the number of demos sent, the number of received views for the demo, the view rate, the number of times the user has shared the demo, the total view time, and the average view time.

Figure 9:
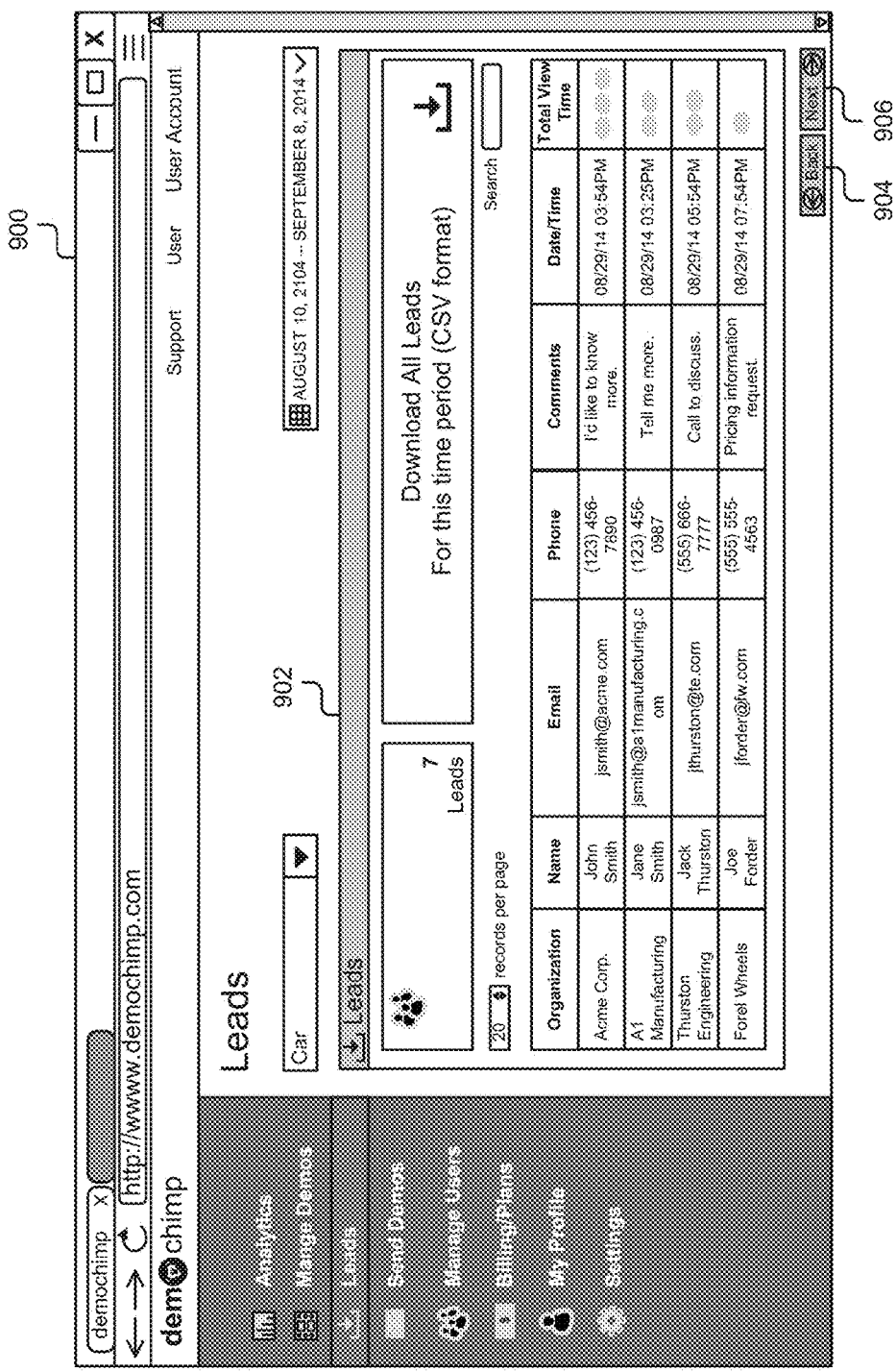
FIG. 9 is a graphical representation of an example user interface for displaying leads.

In FIG. 9, the interface 900 includes a dialog 902 including the number of available leads and an option for the user to download the leads. In some instances, the user may download the leads in a particular format (e.g., csv). The dialog 902 may also include additional leads information. For example, the additional leads information may include lead-specific information (e.g. name of each lead) and contact information (e.g., email, phone number, etc.) for the lead, comments from the leas (e.g., input while viewing a demo), the date and time of the lead being generated, and analytics data about a particular lead. In some instances, the analytics may include the total view time of the lead in interacting with a viewing user of the demo. In some instances, the user may navigate from the interface 900 by selecting the back button 904 or next button 906.

In a non-limiting example, a user may request analytics data or a given demo by selecting the demo using a corresponding interface (e.g., see FIG. 4A) and specifying a date range for the analytics, and the analytics module 238 may generate analytics for that demo based on this information. In some instances, the analytics module 238 generate analytics data for the demos at regular intervals so when a user requests analytics data for a given demo or group of demos, the analytics module 238 can quickly retrieve the corresponding previously generated analytics from a non-transitory information source, such as the memory 204, the data store 210, etc., and provide the analytics 222 for presentation to the user (e.g., via the display 209).

While certain acts and/or functionality described herein as being associated with certain modules, it should be understood that these acts and/or functionality may be performed by other modules, or a combination of two or more modules, and/or moved from a client side or server side implementation without departing from the scope of this disclosure.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Reference is made to exemplary implementations such as those illustrated in the drawings, and specific language is used herein to describe the same. But alterations and further modifications of the features illustrated herein, and additional technical applications of the abstract principles illustrated by particular implementations herein, which would occur to one skilled in the relevant art(s) and having possession of this disclosure, should be considered within the scope of the claims.

The meaning of terms is clarified in this disclosure, so claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used here and/or in successor applications with various phrasings, to help show the breadth of a term. Omission of a reference numeral from a given piece of text does not necessarily mean that the content of a Figure is not being discussed by the text. The inventor asserts and exercises his right to his own lexicography. Quoted terms are defined explicitly, but quotation marks are not used when a term is defined implicitly. Terms may be defined, either explicitly or implicitly, here in the Description and/or elsewhere in the application file.

As used herein, a computer or computing system may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many implementations run on workstation or laptop computers, other implementations may run on other computing devices, and any one or more such devices may be part of a given implementation.

A "multithreaded" computer system is a computer system which supports multiple execution threads. The term "thread" should be understood to include any code capable of or subject to scheduling (and possibly to synchronization), and may also be known by another name, such as "task", "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyper threaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system, which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations, the processors share a central memory, in some, they each have their own local memory, and in some configurations, both shared and local memories are present.

"Kernels" include operating systems, hypervisors, virtual machines, BIOS code, and similar hardware interface software.

"Code" and "software" are used interchangeably; each means processor instructions, data (which includes constants, variables, and data structures), or both instructions and data.

"Program" is used broadly herein, to include applications, kernels, and drivers, interrupt handlers, libraries, and other code written by programmers (who are also referred to as developers).

As used herein, "include," allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed implementations so far as a claim in question is concerned.

"Process" is sometimes used herein as a term of the computing science arts, and in that technical sense encompasses resource users, namely, coroutine, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general-purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol / Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

One of skill understands that technical effects are the presumptive purpose of a technical implementation. The mere fact that calculation is involved in an implementation, for example, and that some calculations can also be performed without technical components (e.g., by paper and pencil, or even as mental steps) does not remove the presence of the technical effects or alter the concrete and technical nature of the implementation. For example, certain familiar devices perform balance calculations to maintain their balance; some examples include mobile robots and SEGWAY® wheeled personal mobility devices (mark of Segway, Inc.). These devices are not part of the implementations described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

"Computationally" likewise means a computing system (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an implementation was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. A memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

An operating environment for an implementation may include a computer system. The computer system may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system may be configured for end-users, e.g., with applications, for administrators, as a server, as a distributed processing node, and/or in other ways.

Human users may interact with the computer system 102 using displays, keyboards, and other peripherals, via typed text, touch, voice, movement, computer vision, gestures, and/or other forms of I/O. A user interface may support interaction between an implementation and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses. One of skill will appreciate that the foregoing aspects and other aspects presented herein as "Operating Environments" may also form part of a given implementation.

This document's headings are not intended to provide a strict classification of features into implementation and non-implementation feature classes.

System administrators, developers, engineers, and end-users are each a particular type of user. Automated agents, scripts, playback software, and the like acting on behalf of one or more people may also be users. Storage devices and/or networking devices may be considered peripheral equipment in some implementations. Other computer systems may interact in technological ways with the computer system or with another system implementation using one or more connections to a network via network interface equipment, for example.

The computer system includes at least one logical processor. The computer system, like other suitable systems, also includes one or more computer-readable storage media. Media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium such as a portable (i.e., external) hard drive, CD, DVD, memory stick, or other removable non-volatile memory medium may become functionally a technological part of the computer system when inserted or otherwise installed, making its content accessible for interaction with and use by processor. The removable configured medium is an example of a computer-readable storage medium. Some other examples of computer-readable storage media include built-in RAM, ROM, hard disks, and other memory storage devices which are not readily removable by users. Neither a computer-readable medium nor a computer-readable memory includes a signal per se.

The medium is configured with instructions that are executable by a processor; "executable" is used in a broad sense herein to include machine code, interpretable code, bytecode, and/or code that runs on a virtual machine, for example. The medium is also configured with data which is created, modified, referenced, and/or otherwise used for technical effect by execution of the instructions. The instructions and the data configure the memory or other storage medium in which they reside; when that memory or other computer readable storage medium is a functional part of a given computer system, the instructions and data also configure that computer system. In some implementations, a portion of the data is representative of real-world items such as product characteristics, inventories, physical measurements, settings, images, readings, targets, volumes, and so forth. Such data is also transformed by backup, restore, commits, aborts, reformatting, and/or other technical operations.

Although an implementation may be described as being implemented as software instructions executed by one or more processors in a computing system (e.g., general purpose computer, cell phone, or gaming console), such description is not meant to exhaust all possible implementations. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an implementation may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an implementation may be grouped into interacting functional modules based on their inputs, outputs, and/or their technical effects, for example.

The code and other items shown in the Figures and/or discussed in the text, may reside partially or entirely within one or more hardware media, thereby configuring those media for technical effects which go beyond the "normal" (i.e., least common denominator) interactions inherent in all hardware—software cooperative operation. In addition to processors (CPUs, ALUs, FPUs, and/or GPUs), memory / storage media, display(s), and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

In some implementations, peripherals such as human user I/O devices (screen, keyboard, mouse, tablet, microphone, speaker, motion sensor, etc.) will be present in operable communication with one or more processors and memory. However, an implementation may also be deeply embedded in a technical system, such that no human user interacts directly with the implementation. Software processes may be users.

In some implementations, the system includes multiple computers connected by a network. Networking interface equipment can provide access to networks, using components such as a packet-switched network interface card, a wireless transceiver, or a telephone network interface, for example, which may be present in a given computer system. However, an implementation may also communicate technical data and/or technical instructions through direct memory access, removable nonvolatile media, or other information storage-retrieval and/or transmission approaches, or an implementation in a computer system may operate without communicating with other computer systems.

Some implementations operate in a "cloud" computing environment and/or a "cloud" storage environment in which computing services are not owned but are provided on demand. For example, demo videos may be on multiple devices/systems in a networked cloud, locked library documents may be stored on yet other devices within the cloud, and the innovation may configure the display on yet other cloud device(s)/system(s).

Figures illustrates some process implementations in flowcharts. Technical processes shown in the Figures or otherwise disclosed may be performed in some implementations automatically, e.g., under control of a script or otherwise requiring little or no contemporaneous live user input. Processes may also be performed in part automatically and in part manually unless otherwise indicated. In a given implementation, zero or more illustrated steps of a process may be repeated, perhaps with different parameters or data to operate on. Steps in an implementation may also be performed serially, in a partially overlapping manner, or fully in parallel, and steps from different flowcharts may be combined in a particular implementation. The order in which steps are traversed during a process may vary from one performance of the process to another performance of the process. Steps may be omitted, combined, renamed, regrouped, or otherwise depart from a particular illustrated flow, provided that the process performed is operable and conforms to at least one claim of the application or patent in question.

Examples are provided herein to help illustrate aspects of the technology, but the examples given within this document do not describe all possible implementations. Implementations are not limited to the specific implementations, arrangements, displays, features, approaches, or scenarios provided herein. A given implementation may include additional or different technical features, mechanisms, and/or data structures, for instance, and may otherwise depart from the examples provided herein.

Some implementations include a configured computer-readable storage medium, which may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium such as a CD, DVD, or flash memory. A general-purpose memory, which may be removable or not, and may be volatile or not, can be configured into an implementation using items discussed in the text and/or shown in the figures, in the form of data and instructions, read from a removable medium and/or another source such as a network connection, to form a configured medium. The configured medium is capable of causing a computer system to perform technical process steps for innovation(s) as disclosed herein. The Figures thus help illustrate configured storage media implementations and process implementations, as well as system implementations.

Although particular implementations are expressly illustrated and described herein as processes, as configured media, or as systems, it will be appreciated that discussion of one type of implementation also generally extends to other implementation types. For instance, the descriptions of processes also help describe configured media, and help describe the technical effects and operation of systems and manufactures like those discussed. It does not follow that limitations from one implementation are necessarily read into another. In particular, processes are not necessarily limited to the data structures and arrangements presented while discussing systems or manufactures such as configured memories.

Reference herein to an implementation having some feature X and reference elsewhere herein to an implementation having some feature Y does not exclude from this disclosure implementations which have both feature X and feature Y, unless such exclusion is expressly stated herein. The term "implementation" is merely used herein as a more convenient form of "process, system, article of manufacture, configured computer readable medium, and/or other example of the teachings herein as applied in a manner consistent with applicable law". Accordingly, a given "implementation" may include any combination of features disclosed herein, provided the implementation is consistent with at least one claim.

Not every item shown in the Figures need be present in every implementation. Conversely, an implementation may contain item(s) not shown expressly in the Figures. Although some possibilities are illustrated here in text and drawings by specific examples, implementations may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some implementations; one of skill recognizes that functionality modules can be defined in various ways in a given implementation without necessarily omitting desired technical effects from the collection of interacting modules viewed as a whole.

Any apparent inconsistencies in the phrasing or other depiction associated with a given item, in the figures or in the text, should be understood as simply broadening the scope of what is referenced.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims, as filed, are part of the specification.

While exemplary implementations have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every implementation. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method executable by a computing system including one or more processors and one or more memories, the method comprising:

receiving, using the one or more processors, a request for a product demonstration for a product from a demo application executing on a client device of a user, wherein the demo application includes code operable in one or more of a web browser and an application running on the client device and includes one or more user interfaces for collecting user interactions and for displaying content segments of the product demonstration on the client device;

receiving, using the one or more processors, survey response data input by the user into the demo application of the client device and transmitted via a computer network, the survey response data including interest level indicators for features of the product, the interest level indicators corresponding to a level of interest of the user in the features of the product;

after receiving the survey response data including the interest level indicators for the features of the product, automatically building and presenting a customized product demonstration to the user by:

matching the interest level indicators to corresponding fields mapped to corresponding content segments associated with the features in a non-transitory data store including selecting the corresponding content segments having lengths associated with the interest level indicators for the features, the lengths including levels of detail describing the features of the product;

determining content segments for a customized demo data file embodying the product demonstration by retrieving entries of the corresponding content segments mapped to the corresponding fields in the data store based on the lengths of the content segments associated with the interest level indicators;

dynamically generating, using the one or more processors, the customized demo data file using the determined content segments, the customized demo data file reflecting a personalized version of the product demonstration that is personalized based on the survey response data input by the user;

presenting a graphical user interface including an interaction region for playing back the customized demo data file; and playing back, via the interaction region of the graphical user interface, one or more of the determined content segments of the customized demo data file;

tracking one or more inputs input by the user into the graphical user interface during playback of the determined content segments of the customized demo data file via an input device coupled to the one or more processors, the one or more inputs describing one or more interactions by the user with the one or more of the determined content segments of the customized demo data file;

receiving, using the one or more processors, interaction data describing the one or more interactions by the user with the one or more of the determined content segments of the customized demo data file;

generating, using the one or more processors, analytics describing performance of each of the one or more of the determined content segments of the customized demo data file based on the interaction data; and revising, using the one or more processors, building of future product demonstrations based on the generated analytics to improve performance of the features in the future product demonstrations.

2. The method of claim 1, further comprising:

storing, using the one or more processors, the interaction data for each of the one or more content segments of the product demonstration in a non-transitory data store in association with one or more features corresponding to the one or more of the determined content segments;

wherein receiving the interaction data includes retrieving the interaction data associated with the one or more of the determined content segments from the data store.

3. The method of claim 1, further comprising:

generating, using the one or more processors, an electronic link to the customized demo data file reflecting the product demonstration that is personalized to the user;

sending, using the one or more processors, an electronic message including the electronic link to the customized demo data file reflecting the product demonstration that is personalized to the user to an electronic address of another user;

receiving, using the one or more processors, a request based on a selection of the electronic link by the other user;

redirecting, using the one or more processors, the other user to a login interface prompting the other user to confirm the other user's identity;

authenticating, using the one or more processors, the other user based on a confirmation of the other user's identity;

providing, using the one or more processors, the customized demo data file reflecting the personalized version of the product demonstration to the other user; and tracking, using the one or more processors, user activity of the other user in interaction with the customized demo data file reflecting the personalized version of the product demonstration.

4. The method of claim 3, further comprising:

generating, using the one or more processors, analytics describing the user activity of the other user in interacting with the customized demo data file reflecting the personalized version of the product demonstration.

5. The method of claim 3, wherein the other user is involved in purchasing products associated with the product demonstration.

6. A computer system comprising:

one or more processors;

one or more memories storing computer logic that, when executed by the one or more processors, cause the computer system to perform operations including:

receiving a request for a product demonstration for a product from a demo application executing on a client device of a user, wherein the demo application includes code operable in one or more of a web browser and an application running on the client device and includes one or more user interfaces for collecting user interactions and for displaying content segments of the product demonstration on the client device;

receiving survey response data input by the user into the demo application of the client device and transmitted via a computer network, the survey response data including interest level indicators for features of the product, the interest level indicators corresponding to a level of interest of the user in the features of the product;

after receiving the survey response data including the interest level indicators for the features of the product, automatically building and presenting a customized product demonstration to the user by:

matching the interest level indicators to corresponding fields mapped to corresponding content segments associated with the features in a non-transitory data store including selecting the corresponding content segments having lengths associated with the interest level indicators for the features, the lengths including levels of detail describing the features of the product;

determining content segments for a customized demo data file embodying the product demonstration by retrieving entries of the corresponding content segments mapped to the corresponding fields in the data store based on the lengths of the content segments associated with the interest level indicators;

dynamically generating the customized demo data file using the determined content segments, the customized demo data file reflecting a personalized version of the product demonstration that is personalized based on the survey response data input by the user;

presenting a graphical user interface including an interaction region for playing back the customized demo data file; and playing back, via the interaction region of the graphical user interface, one or more of the determined content segments of the customized demo data file;

tracking one or more inputs input by the user into the graphical user interface during playback of the determined content segments of the customized demo data file via an input device coupled to the one or more processors, the one or more inputs describing one or more interactions by the user with the one or more of the determined content segments of the customized demo data file;

receiving interaction data describing the one or more interactions by the user with the one or more of the determined content segments of the customized demo data file;

generating analytics describing performance of each of the one or more of the determined content segments of the customized demo data file based on the interaction data; and revise building of future product demonstrations based on the generated analytics to improve performance of the features in the future product demonstrations.

7. The system of claim 6, wherein the computer logic, when executed by the one or more processors, further causes the computer system to perform operations including:

storing the interaction data for each of the one or more content segments of the product demonstration in a non-transitory data store in association with one or more features corresponding to the one or more of the determined content segments; wherein receiving the interaction data includes retrieving the interaction data associated with the one or more determined content segments from the data store.

8. The system of claim 6, wherein the computer logic, when executed by the one or more processors, further causes the computer system to perform operations including:

generating an electronic link to the customized demo data file reflecting the product demonstration that is personalized to the user;

sending an electronic message including the electronic link to the customized demo data file reflecting the product demonstration that is personalized to the user to an electronic address of another user;

receiving a request based on a selection of the electronic link by the other user;

redirecting the other user to a login interface prompting the other user to confirm the other user's identity;

authenticating the other user based on a confirmation of the other user's identity;

providing the customized demo data file reflecting the personalized version of the product demonstration to the other user; and tracking user activity of the other user in interaction with the customized demo data file reflecting the personalized version of the product demonstration.

9. The system of claim 8, wherein the computer logic, when executed by the one or more processors, further causes the computer system to perform operations including:

generating analytics describing the user activity of the other user in interacting with the customized demo data file reflecting the personalized version of the product demonstration.

10. The system of claim 8, wherein the other user is involved in purchasing products associated with the product demonstration.

11. A method executable by a computing system including one or more processors and one or more memories, the method comprising:

receiving, using the one or more processors, a request for a product demonstration for a product from a demo application executing on a client device of a user, wherein the demo application includes code operable in one or more of a web browser and an application running on the client device and includes one or more user interfaces for collecting user interactions and for displaying content segments of the product demonstration on the client device;

receiving, using the one or more processors, survey response data input by the user into the demo application of the client device and transmitted via a computer network, the survey response data including interest level indicators for features of the product;

after receiving the survey response data including the interest level indicators for the features of the product, automatically building and presenting a customized product demonstration to the user by:

matching the interest level indicators to corresponding content segments having levels of detail corresponding to the interest level indicators and associated with the features in a non-transitory data store;

determining content segments for a customized demo data file embodying the product demonstration by retrieving entries of the corresponding content segments in the data store based on the levels of detail of the content segments describing the features of the product;

dynamically generating, using the one or more processors, the customized demo data file using the determined content segments having the levels of detail, the customized demo data file reflecting a personalized version of the product demonstration that is personalized based on the survey response data input by the user;

presenting a graphical user interface including an interaction region for playing back the customized demo data file; and playing, via the interaction region of the graphical user interface, one or more of the determined content segments of the customized demo data file;

tracking one or more inputs input by the user into the graphical user interface during playback of the determined content segments of the customized demo data file via an input device coupled to the one or more processors, the one or more inputs describing one or more interactions by the user with the one or more of the determined content segments of the customized demo data file;

generating, using the one or more processors, analytics describing performance of each of the one or more of the determined content segments of the customized demo data file based on the one or more inputs; and revising, using the one or more processors, building of future product demonstrations based on the generated analytics to improve performance of the features in the future product demonstrations.

* * * * *